April 22, 1947.                F. R. SAXBY                2,419,502
                            MULTIPLYING MACHINE
                          Filed Feb. 16, 1944            32 Sheets-Sheet 1
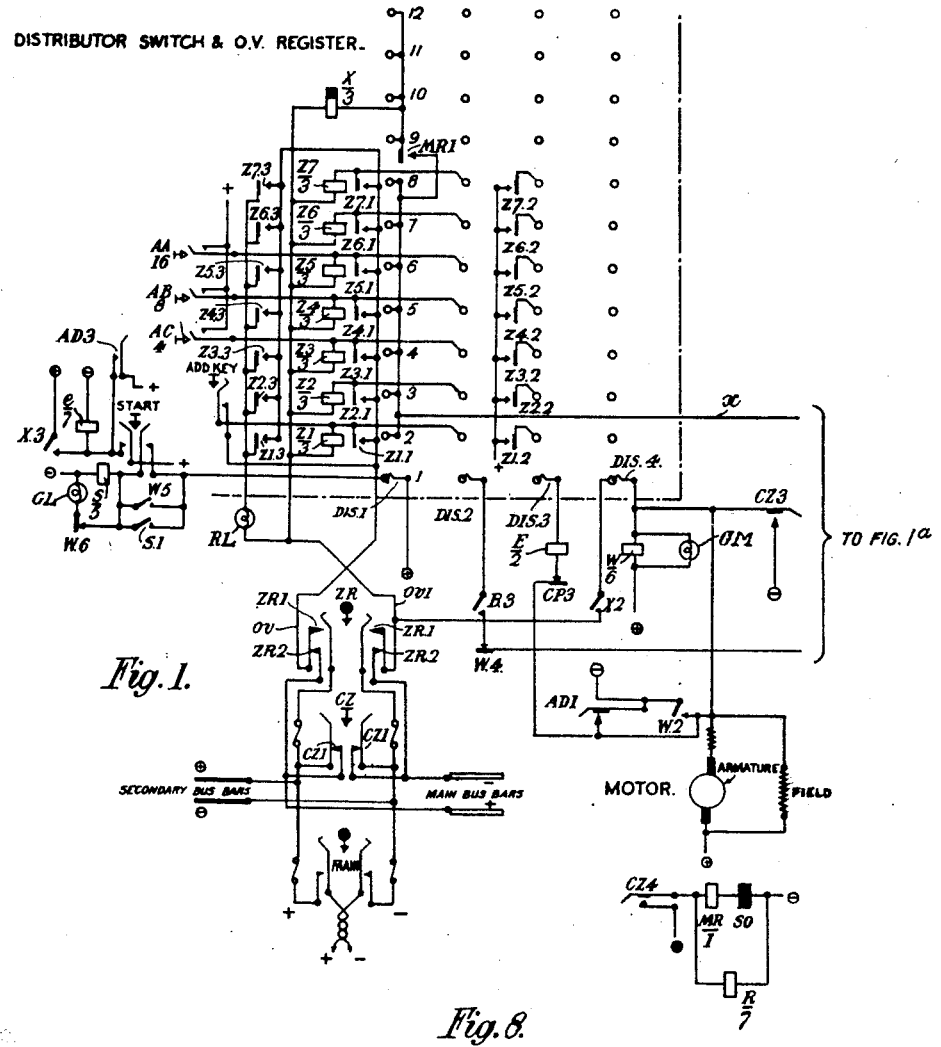

April 22, 1947.  F. R. SAXBY  2,419,502
MULTIPLYING MACHINE
Filed Feb. 16, 1944  32 Sheets-Sheet 2
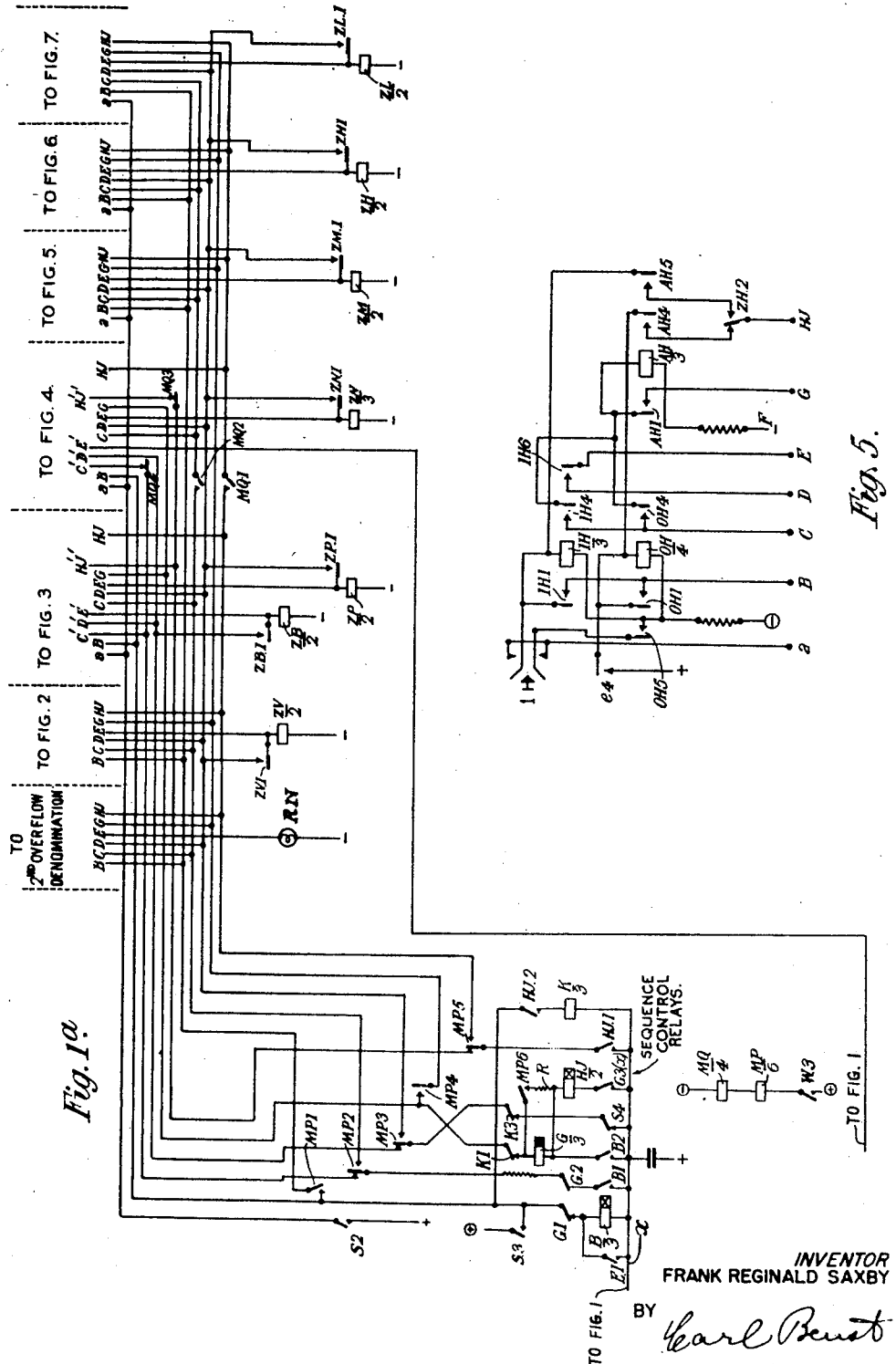
INVENTOR
FRANK REGINALD SAXBY
BY Earl Benst
HIS ATTORNEY

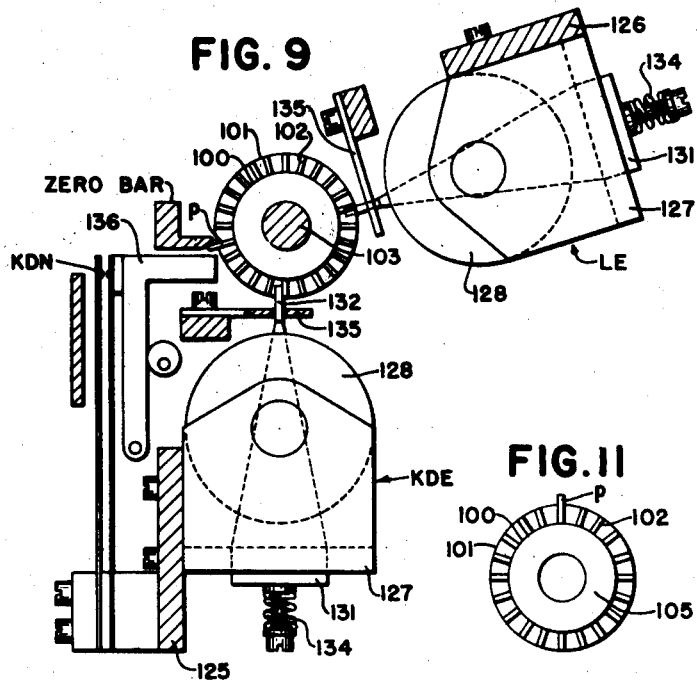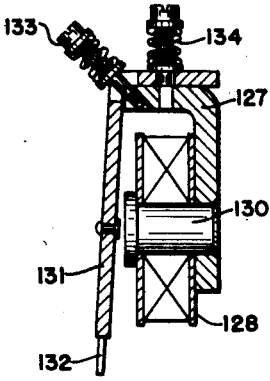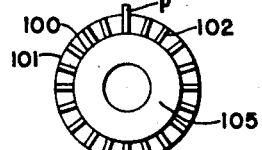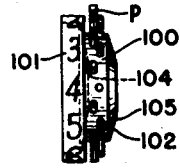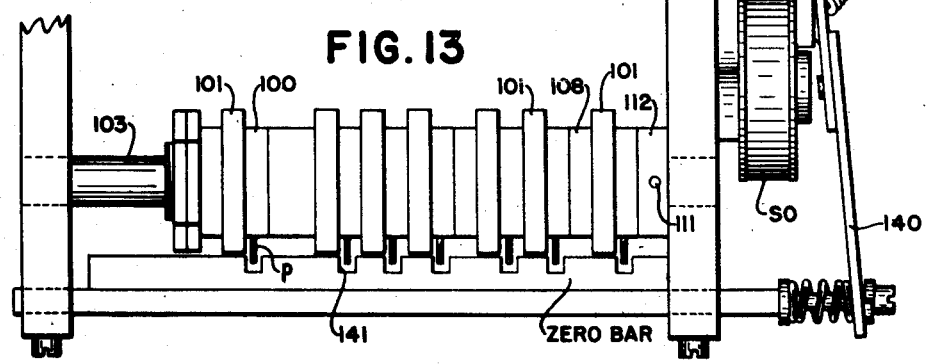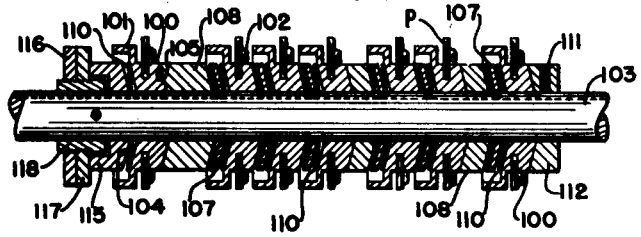

| Point | 1 | 2 | 3 | 4 | 5 | 6 | 7 | 8 |
|---|---|---|---|---|---|---|---|---|
| Counter Wheel - KD | | | | | | | | |
| Counter Wheel - L | | | | | | | | |
| Counter Wheel - H | | | | | | | | |
| Counter Wheel - M | | | | | | | | |
| Counter Wheel - N | | | | | | | | |
| Counter Wheel - P | | | | | | | | |
| Counter Wheel - V | | | | | | | | |
| Carry Over Relay - CKD | | | | | | | | |
| Carry Over Relay - CL | | | | | | | | |
| Carry Over Relay - CH | | | | | | | | |
| Carry Over Relay - CM | | | | | | | | |
| Carry Over Relay - CN | | | | | | | | |
| Carry Over Relay - CP | | | | | | | | |
| Carry Over Contact - KDN | | | | | | | | |
| Carry Over Contact - LN | | | | | | | | |
| Carry Over Contact - HN | | | | | | | | |
| Carry Over Contact - MN | | | | | | | | |
| Carry Over Contact - NN | | | | | | | | |
| Carry Over Contact - PN | | | | | | | | |
| Escapement Magnet - KDE | | | | | | | | |
| Escapement Magnet - LE | | | | | | | | |
| Escapement Magnet - HE | | | | | | | | |
| Escapement Magnet - ME | | | | | | | | |
| Escapement Magnet - NE | | | | | | | | |
| Escapement Magnet - PE | | | | | | | | |
| Carry Over Switch | | | | | | | | |
| Carry Over Wipers | | | | | | | | |
| Result Switch | | | | | | | | |
| Result Wipers | | | | | | | | |
| Motor | | | | | | | | |
| GM Lamp | | | | | | 7 | | |

FIG. 15A

April 22, 1947.    F. R. SAXBY    2,419,502
MULTIPLYING MACHINE
Filed Feb. 16, 1944    32 Sheets-Sheet 10

| | 9 | 10 | 11 |
|---|---|---|---|
| KD | | | |
| L | | | |
| H | | | |
| M | | | |
| N | | | |
| P | | | |
| V | | | |
| CKD | | | |
| CL | | | |
| CH | | | |
| CM | | | |
| CN | | | |
| CP | | | |
| KDN | | | |
| LN | | | |
| HN | | | |
| MN | | | |
| NN | | | |
| PN | | | |
| KDE | | | |
| LE | | | |
| HE | | | |
| ME | | | |
| NE | | | |
| PE | | | |
| COS | | | |
| COW | | | |
| RS | | | |
| RW | | | |
| M | | | |
| GML | 9 | 10 | 11 |

FIG. 15B

Inventor
FRANK REGINALD SAXBY
By
Carl Beust
His Attorney

FIG.15C

April 22, 1947.  F. R. SAXBY  2,419,502
MULTIPLYING MACHINE
Filed Feb. 16, 1944  32 Sheets-Sheet 13

FIG. 15E

Inventor
FRANK REGINALD SAXBY
By Carl Beust
His Attorney

FIG. 15H

| | |
|---|---|
| | Counter Wheel-KD |
| | Counter Wheel- L |
| | Counter Wheel- H |
| | Counter Wheel- M |
| | Counter Wheel- N |
| | Counter Wheel- P |
| | Counter Wheel- V |
| | Carry Over Relay-CKD |
| | Carry Over Relay- CL |
| | Carry Over Relay- CH |
| | Carry Over Relay- CM |
| | Carry Over Relay- CN |
| | Carry Over Relay- CP |
| | Carry Over Contact-KDN |
| | Carry Over Contact-LN |
| | Carry Over Contact-HN |
| | Carry Over Contact-MN |
| | Carry Over Contact-NN |
| | Carry Over Contact-PN |
| | Escapement Magnet- KDE |
| | Escapement Magnet-LE |
| | Escapement Magnet-HE |
| | Escapement Magnet-ME |
| | Escapement Magnet-NE |
| | Escapement Magnet-PE |
| | Carry Over Switch |
| | Carry Over Wipers |
| | Result Switch |
| | Result Wipers |
| | Motor |
| | G M Lamp |

Inventor
FRANK REGINALD SAXBY
By
*Karl Benst*
His Attorney

April 22, 1947. F. R. SAXBY 2,419,502
MULTIPLYING MACHINE
Filed Feb. 16, 1944 32 Sheets-Sheet 19

Inventor
FRANK REGINALD SAXBY
By
*Earl Benst*
His Attorney

| |
|---|
| RELAY- ZL |
| RELAY- ZH |
| RELAY- ZM |
| RELAY- ZN |
| RELAY- ZP |
| RELAY- ZB |
| Transfer Relay-KD |
| Transfer Relay-L |
| Transfer Relay-H |
| Transfer Relay-M |
| Transfer Relay-N |
| Transfer Relay-P |
| Digit Relay-KD |
| Digit Relay-L |
| Digit Relay-H |
| Digit Relay-M |
| Digit Relay-N |
| Digit Relay-P |
| Relay-T |
| Relay-CP |
| Relay-Q |
| Relay-F |
| Relay-E |
| Relay-MP |
| Relay-MQ |
| Relay-W |
| Relay-X |
| RL-Lamp |

Inventor
FRANK REGINALD SAXBY
By
His Attorney

April 22, 1947. F. R. SAXBY 2,419,502
MULTIPLYING MACHINE
Filed Feb. 16, 1944 32 Sheets-Sheet 26

Inventor
FRANK REGINALD SAXBY
By
His Attorney

April 22, 1947.  F. R. SAXBY  2,419,502

MULTIPLYING MACHINE

Filed Feb. 16, 1944  32 Sheets-Sheet 27

| | 22 | 23 |
|---|---|---|
| Z7 | | 24 |
| | | 25 |
| Z6 | | |
| Z5 | | |
| Z4 | | |
| Z3 | | |
| Z2 | | |
| Z1 | | |
| K | | |
| HJ | | |
| G | | |
| B | | |
| OP | | |
| KD | | |
| L | | |
| H | | |
| M | | |
| N | | |
| e | | |
| GL | | |
| S | | |
| DS | 4 | |
| DW | | |
| SK | | |
| MK | 22 | 23 |
| | | 24 |
| | | 25 |

FIG.15V

Inventor
FRANK REGINALD SAXBY
By
*Earl Beust*
His Attorney

April 22, 1947.    F. R. SAXBY    2,419,502
MULTIPLYING MACHINE
Filed Feb. 16, 1944    32 Sheets-Sheet 28

Inventor
FRANK REGINALD SAXBY
By
Earl Benst
His Attorney

April 22, 1947.  F. R. SAXBY  2,419,502
MULTIPLYING MACHINE
Filed Feb. 16, 1944  32 Sheets-Sheet 29

Inventor
FRANK REGINALD SAXBY
By
*Earl Beust*

His Attorney

April 22, 1947.  F. R. SAXBY  2,419,502
MULTIPLYING MACHINE
Filed Feb. 16, 1944  32 Sheets-Sheet 30

| 15A | 15B | 15C | 15D | 15E | 15F | 15G | 15H |
|-----|-----|-----|-----|-----|-----|-----|-----|
| 15J | 15K | 15L | 15M | 15N | 15P | 15Q | 15R |
| 15S | 15T | 15U | 15V | 15W | 15X | 15Y | 15Z |

Inventor
FRANK REGINALD SAXBY
By Carl Benst
His Attorney

April 22, 1947.   F. R. SAXBY   2,419,502
MULTIPLYING MACHINE
Filed Feb. 16, 1944    32 Sheets-Sheet 31

Inventor
FRANK REGINALD SAXBY
By
His Attorney

April 22, 1947.  F. R. SAXBY  2,419,502
MULTIPLYING MACHINE
Filed Feb. 16, 1944  32 Sheets-Sheet 32

Inventor
FRANK REGINALD SAXBY
By
Earl Benst
His Attorney

Patented Apr. 22, 1947

2,419,502

UNITED STATES PATENT OFFICE 2,419,502

MULTIPLYING MACHINE

Frank Reginald Saxby, London, England, assignor to The National Cash Register Company, Dayton, Ohio Application February 16, 1944, Serial No. 522,581
In Great Britain March 2, 1943

34 Claims. (Cl. 235—61)

This invention relates to multiplying machines.

In a known method of multiplication, one factor (the multiplier) is successively halved (ignoring fractions) until unity is reached so as to form a convergent series, the terms of which are obtained from the multiplier as a common factor divided by successively increasing powers of two from zero, and the other factor (the multiplicand) is successively doubled in a number of steps equal to the number of steps taken to arrive at unity in the convergent series so as to form a divergent series, the terms of which are obtained from the multiplicand as a common factor multiplied by successively increasing powers of two from zero, a product being formed by summing those selected terms of the divergent series which correspond to (i. e. are related to the same power of two as) the odd value terms of the convergent series.

This method of forming a product is illustrated by an example given below.

EXAMPLE 1

Assume it is desired to multiply 123 by 45. These factors are written side by side as basic terms of the convergent and divergent series and the other terms are written therebeneath. The two series are formed by successively halving the basic term in one column ignoring fractions and successively doubling the basic term in the other column until unity is reached in the halving column. In other words the multiplier is divided by two and the quotient thus obtained is also divided by two, this process being repeated until unity is reached. Similarly the multiplicand is multiplied by two and the product thus obtained is also multiplied by two and so on, the doubling ceasing when the same number of steps have been completed as is necessary to reduce the multiplier to unity. If those pairs of numbers which have an even number in the "halving" column are struck out, the remaining numbers in the "doubling" column when added together equal the product.

```
123      45
 61      90
 3̶0̶     1̶8̶0̶
 15     360
  7     720
  3    1440
  1    2880
       ____
       5535 = product of 123×45
```

Upon analysis it will be seen that successive numbers in the "doubling" column or divergent series are given by $45 \times 2^n$, where the power $n$ ascends in units from 0, since $2^0=1$, to $n$, where $n$ represents the number of halving operations required to reduce the left hand factor to unity. If the $(r+1)$ the number in the "halving" column or convergent series is even ($r$ being any number in the series $0, 1, 2 \ldots n-1, n$) then $2^r$ will not occur when the number at the head of this column (the multiplier) is expressed in the binary notation, but if the $(r+1)$th number in the convergent series is odd then $2^r$ will occur when the multiplier is expressed in binary notation. Therefore, the sum at the foot of the divergent series (omitting the numbers which have even corresponding numbers in the convergent series) is equal to the product of the multiplicand and the sum of all values of $2^n$ which occur when the multiplier is expressed in the binary notation.

Thus the expansion for 123, when expressed in the binary notation, is $2^0+2^1+2^3+2^4+2^5+2^6$, the absent term $2^2$ being that corresponding to the even term in the convergent series set out in the halving column.

Example 1 above illustrates the method where each of the factors is expressed in the decimal notation but the method is equally applicable where one of the factors is non-decimal in character such as in sterling currency. An example wherein the multiplier is a decimal number and the multiplicand is a sterling amount is given below:

EXAMPLE 2

Assume it is desired to multiply £1. 12s. 4d. by 184. These factors are set out and treated precisely as described with reference to Example 1, thus:

```
            £. s. d.
1̶8̶4̶       1̶.1̶2̶.4̶.
 9̶2̶        3̶. 4̶.8̶.
 4̶6̶        6̶. 9̶.4̶.
 23       12.18.8.
 11       25.17.4.
  5       51.14.8.
  2̶       1̶0̶3̶. 9̶.4̶.
  1      206.18.8.
         _____
         297. 9.4. = product of
                    £1.12.4.×184.
```

The expansion for 184, when expressed in the binary notation, is $2^3+2^4+2^5+2^7$, and it will again be noted that the missing terms in the series of progressively ascending powers of two are those corresponding to the even terms of the convergent series set out in the halving column.

British Patent No. 501,538 describes a multiplying machine operating in accordance with this method in which corresponding terms of the convergent and divergent series are formed simultaneously.

The present invention provides a multiplying machine, comprising means for forming in succession the terms of the convergent series obtained by dividing (ignoring fractions in the resultant quotients) the multiplier by successive ascending powers of two commencing with the zero power thereof and continuing until unity is reached, an odd values register for registering the occurrence of each odd valued term in said convergent series, means operable subsequently to form in succession the terms of the divergent series obtained by multiplying the multiplicand by the same successive ascending powers of two, and means controlled by the odd values register for entering in an accumulator those terms of the divergent series which correspond to (i. e. are related to the same power of two as) the odd valued terms of the convergent series.

The machine according to the invention thus differs from that described in the aforementioned prior patent in that the formation of the terms of the divergent series takes place after the completion of the formation of the terms of the convergent series. This has two important advantages. Firstly it is possible, as hereinafter more fully explained, to retain in the odd values register an analysis of the multiplier after the accumulator has been zeroized, and so utilize a common multiplier for successive operation on a series of different multiplicands without having to repeat during the calculation of each product the operations of entering the multiplier and progressively halving it to form the convergent series. Secondly it is possible to utilize a common factor register for the entry both of the multiplier and of the multiplicand.

The invention further provides a multiplying machine, comprising a factor register common to the two factors to be multiplied, means for forming in succession in the factor register the terms of the convergent series obtained by dividing (ignoring fractions in the resultant quotients) the multiplier by successive ascending powers of two, commencing with the zero power thereof and continuing until unity is reached, means operative thereafter to form in succession in the factor register the terms of the divergent series obtained by multiplying the multiplicand by the same successive ascending powers of two, and an odd values register operative during the formation of the convergent series to set up controls which, during the formation of the divergent series, will be effective to enter into an accumulator those terms of the divergent series which correspond to (i. e. are related to the same power of two as) the odd valued terms of the convergent series.

In the preferred form of the invention the factor register comprises groups of electrical relays for each denomination of the original factors and also for possible additional denominations of any of the terms of the divergent series, one or more of the denominational groups of relays serving first to form the terms of the convergent series and thereafter, if necessary in conjunction with other denominational groups of relays, to form the terms of the divergent series, digital values in any denomination being represented solely by relays.

Preferably also the odd values register comprises a series of automatically lockable relays, one allocated to each term of the convergent series.

It will be understood that the odd values register, which registers the occurrence of odd value terms in the convergent series, in effect sets up a representation of the multiplier when expressed in the binary notation, seeing that it records those terms which are present when the multiplier is expressed in the form of the series $$2^0+2^1+2^2+ \ldots +2^n$$

As will be explained later, provision may be made for direct entry into the odd values register of the required expression of the multiplier in the binary notation, as an alternative to setting up this expression by progressive halving of the multiplier.

The invention therefore includes a multiplying machine comprising a register having a series of elements, each of which is representative of one of a series of successively ascending powers of two commencing with the zero power thereof, means for setting up in the register an expression of the multiplier in the binary notation by operation of the appropriate elements of said register, means operative thereafter to form those terms of the divergent series, obtained by multiplying the multiplicand by successive ascending powers of two starting with the zero power thereof, which corresponds to (i. e. are related to the same power of two as) the operated elements of the register aforesaid, and means for entering said terms of the divergent series in an accumulator.

In order to enable the invention to be understood more fully, one specific embodiment for obtaining a product from two factors of which one is a sterling value, wherein the majority of the apparatus is electrical in character, will be described by way of example, although it is to be understood that a machine wherein the whole or a major portion thereof is purely mechanical in character falls equally well within the broad scope of the invention.

In the accompanying drawings,

Figs. 1, 1A, and 1B show the general circuit arrangement of the complete apparatus, excluding the factor register, Figs. 2-7 show the portions of the factor register allocated respectively to the following denominations of the multiplicand and of the divergent series formed therefrom: hundreds of pounds, tens of pounds, units of pounds, tens of shillings, units of shillings, and pence, the portions of the factor register shown in Figs. 3 and 4 serving also for the tens and units denomination respectively of the multiplier. The factor register includes a further denomination (not illustrated) allocated to thousands of pounds, the circuit connections whereof are similar to those shown in Fig. 2.

Fig. 8 shows the conventions used in the drawings.

Fig. 9 is a sectional view, taken through the accumulator, showing in particular the pence numeral wheel and its controls.

Fig. 10 is a sectional view of one of the escapement magnets.

Fig. 11 is a side elevation of a decimal numeral wheel.

Fig. 12 is a front elevation of a decimal numeral wheel.

Fig. 13 is a view of a portion of the accumulator, showing in particular the zero stop bar, its relation to the numeral wheels, and the means which operates the zero stop bar in a clearing operation. In this figure, only one stop pin "p" is shown on the H wheel, and only the stop pins "p" are shown on the other wheels.

Fig. 14 is a sectional view of a portion of the accumulator, showing in particular the friction drive for the numeral wheels.

Figs. 15A through 15H, 15J through 15N, and Figs. 15P through 15Z, taken together, form a sequence chart which shows the status of the several relays, magnets, and keys at various stages of an operation of the machine.

Figure 15C:
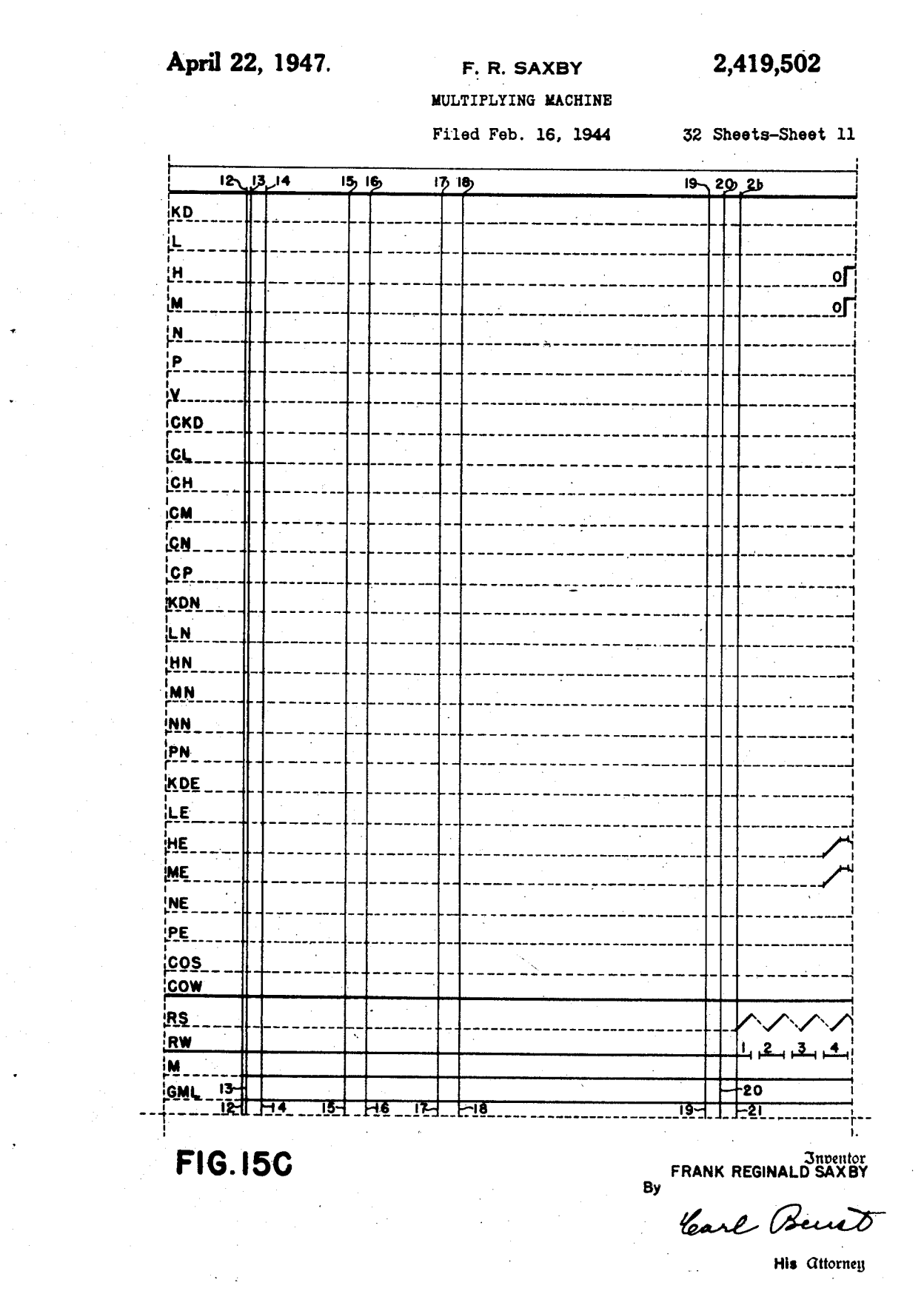
Figure 15D:
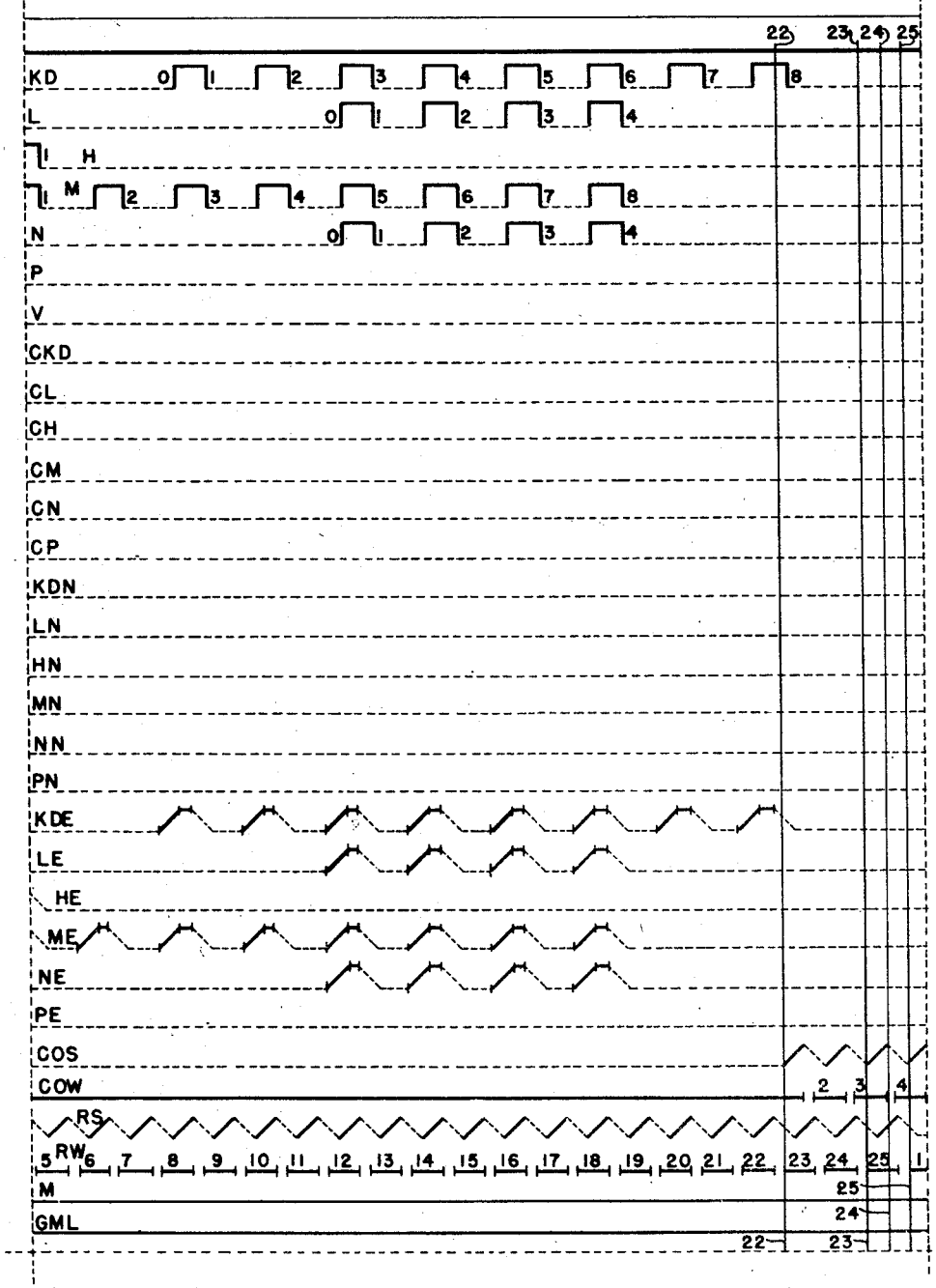
Figure 15F:
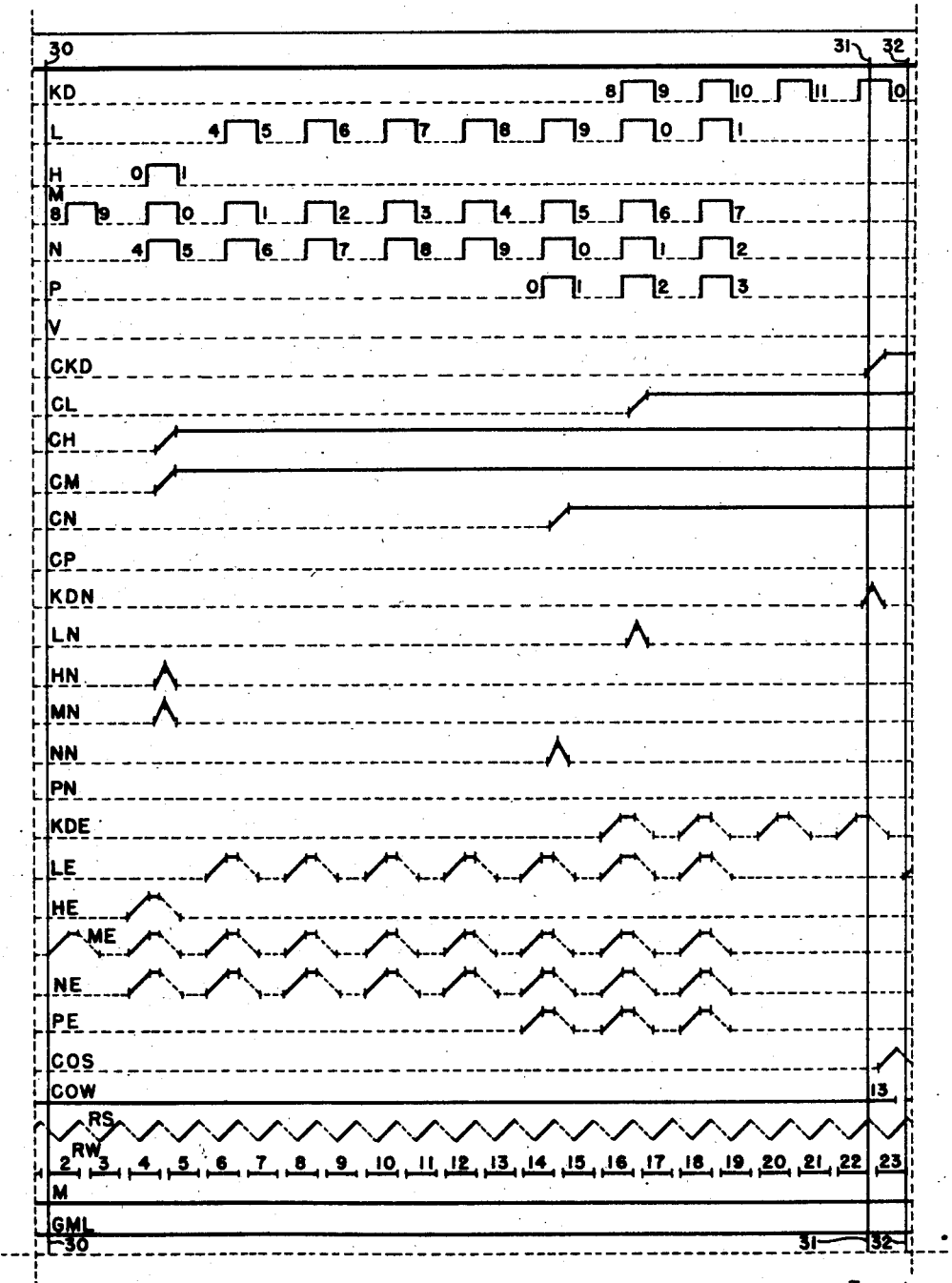
Figure 15G:
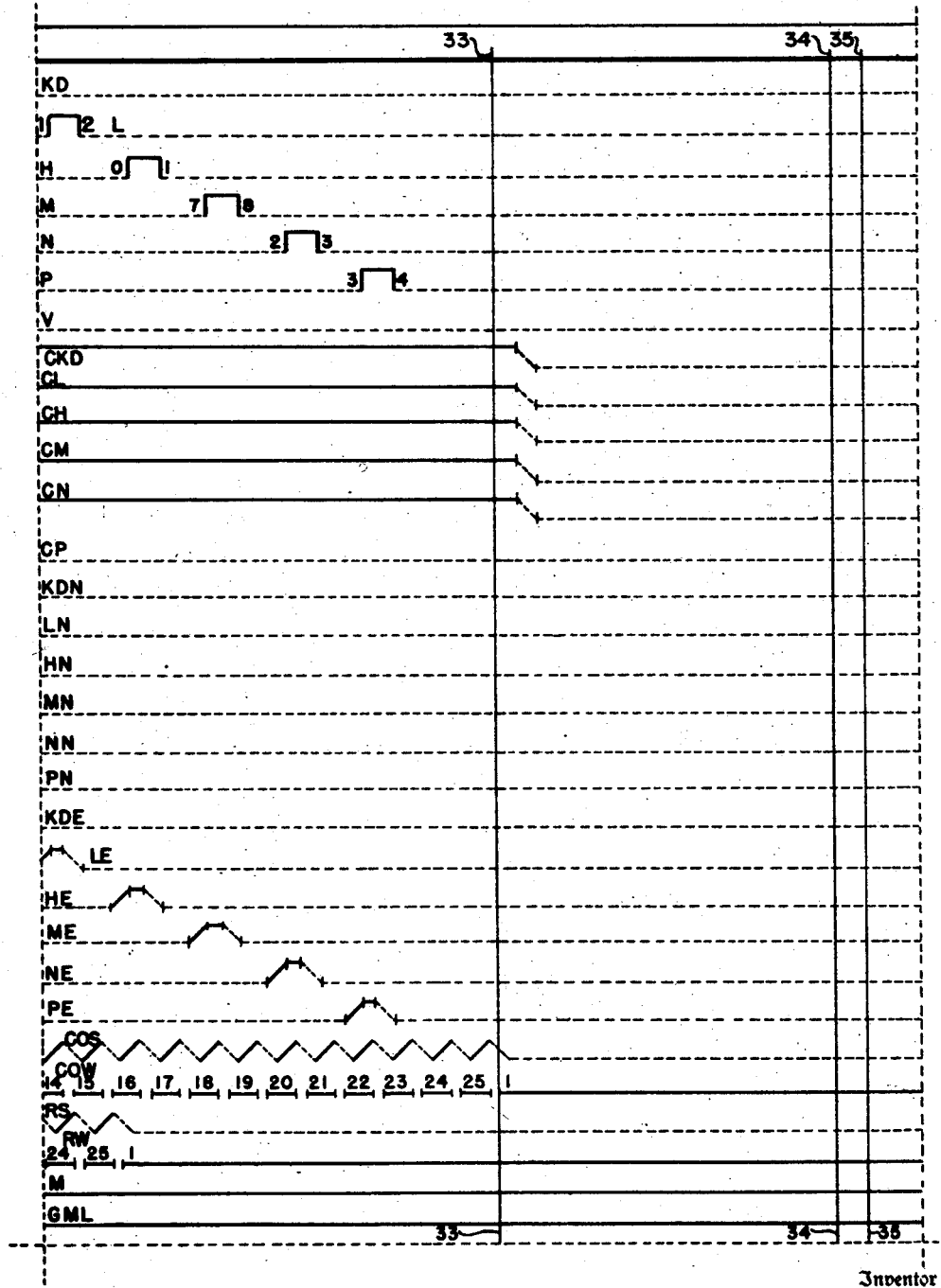
Figure 15J:
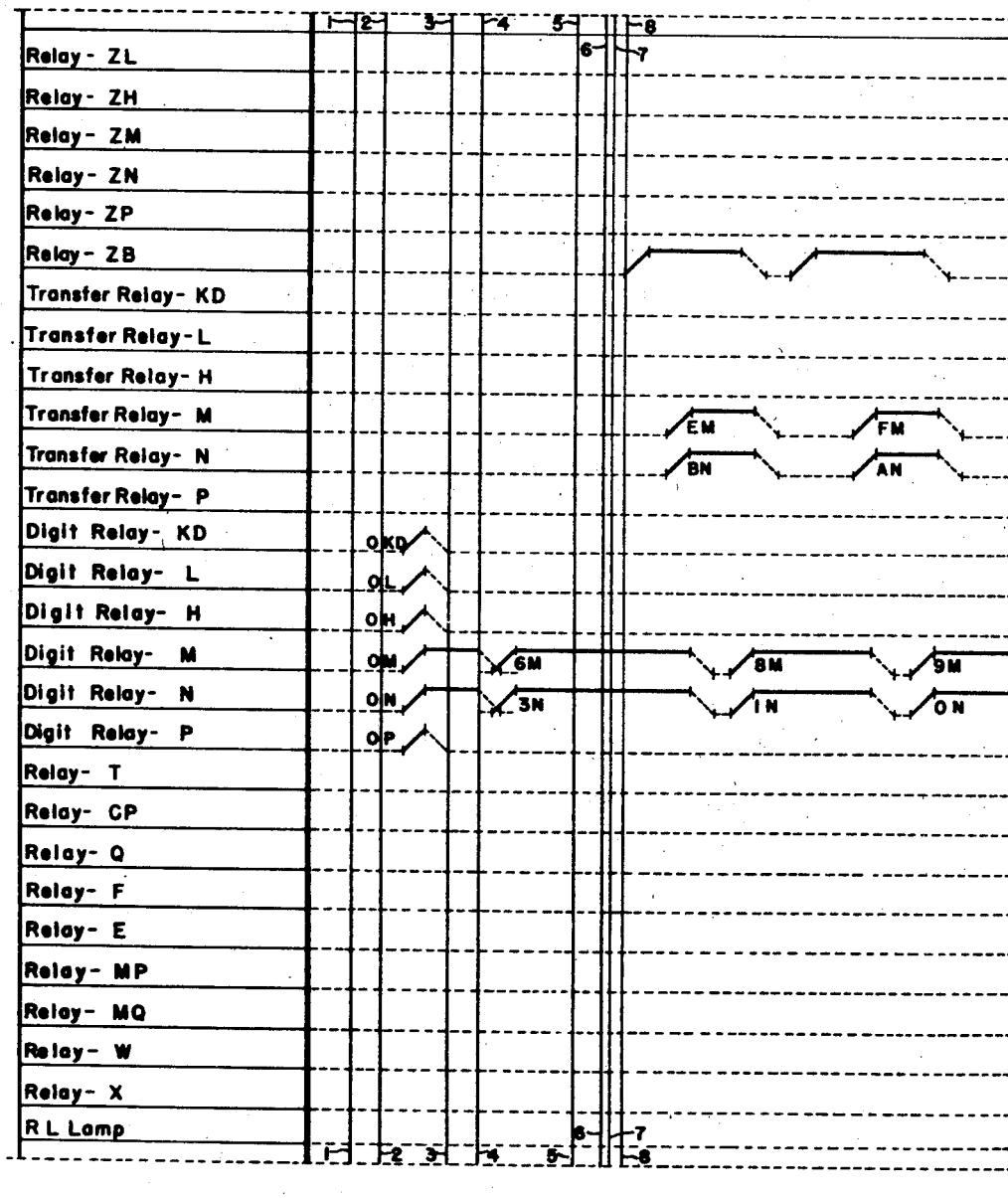
Figure 15K:
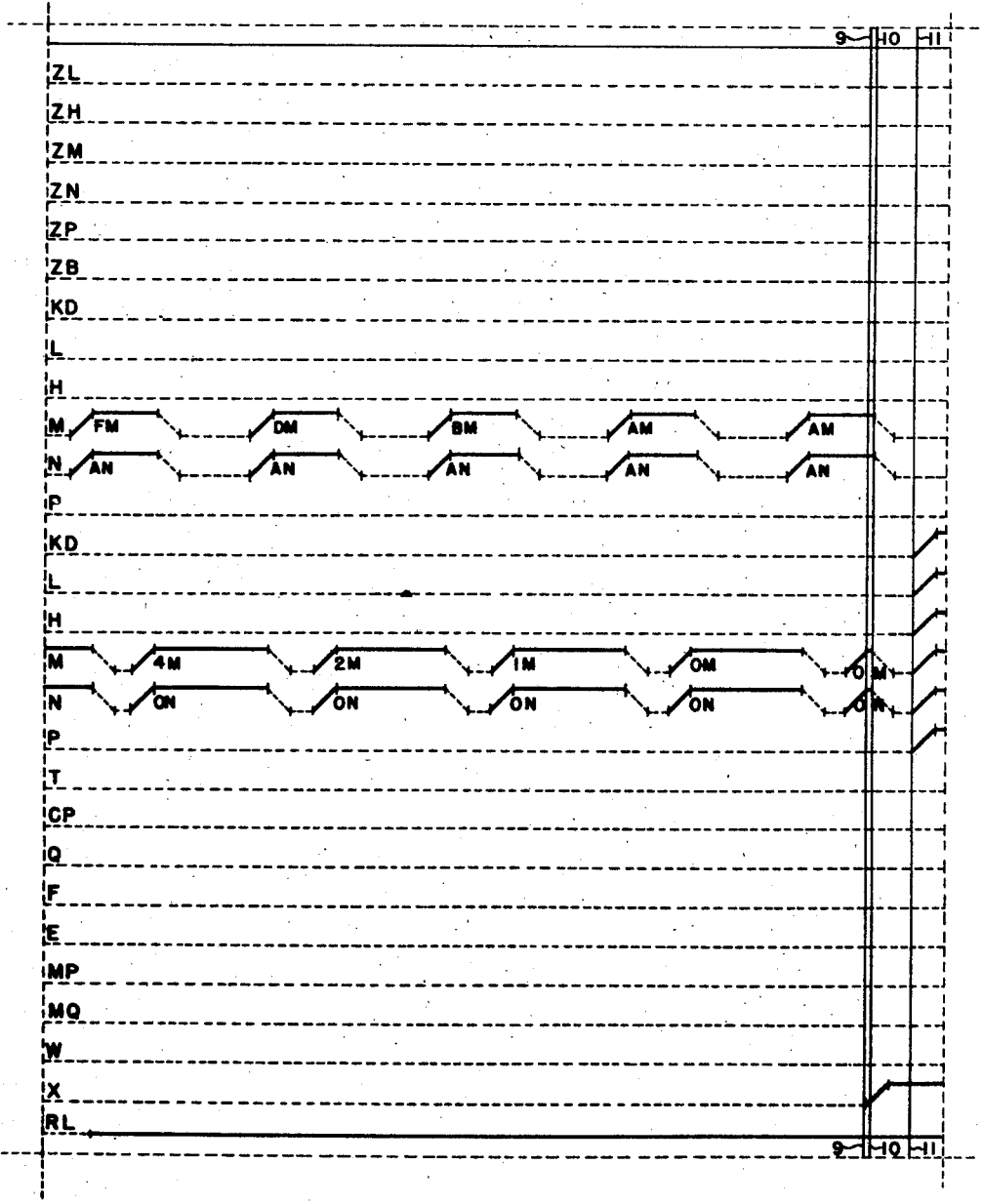
Figure 15L:
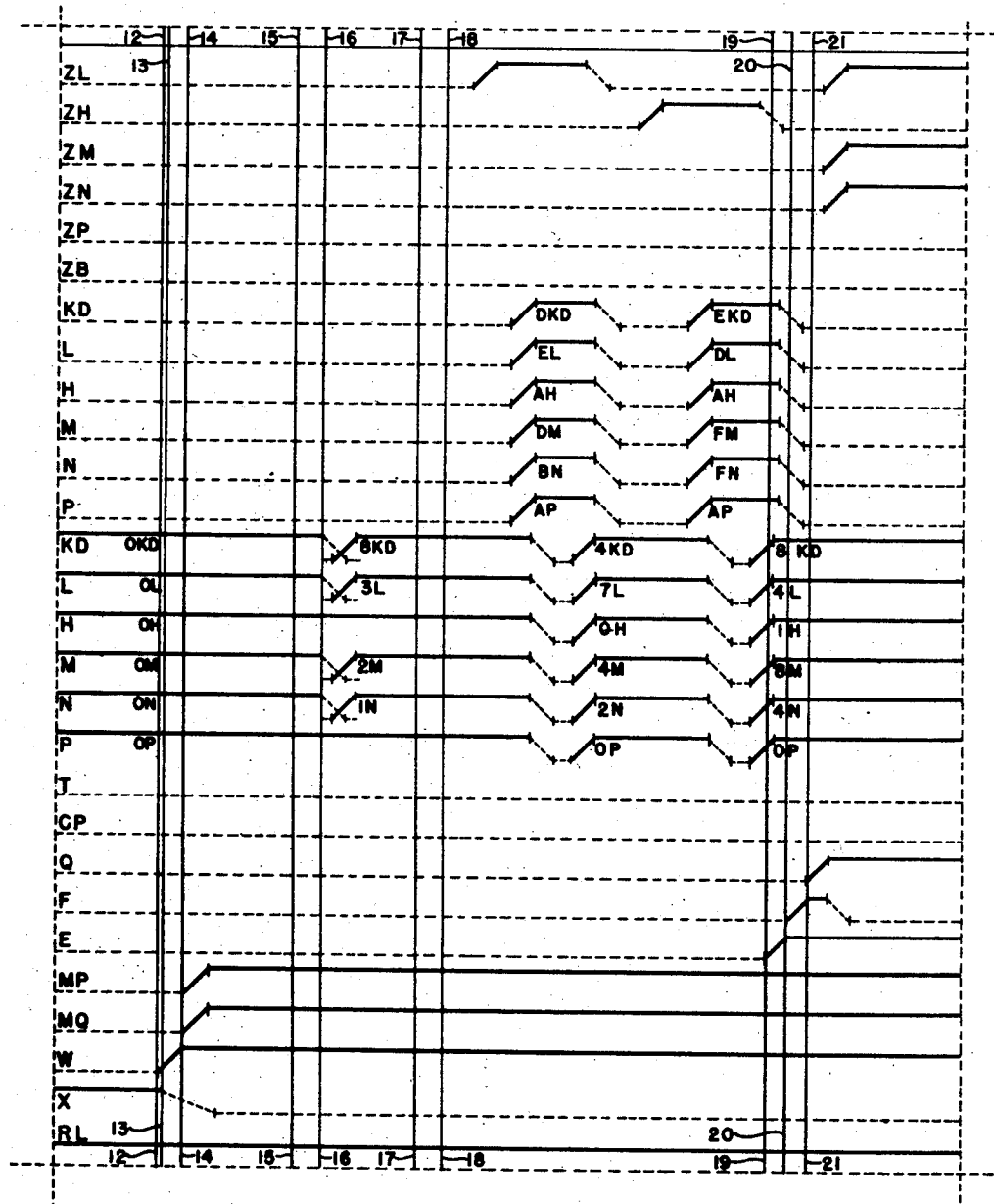
Figure 15M:
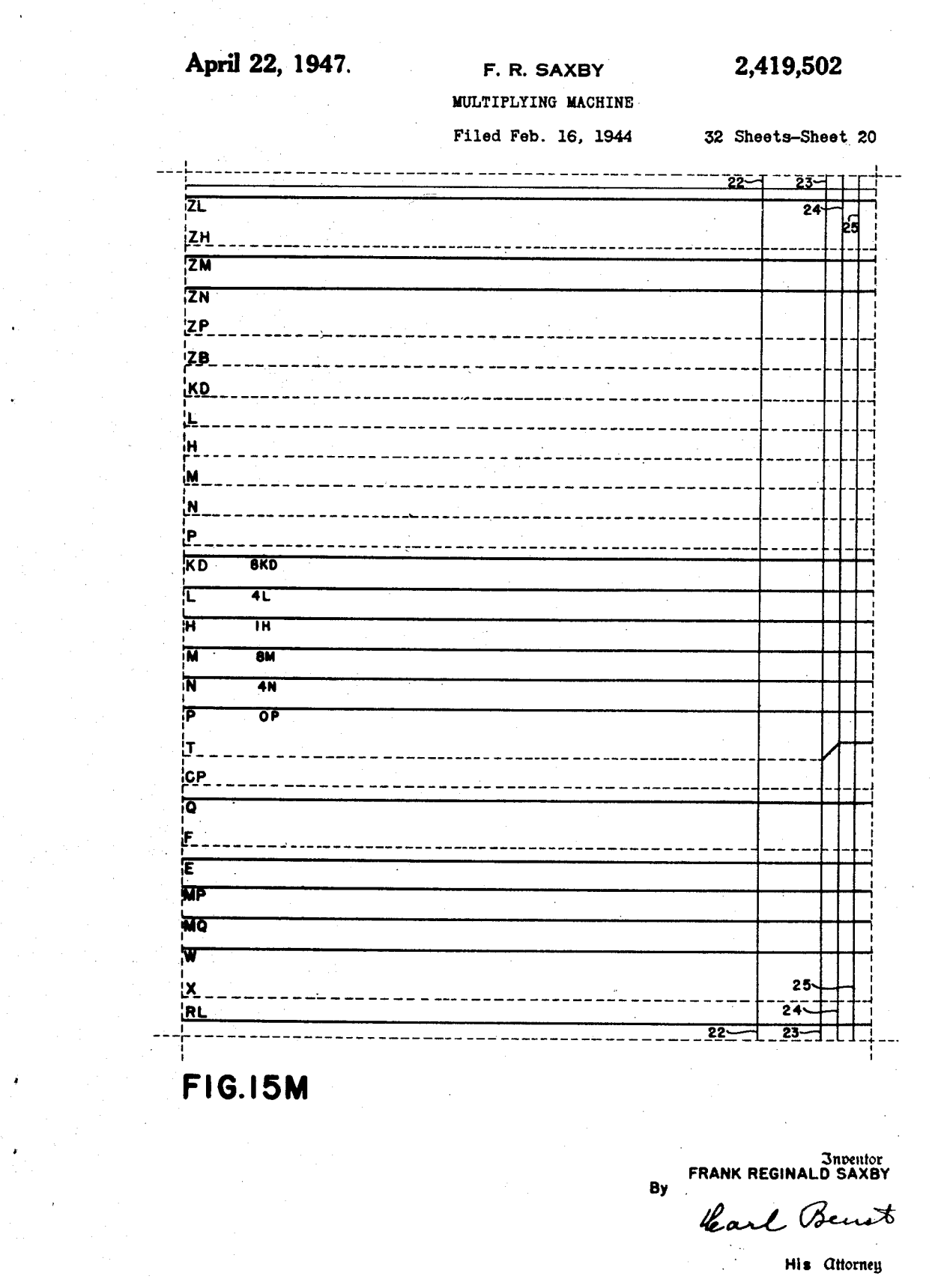
Figure 15N:
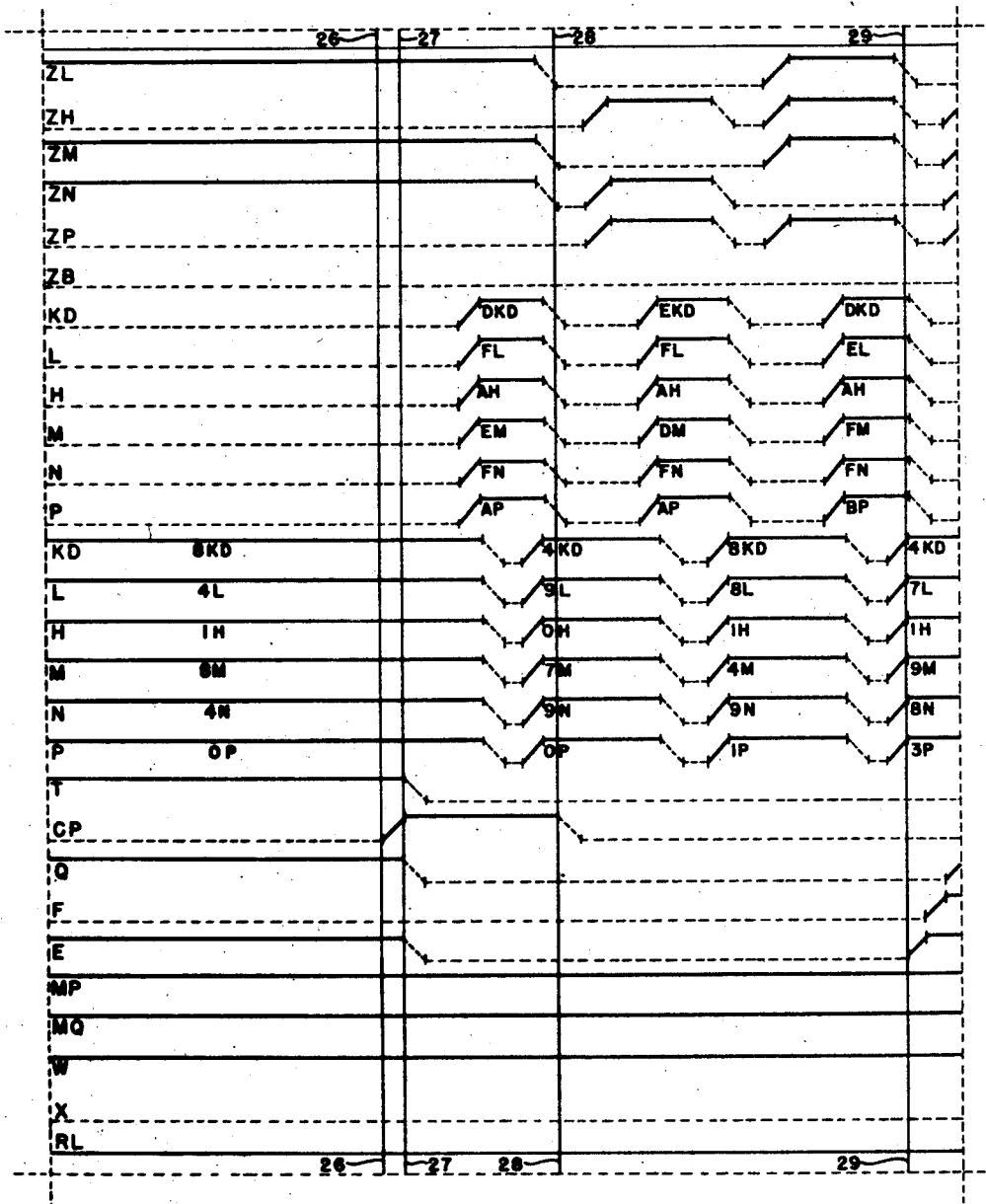
Figure 15P:
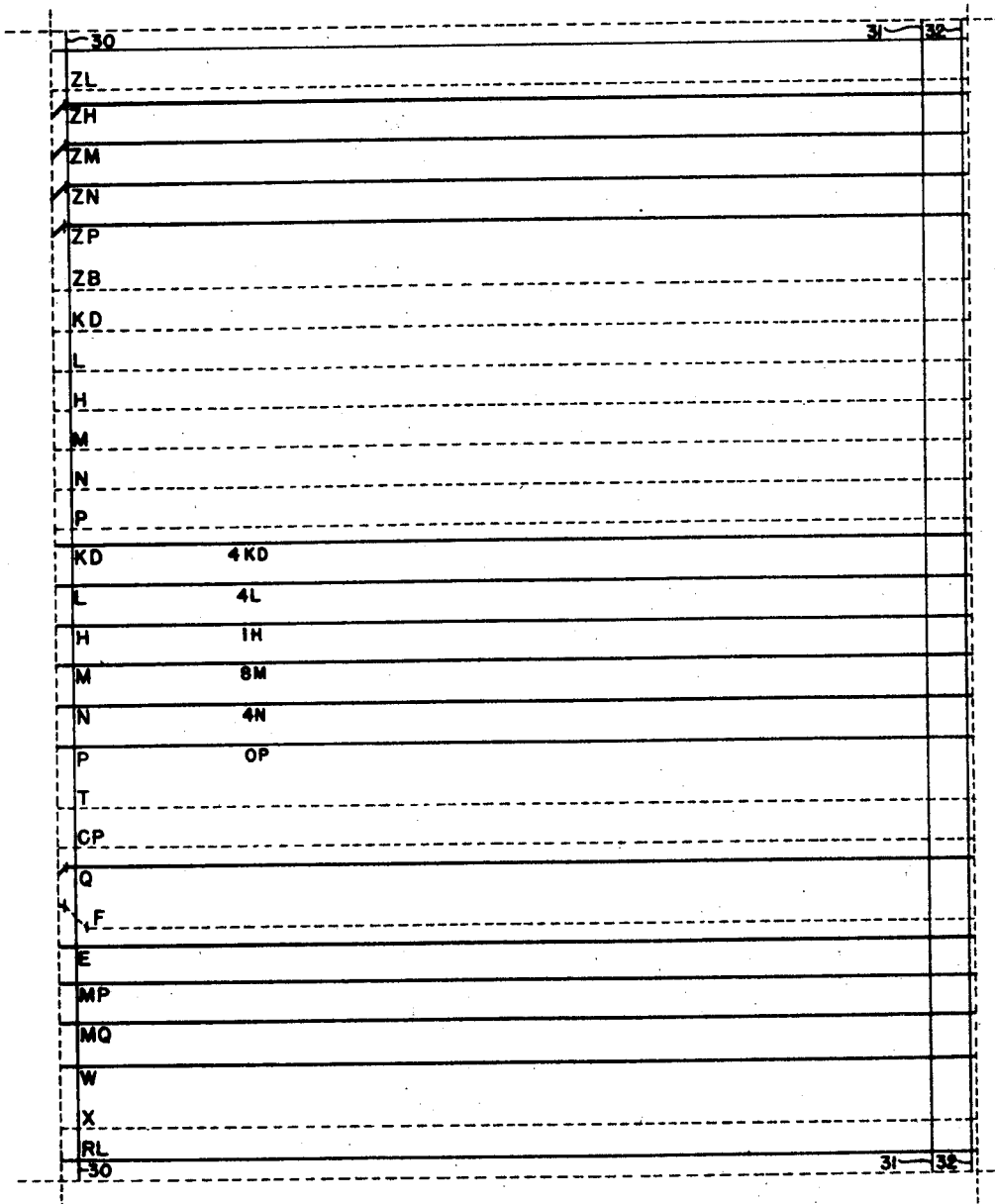
Figure 15Q:
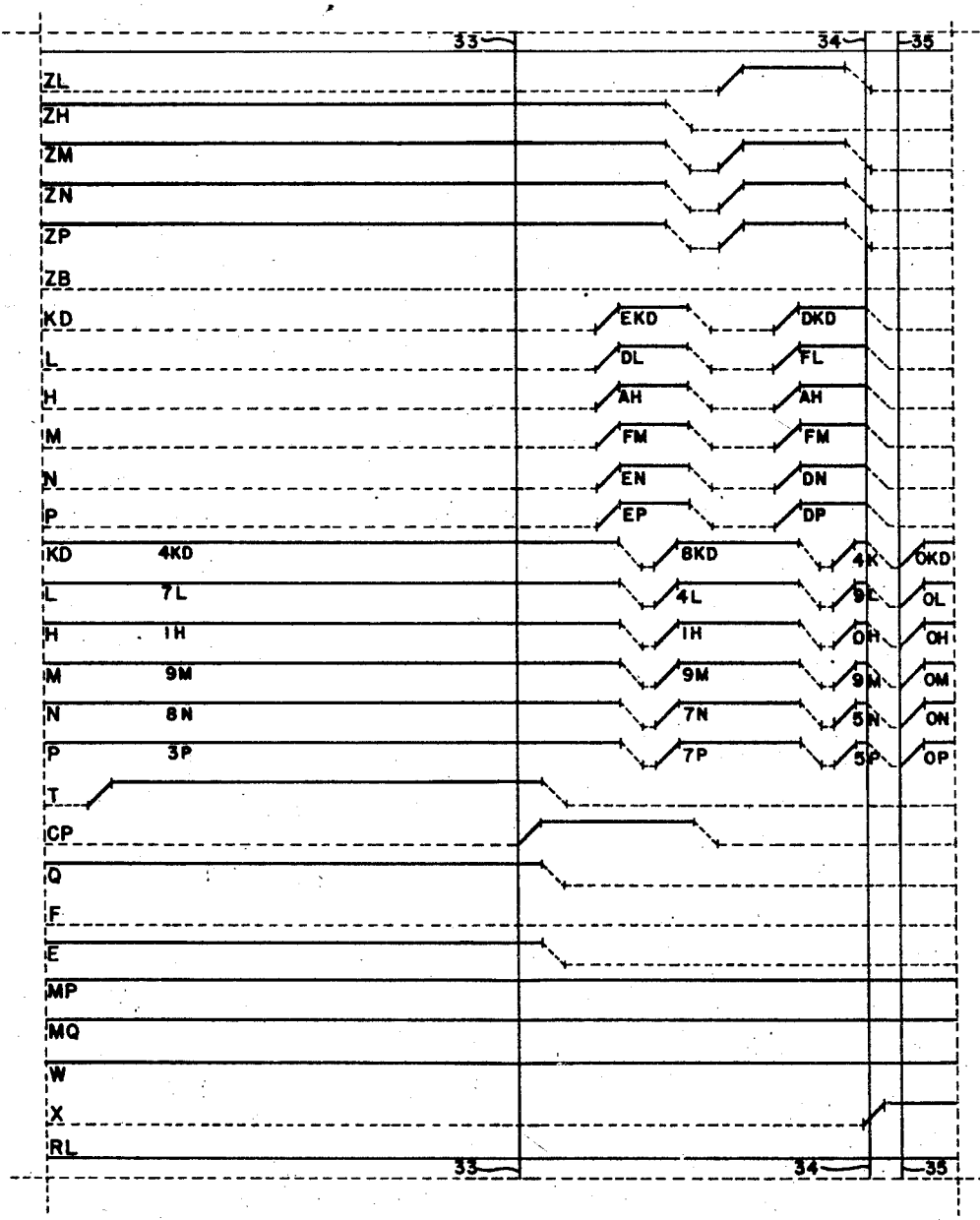
Figure 15S:
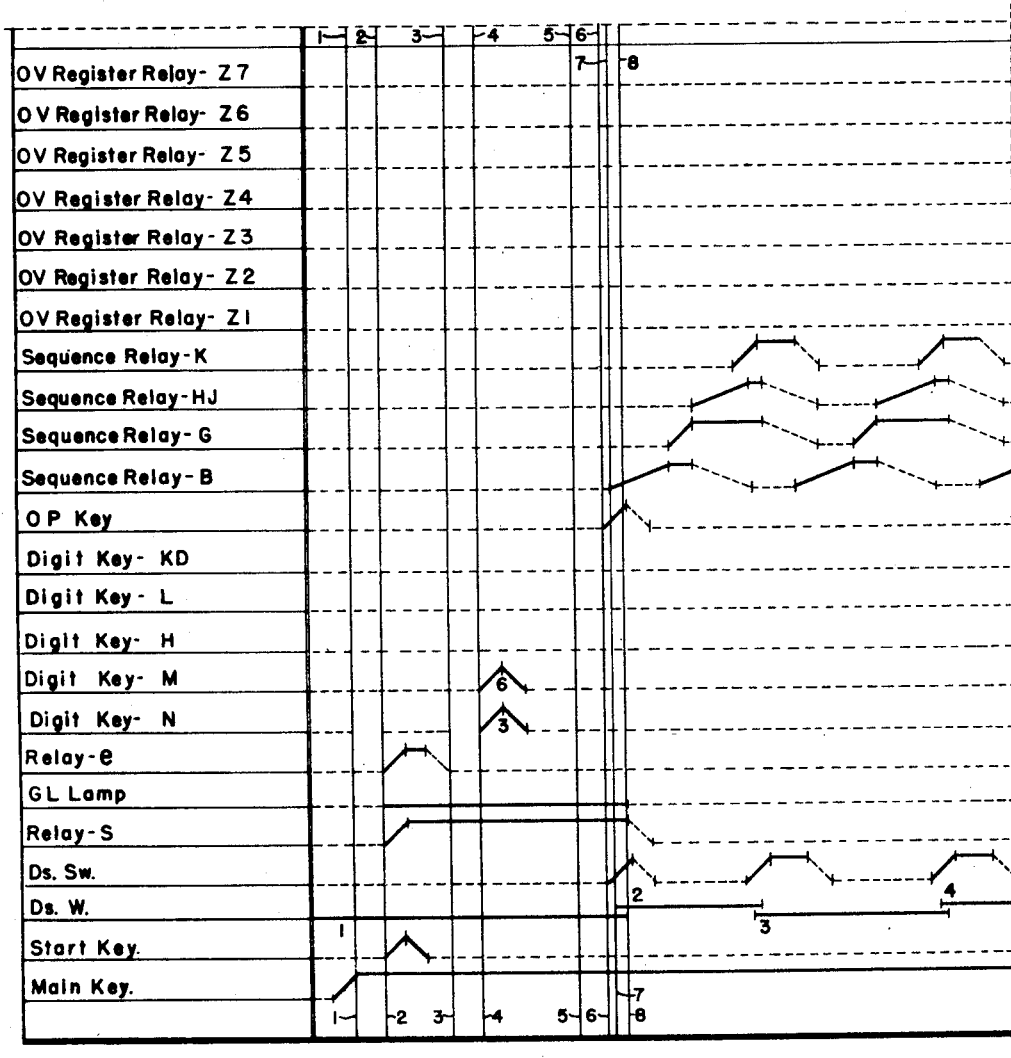
Figure 15T:
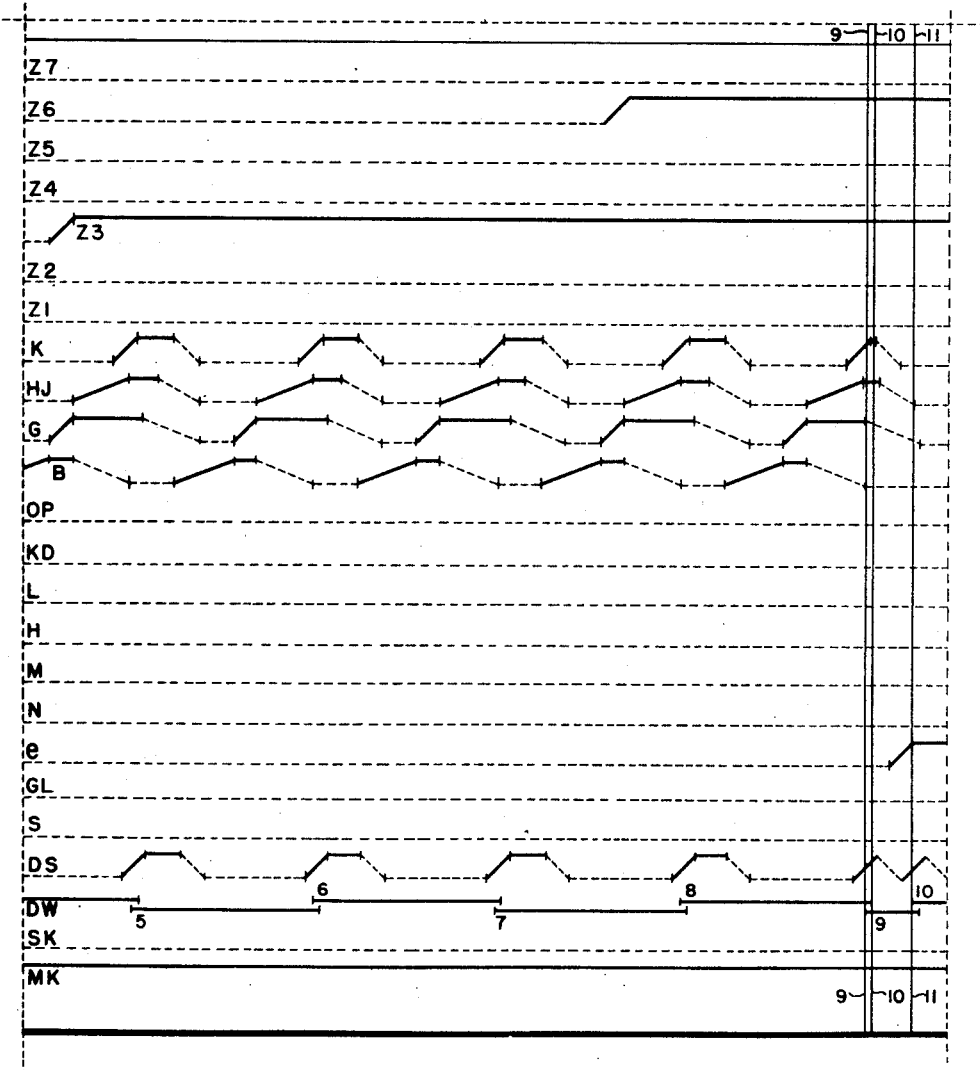
Figure 15U:
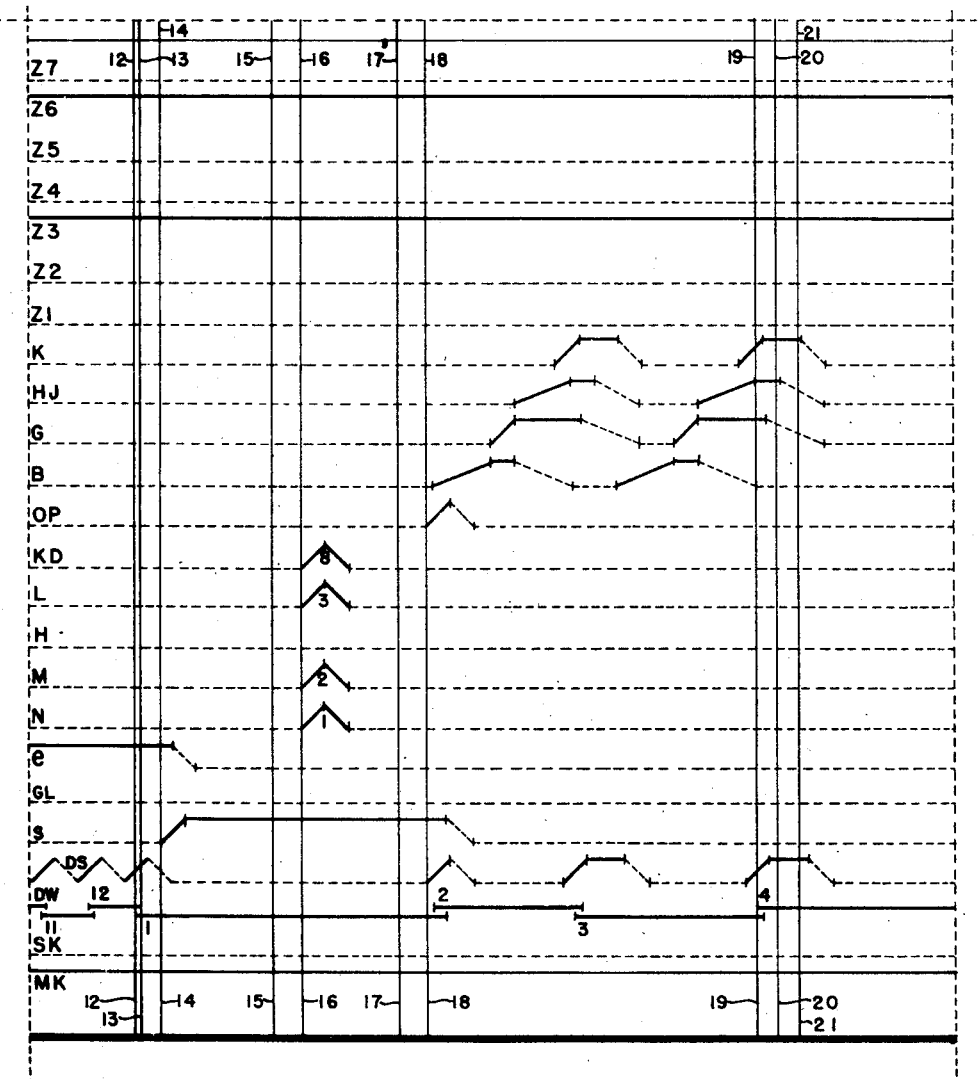
Figure 15W:
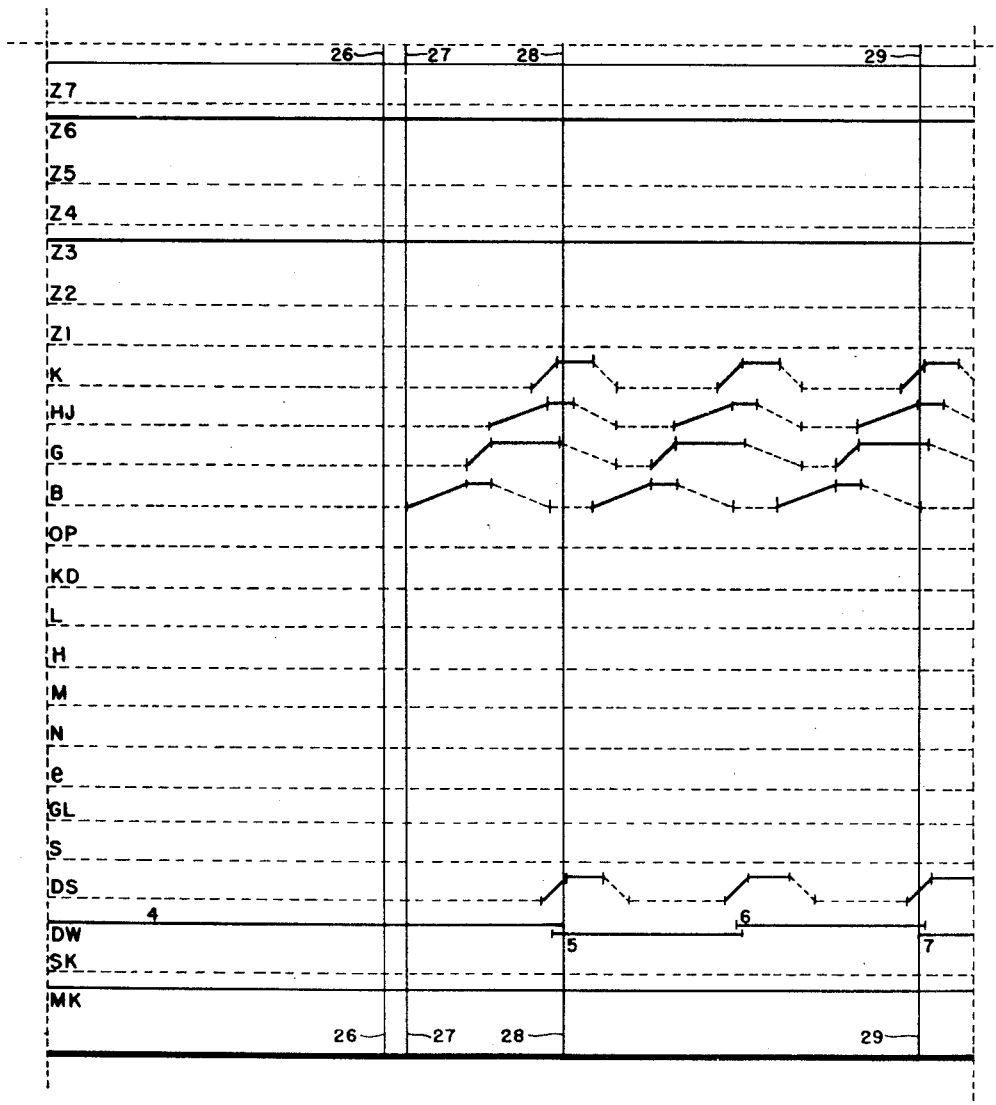
Figures 15Z, 16:
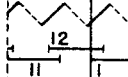
Figure 15Y:
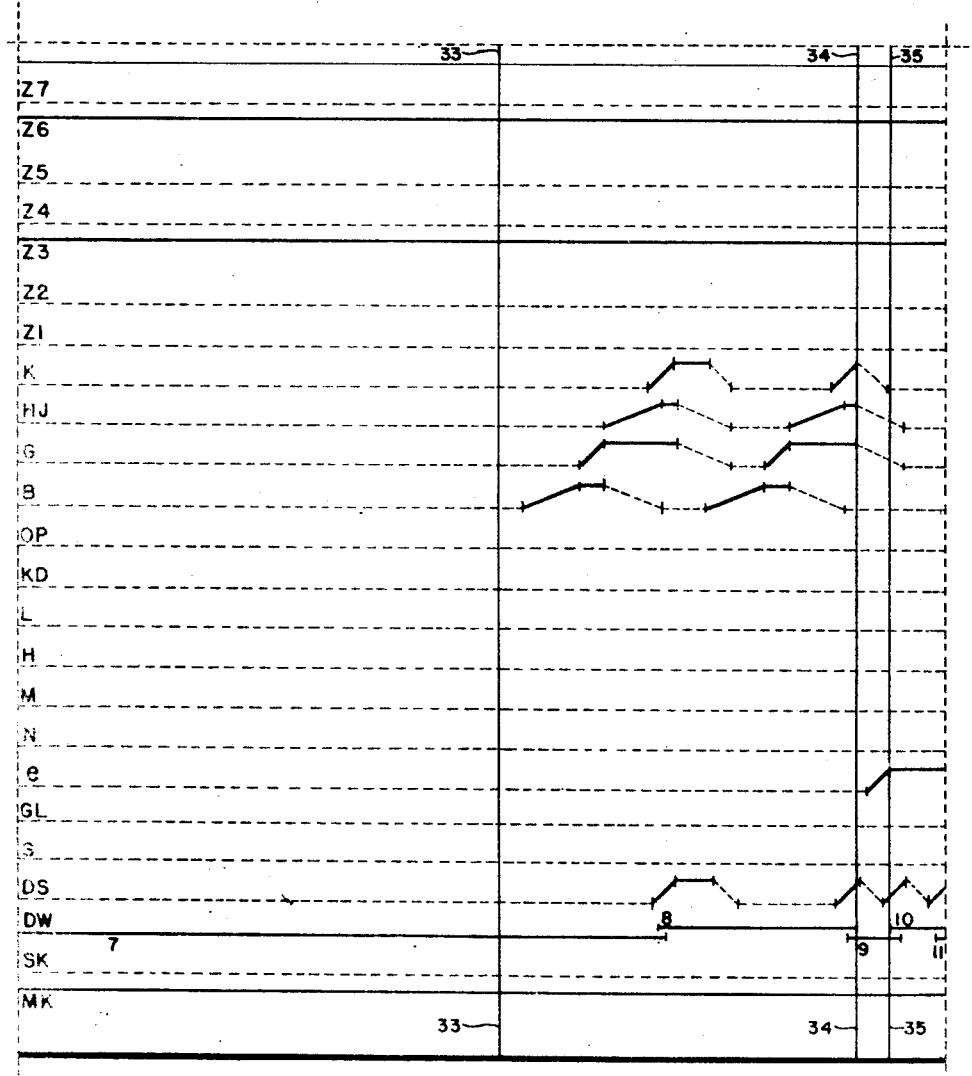
Figure 15X:
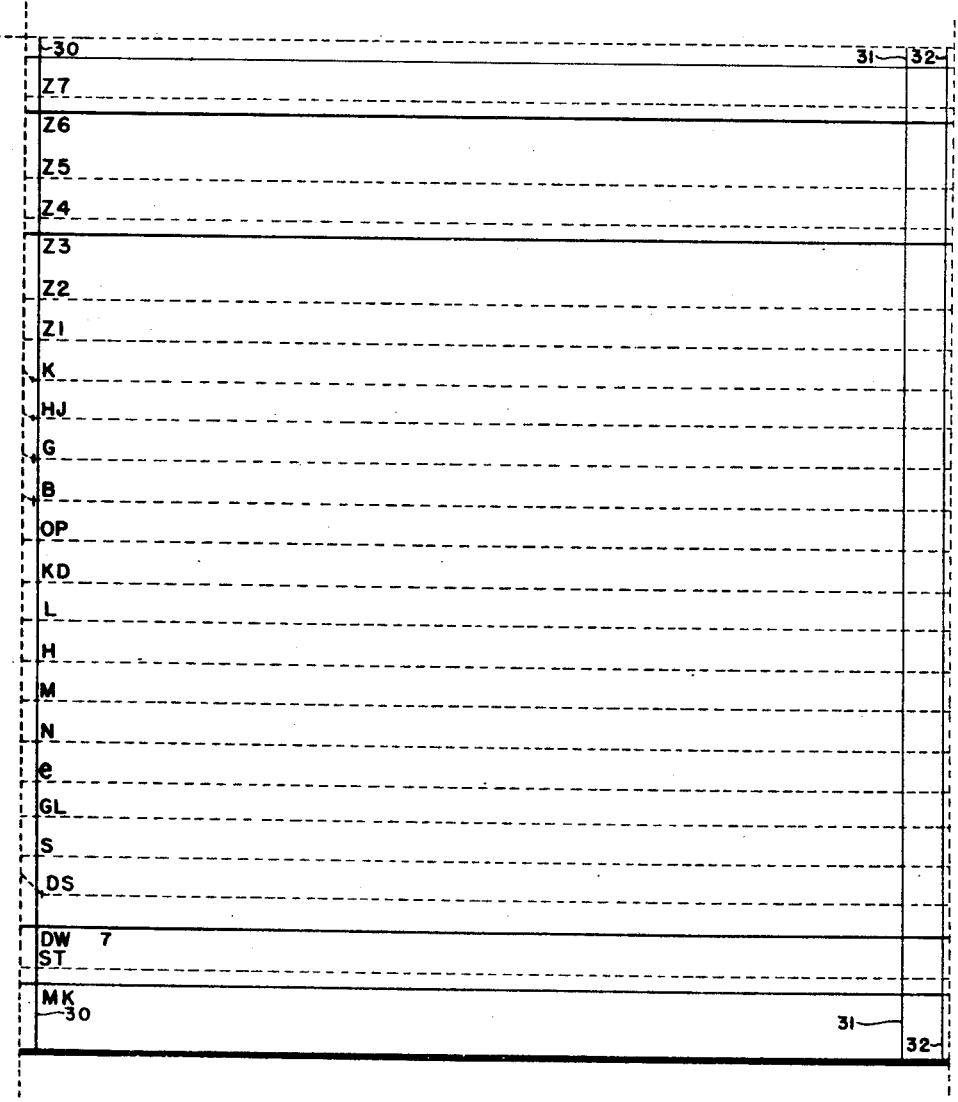

Fig. 16 shows the manner in which Figs. 15A through 15H, 15J through 15N, and 15P through 15Z are to be joined to form the sequence chart.

It will be noted that the apparatus embodies a large number of relays, most of which are associated with a plurality of contacts identified by the same reference character as the corresponding relay plus a numerical suffix. Thus the relay MQ, Fig. 1A, controls contacts MQ1, MQ2, MQ3, MQ4. Beneath the letter or letters designating each relay is a numeral designating the number of contacts controlled by the relay. In all cases the contacts are shown in the position which they occupy when the associated relay is non-operative. When the relay becomes operative by the passage of current through it, any associated contacts which are shown open in the drawings move to the closed position, while any associated contacts which are shown closed in the drawings move to the open position. Change over contacts move to their alternative positions when the associated relay becomes operative.

GENERAL

The factor register, which is common to the multiplier and multiplicand, comprises a group of digital relays representing each denomination of the two factors, and also further groups of electrical relays, representing the overflow denominations which are required to accommodate the terms of the divergent series formed by successive doubling of the multiplicand. At successive stages in the calculation those relays in the factor register representing the digits of the originally entered factors, or the terms of the convergent or divergent series formed respectively by successive halving or doubling of the factors, are operated and locked.

The machine is designed to operate in two phases. During the first phase the multiplier is entered in the factor register, and successively halved, ignoring fractions, until unity is reached. During this first phase the odd values register, which contains a set of elements allocated one to the multiplier and one to each possible quotient which may be formed during the halving operation, registers the occurrence of each odd value in the convergent series constituted by the multiplier and its successive quotients.

The machine herein illustrated is arranged to deal with two denomination multipliers, i. e. multipliers up to 99. The number of halving operations required—ignoring fractions—to reduce 99 to unity is six. The odd values register therefore has seven elements, constituted by relays Z1-Z7, of which relay Z1 corresponds to the multiplier, relay Z2 to the first quotient and so on. The relay or relays in the odd values register corresponding to odd terms in the convergent series are set and locked so that after completion of the first phase the odd values register contains an analysis of the multiplier equivalent to the expression of the multiplier in terms of the binary notation.

Thus, assuming the multiplier to be 99, the condition of the odd values register will be as follows:

| Convergent Series | Odd Values Register | Corresponding power of 2 |
|---|---|---|
| 99 | Z1 operated and locked | $2^6$ |
| 49 | Z2 operated and locked | $2^5$ |
| 24 | Z3 non-operated | $2^4$ |
| 12 | Z4 non-operated | $2^3$ |
| 6 | Z5 non-operated | $2^2$ |
| 3 | Z6 operated and locked | $2^1$ |
| 1 | Z7 operated and locked | $2^0$ |

99, when expressed in the binary notation, is equal to $2^0+2^1+2^5+2^6$, and it will be observed that the locked relays in the odd values register correspond to those powers of two in the series $2^0+2^1+2^2+2^3+2^4+2^5+2^6$ which, when added together, form the multiplier.

After the formation of the above-described analysis of the multiplier in the odd values register has been completed, the remaining unit in the units denomination of the multiplier is cleared from the factor register, and the machine is ready for the second phase of the calculation.

During the second phase, the multiplicand is entered in the factor register and successively doubled in a number of steps corresponding to the number of steps required to reduce the multiplier to unity, thus forming the terms of the divergent series. Any term of the divergent series (including the multiplicand which of course is the first term) which corresponds to an odd term in the convergent series, and therefore to a locked relay in the odd values register, is entered into the accumulator, as hereinafter described, before that term is doubled. At the conclusion of the second phase, the product of the two factors has therefore been entered in the accumulator. If desired, the accumulator may then be zeroized to clear the machine for a further calculation.

The analysis of the multiplier is retained in the odd values register after the calculation is completed, and arrangements are made whereby, at the will of the operator, the odd values register may or may not be cleared during zeroizing of the accumulator. By so retaining the analysis of the multiplier in the odd values register, a common multiplier may be caused to operate in succession on a series of multiplicands, with or without summation of the resulting products. Moreover, by providing two odd values registers which can be coupled selectively with the factor register, and with the mechanism determining the entry or otherwise into the accumulator of the terms of the divergent series, a pair of multipliers may be used against one or more multiplicands, with addition of the products, if required.

The factor register, in the illustrated embodiment, is organized for sterling currency, and allows of the entry of multiplicands having five denominations, i. e. up to £99.19.11. The digital relays associated with the units of pounds (Fig. 4) and tens of pounds (Fig. 3) also serve for the entry of units and tens denominations of the multiplier. The product capacity of the machine is therefore seven denominations, i. e. up to £9989.11.9, but obviously the machine could be arranged to take care of factors and products of any other desired capacity by the provision of suitable additional denominational circuit arrangements in the factor register, and where multipliers having three or more digits are to be accommodated, by corresponding increase in the capacity of the odd values register.

Figure 6:
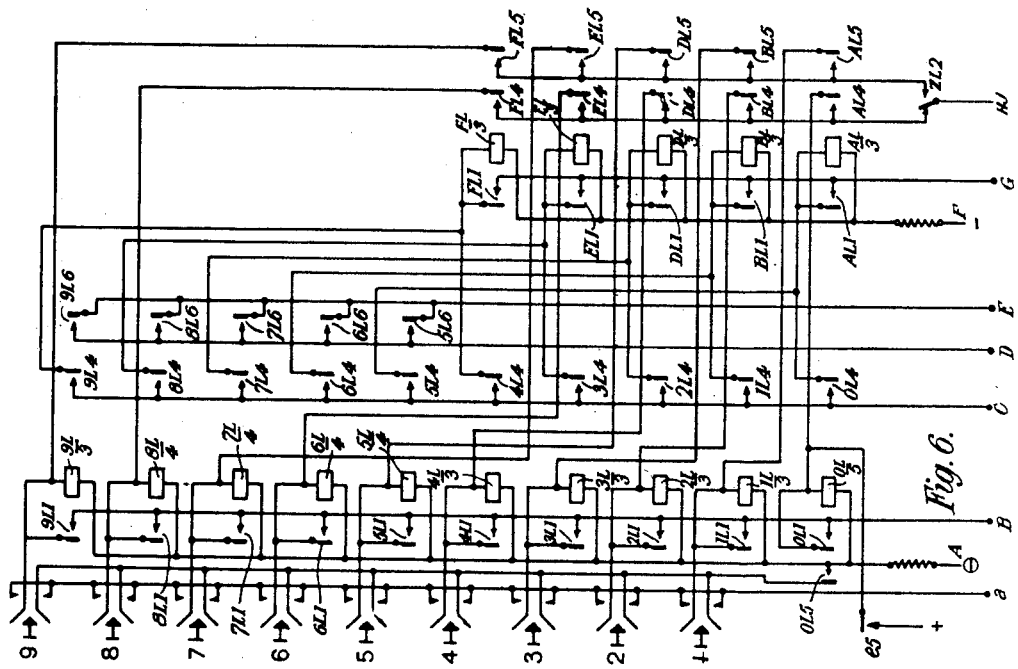
Figure 3:
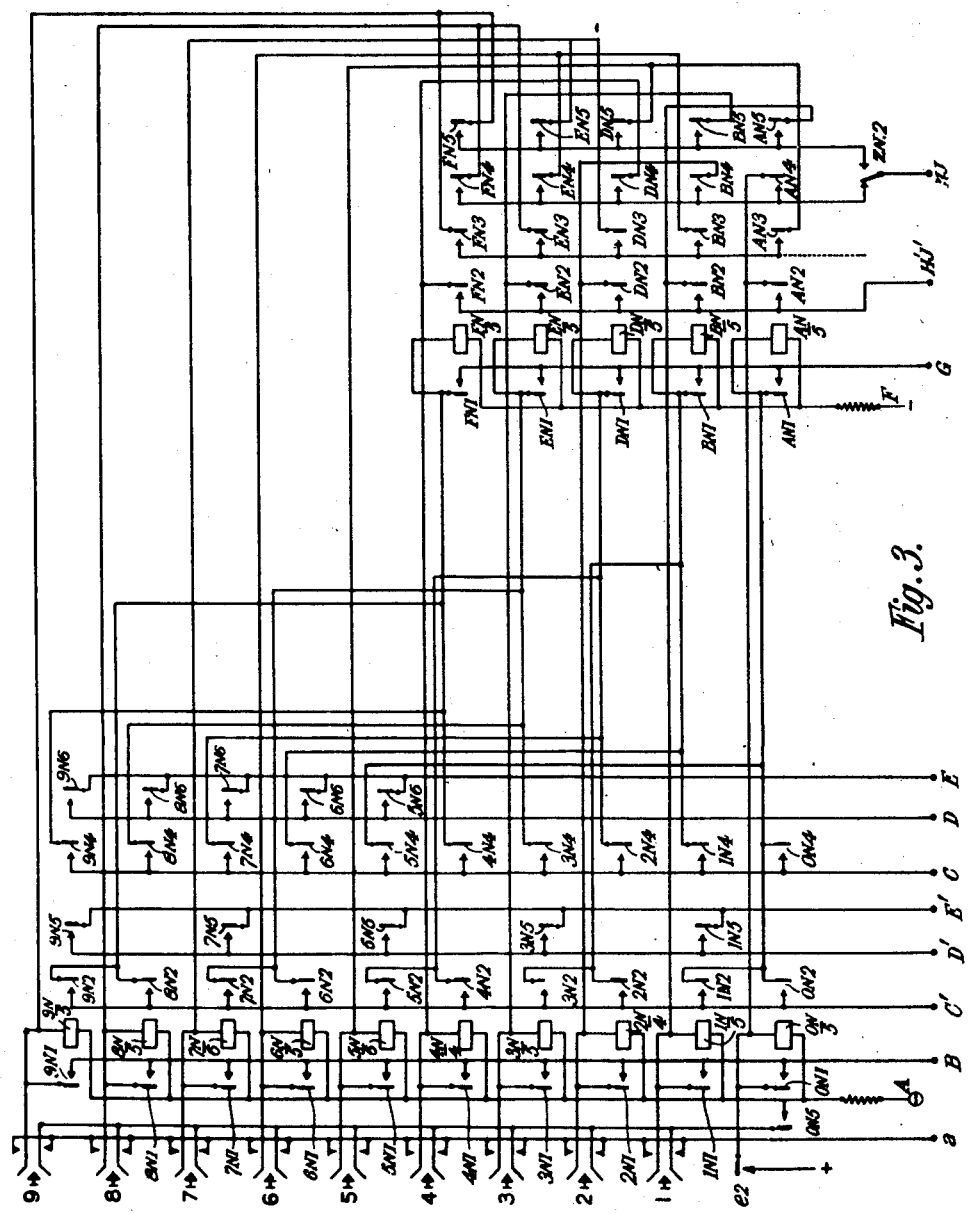
Figure 4:
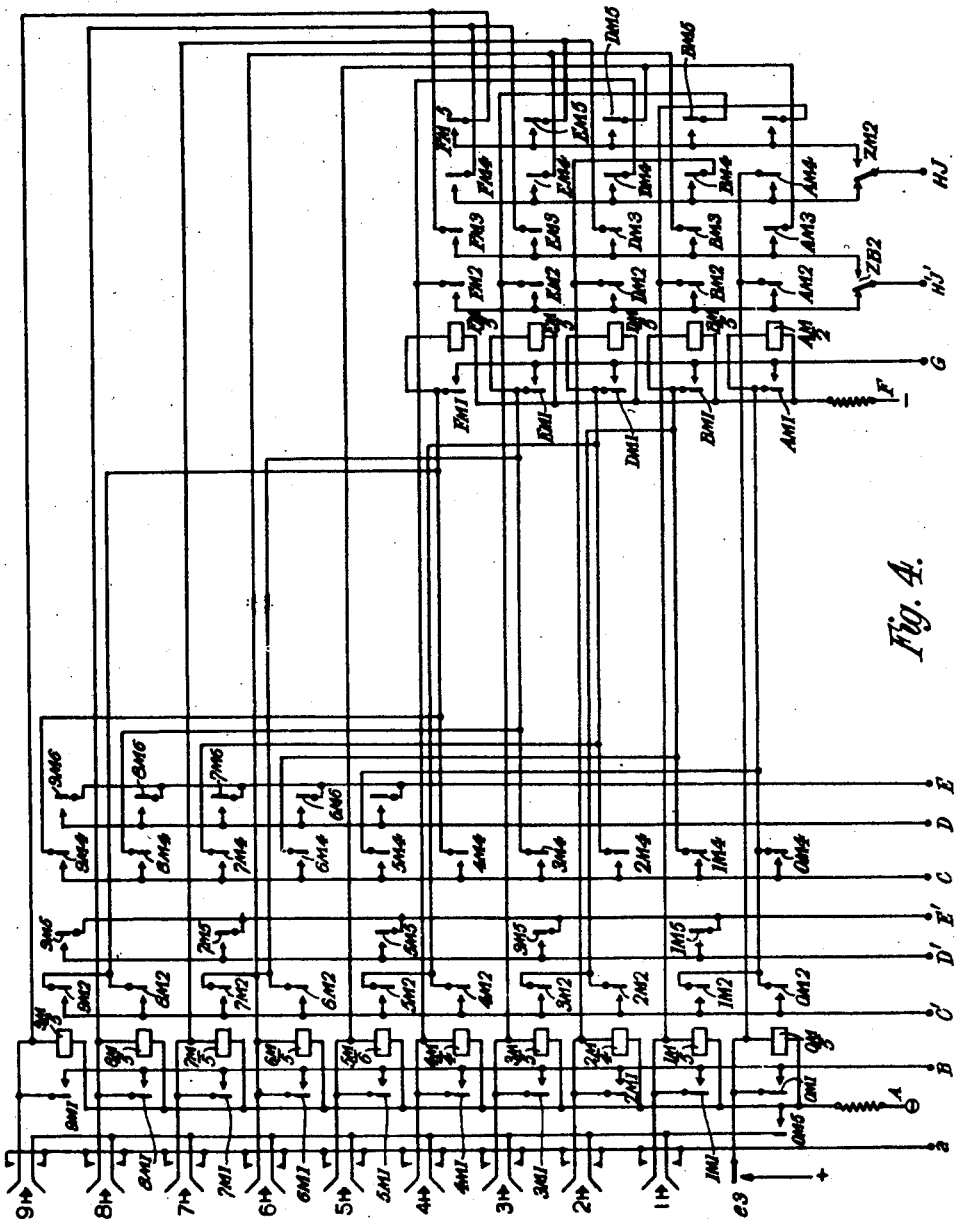
Figure 7:
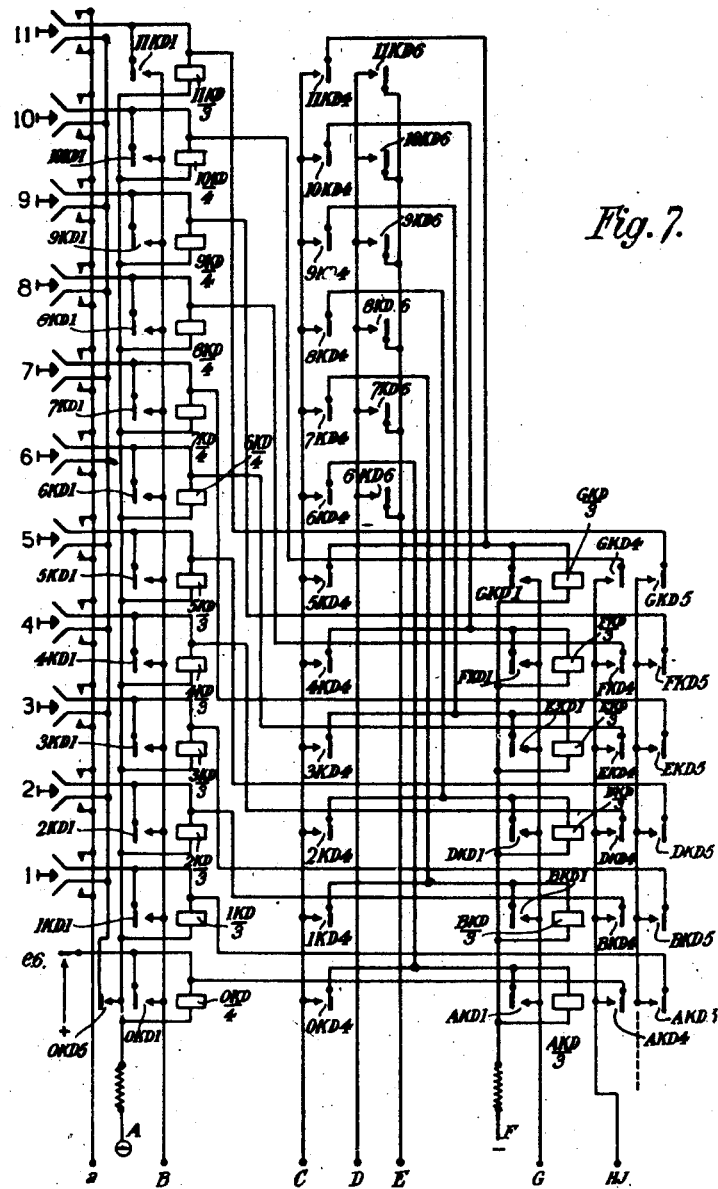

The various parts of the factor register associated with the different denominations are identified in the drawings by the following letters:

Pence, KD Figure 7
Units of shillings, L Figure 6
Tens of shillings, H Figure 5
Units of pounds, M Figure 4 (also units denomination of multiplier)
Tens of pounds, N Figure 3 (also tens denomination of multiplier)

Overflow:
   Hundreds of pounds, P Figure 2
   Thousands of pounds, V (circuit arrangement similar to Figure 2).

The same letters are employed for identifying the portions of the accumulator, entry means therefor and other parts of the machine allocated to the above denominations.

Figs. 15A through 15H, 15J through 15N, and 15P through 15Z form a sequence chart illustrating the operation of the various keys, switches, relays, lamps, and the motor in the performance of the problem of multiplying 36×£12.3.8 to obtain the product £438.12.0. Apart from the showing of the operation of the numeral wheels and the showing of the position of the wiper contacts, full lines are used in the chart to indicate when current is applied to the various relays, magnets, contacts, lamps, and the motor, and dotted lines are used to indicate when there is no current flowing therethrough. Also, in the chart, the elevation of the line from a lower level to a higher level indicates that the key, relay, or magnet is operated from its normal position, and the return of the line to its lower level indicates the return of these parts to their unoperated condition.

It will be convenient, before proceeding with a general description of the machine, to deal first of all with certain specific parts thereof.

MULTIPLIER ENTRY AND HALVING

In order to economize space in the machine, the two halving circuits (one each for units and tens digits of the multiplier) are combined with two doubling circuits (units and tens of pounds digits of the multiplicand).

This is possible only because the second (doubling) phase takes place subsequently to the first (halving) phase, and the same relay groups may therefore serve the dual purposes of halving in the first phase and doubling of the second phase. Figures 3 and 4 represent combined halving and doubling groups, Fig. 3 showing the tens denomination in the multiplier and the tens of pounds denomination in the mulitplicand, while Fig. 4 is the circuit of the units denomination in the multiplier, and the units of pounds denomination in the multiplicand.

The tens relays, 9N, 8N, 7N, 6N . . . 0N, in Fig. 3, are called the digit relays for the denomination N (tens multiplier, and tens of pounds multiplicand). The five relays FN, EN, DN, BN, AN, are called the transfer relays for the denomination N.

There is a key strip of only nine keys associated with the ten digit relays—the 0 digit relay being automatically operated at an early stage in the sequence of operations so that in the event that none of the nine keys has been depressed, the value in this denomination is represented by the 0 digit relay.

It will be observed that a number of lines are connected to the circuits of Fig. 3. Those lettered $a$, A, B, $C^1$, $D^1$, $E^1$, F, G and $H^1J^1$ are concerned with halving. During the first or halving phase, lines C, D, E and HJ are inoperative, but during the second or doubling phase these lines come into action to replace respectively lines $C^1$, $D^1$, $E^1$ and $H^1J^1$ which are then inoperative.

Of these lines, lines A and F are permanently connected to the negative potential supply line. Lines $D^1$ and $E^1$ serve, as later explained, to effect transfer operations. Lines $a$, B, G and $H^1J^1$ are selectively connected to the positive potential supply line under the control of a group of sequence control relays B, G, HJ and K (Fig. 1A) at the proper times to effect the entry of the multiplier and the successive halving operations to be performed on it.

At an early stage in the operation of the machine and prior to entry of the multiplier, contact $e2$ is momentarily closed, as hereinafter described, to render the zero digit relay 0N operative, which it does by completing the following circuit: positive, over closed contact $e2$, 0N relay, A line, to negative.

The relay 0N then locks over the circuit from negative, over A line, 0N relay, closed contact 0N1, B line, which is connected at this stage to positive over operated contact $s3$.

In this condition the N denomination registers 0.

Suppose that the operator now enters 5 by depressing key 5. Two circuits are completed by the key blades.

(1) Positive (to which $a$ line is then connected), over lower blade of key 5, closed contact 0N5, A line, to negative; and (2) Positive, over $a$ line, upper blade of key 5, 5N relay, A line, to negative.

Circuit 1 short circuits 0N relay and 0N relay releases. The opening of contact 0N5, when the 0N relay is released, removes the short circuit effect and Circuit 2 enables 5N relay to operate. Relay 5N will lock over the following circuit negative, over A line, 5N relay, closed contact 5N1, to B line which is still connected to positive.

The denomination N now registers 5.

Figure 1B:
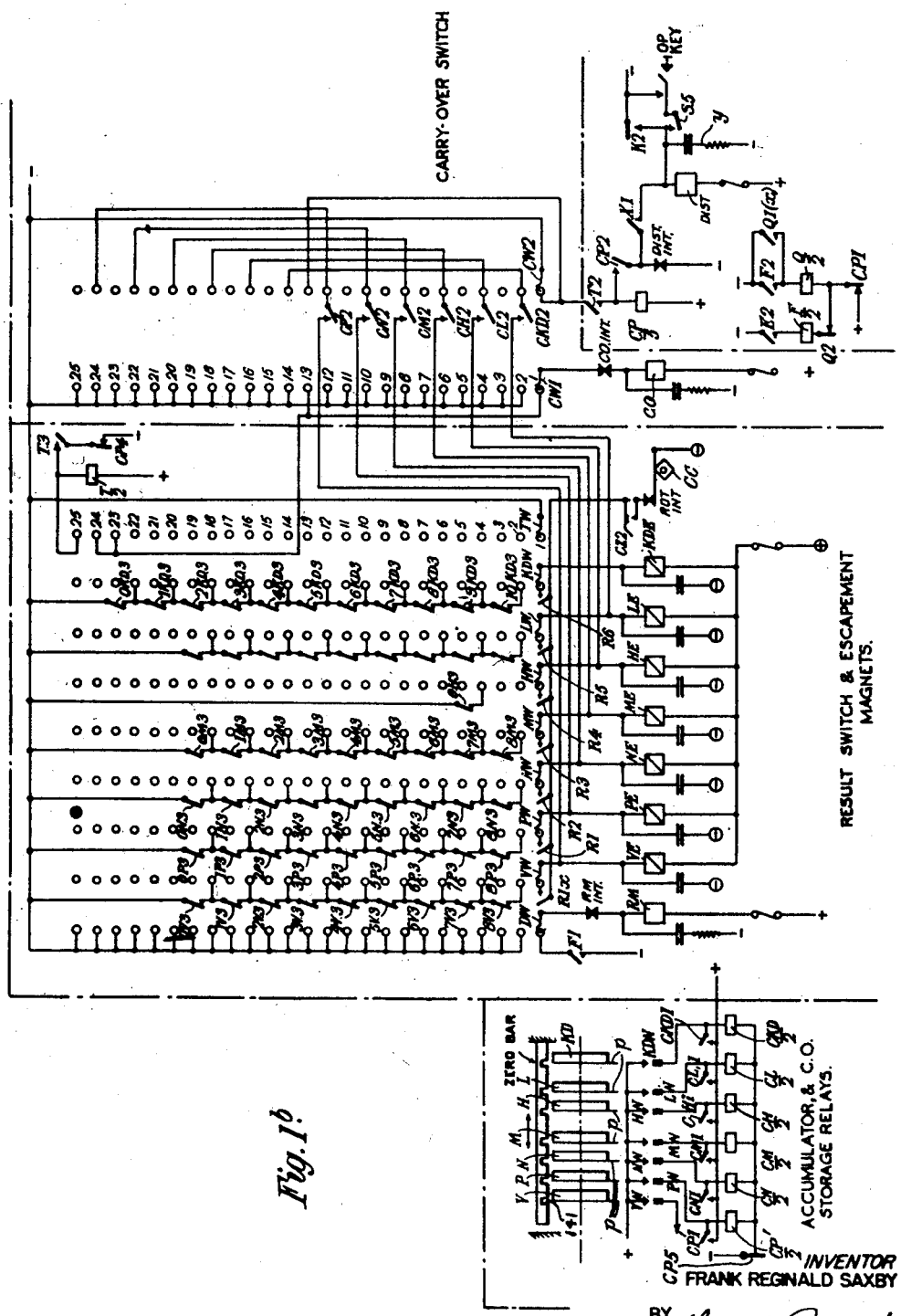

The halving process is initiated by depression of the OP key, Fig. 1B. Near the beginning of the halving process, the $a$ line is disconnected from positive, in a manner fully described hereinafter, and renders the keys thereafter ineffective to enter further digits in the factor register.

When the halving process commences, the following sequence of operations takes place:

(a) Positive potential is applied to the $C^1$ line and the G line, and a circuit is completed as follows: positive, over $C^1$ line, closed contacts 5N2, DN relay, F line, negative. DN operates and locks over negative, over F line, DN relay, closed contact DN1, and G line which is connected to positive potential.

(b) Positive potential is taken off B line, and 5N relay unlocks; also positive is taken off $C^1$ line but is retained on G line holding relay DN locked.

(c) Positive potential is applied to the $H^1J^1$ line and is re-applied to the B line. A circuit is thus set up as follows: positive, over $H^1J^1$ line, closed contacts DN2, 2N relay, A line, to negative. The relay 2N operates and locks over circuit negative, A line, 2N relay, closed contacts 2N1, B line, to positive.

(d) The positive potential is removed from the G line and DN relay unlocks. Potential is also removed from the $H^1J^1$ line. The digit 5 has been "halved" and its "half", i. e. 2, is now registered in the digit relays by the operation of relay 2N.

The sequence of operations just described, which takes place after depression of the 5 digit key and under the control of the sequence control relays, may be summarized as follows:

(1) The $a$ line and the B line have positive potential thereon, and, when the digit key 5 is depressed, it will close one circuit from the $a$ line over the 5N relay to the A line to cause the relay to operate, and will close another circuit from the $a$ line over the closed contacts ON5 to short circuit relay ON, which is thereby released. Relay 5N locks up over a circuit between lines A and B.

(2) Depression of the OP key causes positive potential to be removed from the $a$ line to prevent the keys from exerting further control over the relays.

(3) Positive potential is applied to lines $C^1$ and G lines. Halving commences, transfer relay DN being operated over a circuit over closed contacts 5N2 between lines $C^1$ and F and locked over a circuit over closed contacts DN1 between lines G and F.

(4) Positive potential is removed from lines B and $C^1$. Removal of potential from line B releases relay 5N.

(5) Positive potential is applied to lines $H^1J^1$ and B. Circuit over closed contacts DN2 between lines $H^1J^1$ and A causes relay 2N (representing the half value) to operate. Relay 2N locks over a circuit over closed contacts 2N1 between lines A and B.

(6) Positive potential is removed from lines G and $H^1J^1$. Relay DN unlocks and is released.

Steps 3 to 6 are then repeated to perform further halving operations.

Lines $D^1$ and $E^1$ serve for carry over operations. A carry over operation to the next lower denomination is obviously required when the digit being halved is odd, and it will be noted that each odd digit relay has a contact, as 5N5, which closes to connect the lines $D^1$ and $E^1$ when said digit relay is operated. Thus when digit relay 5N is operated, contact 5N5 connects the lines $D^1$ and $E^1$ and causes a carry over relay ZB to be operated over the following circuit: negative, ZB relay, (Fig. 1A) $E^1$ line (Figs. 1A and 3), operated contact 5N5, $D^1$ line (Figs. 3 and 1A), non-operated contact MP3, non-operated contact K3, non-operated contact S4, $x$ line (Figs. 1A and 1), and to positive over DIS1 wiper (Fig. 1) of the distributor switch, which is connected to positive and which has operated and is now on contact 2 of its associated bank of contacts as will be later explained. ZB relay therefore operates and locks over closed contact ZB1.

It will be observed that two circuits extend from the $H^1J^1$ line in the next lower (units) denomination (Fig. 4). When contact ZB2 of carry over relay ZB is in its non-operated position, the circuit extends to the contacts AM2—FM2. When contact ZB2 is in its operated position, due to the digit being halved in the tens denomination being odd, the circuit extends to the contacts AM3—FM3. No such duplication of the circuits from line $H^1J^1$ is provided in Fig. 3, as this is the highest denomination of the multiplier and can therefore have no carry down to it from a higher denomination.

Suppose now that no entry was made into the denomination M (Fig. 4). The 0M relay would have remained locked when 50 had been entered, (by depressing key 5 in Fig. 3). Then, according to the steps 3 to 6 given above, $C^1$ lines (Figs. 3, 4) and G lines (Figs. 3, 4) have positive potential applied thereto.

DN operates as already described, and in addition a circuit would be set up for AM relay, as follows: positive, $C^1$ line (Fig. 4), operated contacts 0M2, AM relay, F line, negative. AM operates and locks over circuit negative, F line, AM relay, operated contact AM1, G line, positive. Potential is removed from B lines (Figs. 3 and 4) and $C^1$ lines (Figs. 3 and 4). 5N and 0M relays unlock, but DN and AM relays remain locked. Positive potential is applied to $H^1J^1$ lines (Figs. 3 and 4), and B lines are again connected to positive. In the example under consideration, relay ZB has been operated, owing to the fact that an odd digit (5) is being halved in the tens denomination. The circuit therefore becomes: positive, $H^1J^1$ line (Fig. 4), operated contact AM3, 5M relay, A line, negative, and in Fig. 3, positive, $H^1J^1$ line (Fig. 3), operated contact DN2, 2N relay, line A, negative.

The relays 2N (Fig. 3) and 5M (Fig. 4) operate and lock over their respective locking circuits.

The potential is removed from the G and $H^1J^1$ lines and AM and DN relays unlock.

The two denominations now register in their respective digit relays, 2 and 5 which of course is the result of halving the original entry 5 0. Contacts ZB2 thus choose one or other of two pre-set circuit conditions and, as already pointed out, it was the odd character of the digit 5 which led to the operation of contact ZB2. Had contact ZB2 not been operated, the circuit from $H^1J^1$ in Fig. 4 would have been through operated contact AM2 to 0M relay, and the latter would have become operated in place of 5M relay.

It is of course quite clear that a subsequent cycle of energization and de-energization of the lines $C^1$, G, B, $H^1J^1$ in the manner and order already described, would result in the "half" of 25 being registered in the digit relays.

Evidently the process could be repeated until 00 remains in the factor register, but, as will be seen later, effective halving ceases when the multiplier is reduced to 01.

By inspection of Fig. 4, it will be seen that, as in the case of Fig. 3, only odd valued digit relays connect, by contacts 1M5, 3M5, 7M5 or 9M5, the $D^1$ and $E^1$ lines when operated. The lines $D^1$, $E^1$ (Fig. 4) do not close the circuit of a relay similar to ZB in function, because Fig. 4 represents the units and therefore the lowest denomination of the multiplier. Instead, these lines when connected, by an odd value digit relay becoming operated, cause entry to be made into the odd values register in a manner later described in the general schedule of operations.

MULTIPLICAND ENTRY AND DOUBLING

In multiplicand entering and doubling operations, lines $a$, A, B, F and G operate as in multiplier entering and halving operations, but, as previously explained, lines $C^1$, $D^1$, $E^1$ and $H^1J^1$ are now inoperative and are replaced respectively by lines C, D, E and HJ.

In Figs. 3 and 4, the same keys and relays are used for multiplicand entry and registration, but when so used their values are respectively tens and units of pounds.

Taking as an example £16 which is to be successively doubled, the operator depresses key 1 in Fig. 3 and key 6 in Fig. 4. As previously described, ON and OM relays then unlock and relays IN and 6M become energized and locked.

When the doubling process commences, the following sequence of operations takes place:

Positive potential is applied to C and G lines in both figures, and circuits are completed, as follows: positive, C line (Fig. 4), operated contact 6M4, BM relay, F line, negative. BM relay operates and locks over negative, F line, BM relay, operated contacts BM1, G line, positive.

For Fig. 3 (simultaneously): positive, C line (Fig. 3), operated contact IN4, BN relay, F line, negative. BN operates and locks over negative, F line, BN relay, operated contacts BN1, G line, positive.

Potential is removed from lines B and C, and relays IN and 6N release.

The lines D, E serve for carry over operations which, in this case, have to be made to the next higher denomination when the digit to be doubled is 5 or higher. As will be observed from Figs. 3 and 4, the digit relays allocated to digits 5–9 have contacts, marked 5M6 to 9M6 in Fig. 4, which connect the lines D and E when their associated digit relays are operated. When the lines D and E in Fig. 4 are so connected, a relay ZN (Fig. 1A) is energized over a similar circuit to that described above in connection with relay ZB. Relay ZN then locks over contacts ZN1.

The connection of line HJ in the next higher denomination (Fig. 3) to either of two circuits is controlled by the position of contacts ZN2 of relay ZN. When no carry over is required, line HJ (Fig. 3) is connected to contacts AN4—FN4. When, however, relay ZN is energized, ZN2 connects line HJ to contacts AN5—FN5, and a carry over is made.

In the example under consideration, the digit in the units of pounds denomination is 6, so that a carry over is called for and, when potential is applied to the HJ and B lines, the following circuits are completed: positive, HJ line, operated contact BM4, 2M relay, A line, negative (Fig. 4). 2M relay locks over locking circuit negative, A line, 2M relay, operated contacts 2M1, B line, positive.

Simultaneously when potential is applied to HJ line (Fig. 3), it sets up circuit condition: positive, HJ line (Fig. 3), operated contacts ZN2, operated contacts BN5, 3N relay, A line, negative. 3N relay locks over circuit negative, A line, 3N relay, operated contacts 3N1, B line, positive. Potential is removed from the G lines and HJ lines, and BN and BM relays release.

There is now registered in digit relays, 3N and 2M which represent £32, double £16.

It will be observed that, had no carry over been required from the units denomination, line HJ in the tens denomination (Fig. 3) would have been connected via contacts BN4 to digit relay 2N, so that the latter would have become operated in place of the 3N relay.

It will be seen from Fig. 1A that a carry over relay, corresponding in every particular with relay ZN, is provided for each denomination in the factor register except the highest, these relays being marked ZL—ZV, and having associated locking contacts ZL1—ZV1, and contacts ZL2—ZV2 for selectively connecting the HJ line to either of two circuits according to whether or not a carry over must be made.

The sequence of operations which takes place during entry and doubling of the multiplicand is thus very similar to that which occurs during entry and halving of the multiplier, and may be summarized as follows, it being remembered that lines A and F are always connected to negative. It should also be mentioned that, at the commencement of the second phase and prior to the entry of the multiplicand, the zero digit relays 0V—0KD in all denominations are operated and locked.

(1) The $a$ line and the B line have positive potential thereon, and, when a digit key is depressed, it will close one circuit from the $a$ line over the associated digit relay to the A line to cause the digit relay to operate and will close another circuit from the $a$ line over the closed contacts of the zero relay to short circuit the zero relay and cause it to be released. The digit relay locks up over a circuit between lines A and B.

(2) Depress OP key. Positive potential is removed from $a$ line to prevent digit keys from exerting further control over the digit relays.

(3) Positive potential is applied to the C and G lines. Doubling commences, appropriate transfer relay is operated over a circuit between lines C and F over the closed contacts of the operated digit relay. The operated transfer relay is locked over a circuit between lines G and F over contacts closed by the operated transfer relay.

(4) Positive potential is removed from lines B and C. Removal of potential from line B releases the operated digit relay.

(5) Positive potential is applied to lines HJ and B. Circuit over closed contacts of operated transfer relay from line HJ to A causes the digit relay representing the doubled value to be operated. The operated digit relay locks up over a circuit between lines A and B.

(6) Positive potential is removed from lines G and HJ. Removal of potential from line G causes the operated transfer relay to be released.

Figure 2:
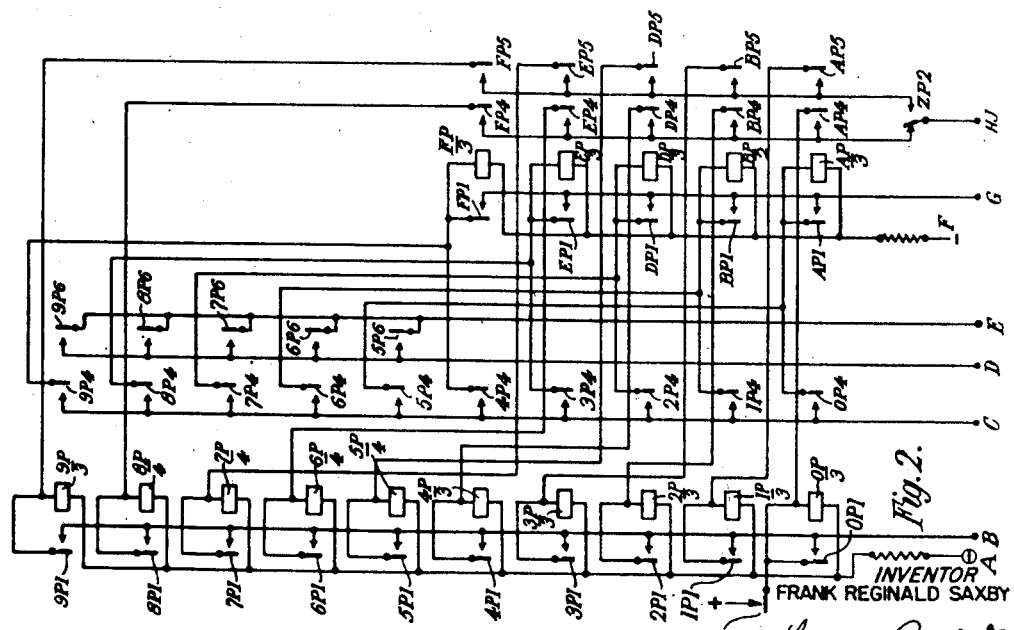

Steps 3–6 are repeated automatically to continue doubling the amount standing in the register, by a number of steps corresponding to the number of halving steps performed on the multiplier. Two overflow denominations, viz, for hundreds and thousands of pounds respectively, are provided for the carries over occasioned by this continued doubling. The overflow denomination for hundreds of pounds is shown in Fig. 2, and it will be observed that there are no entry keys for this denomination. The second overflow denomination is similar in all respects to that of Fig. 2 except that when lines D and E of this denomination are connected, a red lamp RN (Fig. 1a) is lit up to show that a fault has occurred. These lines are connected by the closure of a contact associated with the corresponding digit relay, when the 5 or a higher digit relay in this second overflow denomination is energized. This can never occur during proper working of the machine, as the product of the multiplicand (which at a maximum is £99.19.11) and $2^6+2^5+2^1+2^0=99$ can never exceed £9899.11.9.

The pence denomination (Fig. 7) has of course eleven digit keys and associated digit relays 1KD—11KD. The line from HJ is not extended selectively to two sets of contacts in the transfer relays in this case, because there can be no carries over to the lowest denomination of the factor undergoing doubling. The lines D and E in this denomination are connected by contacts 6KD6—11KD6 when the entered digit is 6 or higher. The tens of shillings denomination (Fig. 5) has of course only one digit key and one digit relay IH, and whenever this relay is operated the lines D and E of this denomination are connected by contact IH6.

By using common circuits (Figs. 3 and 4), for the halving and doubling in two denominations of the factor register, considerable space is saved, as 30 relays, 18 keys and 4 resistance spools—which would otherwise be needed for the two multiplier denominations—can be dispensed with. This is an important advantage of two phase operation as compared with concurrent halving and doubling as described in British Patent No. 541,909.

It is evident from the foregoing that other non-uniform and mixed scales of notation may be operated upon in place of sterling as the multiplicand, for example Indian currency, English scales of mensuration or English weights and measures, by appropriate variation in the lay-out of the digit relays and doubling circuits.

DISTRIBUTOR SWITCH AND ODD VALUES REGISTER

The distributor switch is a 12 step rotary telephone type pre-selector, having 4 bank levels (48 contacts in all) and 4 wipers insulated from one another but connected to move together.

The four wipers are marked DIS. 1, DIS. 2, DIS. 3, DIS. 4, and the levels over which they sweep are diagrammatically shown in Fig. 1 as four vertical columns of small circles numbered 1 to 12. In the normal unoperated position, the four wipers rest on the first contacts in each level.

Contacts in DIS. 1 level from 2nd and 8th inclusive, are connected together in one group, and from 9th to 12th inclusive are connected together in another group. DIS. 1 wiper is of the bridging type.

DIS. 2 level has contacts 2 to 8 inclusive connected individually to odd values register relays Z1, Z2, Z3, Z4, Z5, Z6, Z7. These are the odd values register elements already mentioned. The driving magnet circuit of the distributor switch will be found in the right-hand lower corner of Fig. 1B (the magnet being marked DIST.).

It is brought into circuit with its own self interrupter

DIST.
INT.

by operated contacts X1, and any spark forming back E. M. F. from its magnet coil is quenched by the spark quench circuit $y$ shown immediately to the right of the magnet DIST. The self-interrupter

DIST.
INT.

for the driving magnet DIST. of the distributor switch is composed of contacts which are opened by the operation of the magnet and open the circuit to the magnet, allowing the magnet to de-energize and return to its unoperated condition. Upon the return of the magnet to its unoperated condition, the contacts of the interrupter

DIST.
INT.

will reclose. Accordingly, as long as the magnet is connected in a circuit which is completed through the self-interrupter

DIST.
INT.

the magnet will operate intermittently to drive the wipers past their related banks of contacts.

The main key, which will be found at the bottom of Fig. 1, connects and disconnects 50 volts D. C. supply to and from the secondary bus bars, and also to the main bus bars via the break contacts CZ1 of CZ key, which is the zeroizing key. The main key is of the locking (tumbler) type, while key CZ is non-locking.

While both the main and secondary bus bars are thus normally connected to the supply, depression of the zeroizing key CZ, by breaking contacts CZ1, will disconnect from the supply the main bus bars, and all parts of the apparatus connected thereto; leaving in circuit only the secondary bus bars, and parts connected thereto.

In the drawings, lines connected to the main bus bars are marked with plain polarity signs, while lines connected to the secondary bus bars are marked with polarity signs surrounded by a circle.

The O. V. (odd values) register is normally connected, via lines $Ov$, $Ov^1$, to the main bus bars by contacts ZR2 of a key ZR, so that when key ZR is undepressed the O. V. register will be cleared during the zeroizing operation. If however key ZR (which is a locking key) is depressed, contacts ZR1 make to connect the O. V. register to the secondary bus bars, contacts ZR2 immediately afterwards breaking to disconnect it from the main bus bars. By operating the ZR key therefore, the O. V. register may be "held" during the zeroizing operation and the analysis of the multiplier retained therein for operation upon a subsequently entered multiplicand.

The wipers of the distributor switch fulfill the following functions as will appear later from the detailed description:

DIS. 1 controls the operation of the sequence control relays, initiating and terminating cyclic halving and doubling at the proper times.

DIS. 2 operates, and is effective whenever the multiplier, or any of the quotients formed by halving it, is odd, to enable the corresponding relay of the O. V. register to be operated.

DIS. 3 reads, during the second phase, the analysis of the multiplier in the O. V. register, and controls the entry into the accumulator of the terms of the divergent series corresponding to locked relays in the O. V. register.

DIS. 4 operates, at the conclusion of the first phase, to condition the machine for the second phase.

SEQUENCE CONTROL RELAYS

The relays B, G, HJ and K (Fig. 1A) are the sequence control relays. They serve to cause positive potential to be applied, at the proper times, to lines B, C, $C^1$ G, HJ, $H^1$ $J^1$ of the several denominations of the factor register, by connecting these lines to a line $x$ connected to contacts 2–8 associated with the wiper DIS. 1 of the distributor switch. When the wiper DIS. 1 is moved from its home position onto contact 2, line $x$ is connected to positive potential, and the sequence control relays are able to perform a halving or doubling operation, at the conclusion of which wiper DIS. 1 is stepped forward onto contact 3. Cyclic halving or doubling continues until wiper DIS. 1 reaches contact 9, whereupon the positive potential is removed from the $x$ line to render the sequence control relays inoperative. Seven halving or doubling cycles are thus performed.

It will be noted that a group of six contacts MP1–MP6 and four contacts MQ1–MQ4 control the connections from the sequence control relays to the factor register. These contacts are not operated during halving, but are operated during doubling.

From Figs. 3 and 4 the B lines lead down over non-operated contact G1 (Fig. 1A) to the B relay, and thence to line $x$, and when contact MP1 is operated and closed, the B lines from Figs. 2, 5, 6, 7 are also connected to the B relay circuit. The B lines from Figs. 3 and 4 or, if contact MP1 is operated, from Figs. 2, 5, 6, 7 as well, are also connected, when HJ2 contacts are operated, to K relay and thence to $x$ line.

The $C^1$ lines from Figs. 3 and 4 lead down in Fig. 1A to non-operated contacts MP2, non-operated contacts G2, and contacts B1. When contact MP2 is operated, all C lines of Figs. 2, 3, 4, 5, 6, 7 are connected over contacts $G^1$ and both $C^1$ lines disconnected from the circuit with contact $G^1$. The $D^1$ lines from Figs. 3 and 4 lead down (Fig. 1A) over non-operated contacts MP3, non-operated contacts K3, and non-operated contacts S4 to $x$ line, and when MP3 is operated, all D lines in Figs. 2, 3, 4, 5, 6, and 7 are connected to the circuit over contacts K3 and S4 and both $D^1$ lines are disconnected from the circuit over contacts K3 and S4.

Likewise G lines lead over G relay, to contacts B2 and from G relay over HJ relay (Fig. 1A) to contacts G3($x$). With MP4 non-operated G lines (Figs. 3 and 4) only are so connected, but with MP4 operated, all G lines are so connected.

Lines $H^1J^1$ lead over non-operated contact MP5 (Fig. 1A) to contact HJ1. When contact MP5 is operated, it will disconnect line $H^1J^1$ from contact HJ1 and will connect the line HJ thereto.

The sequence control relays connect the various lines in the following order to the line $x$, which has positive potential thereon.

(1) Initially B lines are connected to $x$ line. B relay operates slowly. D or $D^1$ lines, depending upon the position of contact MP3, are connected to $x$ line over non-operated contacts K3 and S4.

(2) Resultant closure of contacts B1 completes the circuit over non-operated contacts $G^2$ and connects the $C^1$ or C lines to $x$ line, depending upon the position of contact MP2. Closure of contacts B2 completes the circuit to the G lines and causes G relay to operate.

(3) Opening of contacts G1 disconnects the B lines from the $x$ line, which has positive potential thereon, and de-energizes B relay. Opening of contacts G2 disconnects $C^1$ and C lines from the $x$ line, which has positive potential thereon. Closing of contacts G3($x$) places relay HJ in series with relay G and energizes HJ relay (slow to operate), G relay being held energized by the circuit through HJ relay despite the opening of contacts B2.

(4) Closure of contacts HJ1 connects $H^1J^1$ lines to line $x$, which has positive potential thereon. Closure of contacts HJ2 energizes K relay and reconnects B lines to line $x$, which has positive potential thereon.

(5) Contacts K1 open to de-energize G and HJ relays and disconnect G lines from line $x$, which has positive potential thereon. Contacts K3 open to disconnect D or $D^1$ lines from line $x$. Contacts K2 (Fig. 1B) close to energize DIST. magnet and cause the distributor switch to move its wipers one step forward.

(6) Slow release of HJ relay opens contacts HJ1, HJ2, disconnecting $H^1J^1$ or HJ lines from line $x$ and de-energizing K relay, which releases quickly to close contacts K1, K3 re-energizing B relay and reconnecting D or $D^1$ lines to line $x$.

It will be seen therefore that the sequence control relays operate cyclically to apply potential to the lines leading to the factor register in the correct order and at the proper times to effect the halving or doubling operations already described.

The contacts MP1—MP5 operate to select the lines appropriate for halving in the first phase and for doubling in the second phase.

During the first phase of the operation, the line G is connected to negative over the operated digit relays in two denominations, M and N, in parallel; but during the second phase of the operation this line is connected to negative over the operated digit relays in seven denominations in parallel. This difference in the number of digit relays would cause the current through the relay G to be greater in the second phase than in the first phase, which would cause relay G to have different operating characteristics in the second phase from those present in the first phase. To avoid this condition, contacts MP6 close a shunt around the relay G during the second phase of the operation, which shunt includes a resistance R of such a value as to cause the current through relay G to have the same value in the second phase as in the first phase of the operation, thereby causing the relay G to operate in the same manner in both phases of the operation.

Contacts MQ1—MQ4 are operative during the second phase and prevent feed back in double purpose denominations.

After completing seven steps, and effecting seven halving or doubling operations, DIS. 1 wiper is advanced to its ninth contact, where it completes a circuit to energize X relay. The consequent closure of contact X1 (Fig. 1B) completes a circuit for the DIST. magnet through the self-interrupter

DIST.
INT.

and the self-interrupted drive to DIST. magnet causes the distributor switch to operate step by step to its home position, in which position X relay becomes de-energized and the drive circuit to DIST. magnet is broken by contacts X1.

It should be explained that the series resistances in the A lines (Figs. 2, 3, 4, 6, and 7) act as current limiters, so that should two keys in the same denomination of the factor register be depressed, insufficient current will be available over the A line to lock them both. On release of the keys therefore, both digit relays will become de-energized. If the operator wishes to cancel an entry before depressing the OP key he need only depress any two keys in the denomination containing the error. This releases all relays in that denomination, and he can then enter the appropriate digit by depressing the proper key. Should the operator incorrectly depress a key in a denomination which should contain a cipher, he will, after releasing the improperly energized relay, have to depress the Start key to re-energize $e$ relay momentarily (as later described) and thereby lock the zero digit relay in all denominations, whereafter the correct factor can be entered.

RESULT SWITCH AND ACCUMULATOR

The accumulator into which the multiplicand and/or multiples of the multiplicand are entered to form the final product is shown in Figs. 1B, 9, 10, 11, 12, 13, and 14. With the capacity of the machine used to illustrate the invention, this accumulator contains seven numeral wheels, one for each of the pence, units of shillings, tens of shillings, and units, tens, hundreds, and thousands of pounds denominations.

Each of the numeral wheels is formed with a peripheral portion 100 and a flanged portion 101, as shown particularly in Figs. 10, 11, and 12. Secured on the portion 100 are a plurality of radially-projecting stop pins 102 equally spaced from each other and arranged so that they form two rings around this part of the numeral wheel, the pins of one ring being arranged in staggered relationship with respect to the pins of the other ring, as shown particularly in Fig. 12. For a decimal denomination (Fig. 11), such as units of shillings and units, tens, hundreds, and thousands of pounds, each ring contains ten pins, making twenty in all, with one of the pins, as at "p," being longer than the others to condition the carry-over mechanism for operation and to stop the wheel in zero position in a clearing operation, as will be described more fully hereinafter. Variations in the number of pins 102 and in the arrangement of the long pins "p" can be made according to the specific requirements; for instance, twenty-four pins 102 are provided on the pence denominational wheel (Fig. 9), with one of the pins being a long pin, and twenty pins 102 are provided on the tens of shillings denominational wheel, with every fourth pin being a long pin.

In the pence, units of shillings, and various ones of the pounds denominations, the flanged portions 101 are provided with numerals (Fig. 12) which increase in value as they register before a reading window during the operation of the wheels. In the case of the tens of shillings wheel, the flanged portion 101 is provided alternately with zero and the digit one.

The numeral wheels, which are formed on one side, within the flanged portion 101, with a female clutch cone 104 (Fig. 14) and are formed on the other side with a male clutch cone 105, are rotatably mounted on a shaft 103, which is carried by suitable accumulator side frames and is rotated whenever the circuit is completed to the accumulator driving motor. Also mounted on the shaft 103 and keyed thereto are a series of driving members 107 and spacing members 108, which are similarly formed with female and male clutch cones. Resilient washer-like members 110 are located on either side of the driving members 107 and accordingly are included between the driving members 107 and either the numeral wheels or the spacing members 108 to prevent adjacent numeral wheels from binding and to enable the numeral wheels to be frictionally driven from the shaft 103.

The manner in which the various elements are mounted on the shaft 103 is shown particularly in Fig. 14. Located in an appropriate position near the right-hand end of the shaft 103, by means of a set screw 111, is a stop member 112. The pence numeral wheel is located immediately to the left of the stop member and is followed by a resilient member 110, a driving member 107, a resilient member 110, a spacing member 108, and the units of shilling wheel. The spacing member 108 is provided between the pence and units of shillings numeral wheel to separate these wheels and make the reading of the numbers easier. In a similar manner, other numeral wheels, resilient members, driving members, and spacing members are placed on the shaft until the desired capacity of the accumulator is obtained.

Spaced from the highest denominational order numeral wheel by a resilient member 110 is a friction adjustment cone 115, which cooperates with adjusting nuts 116 and 117 mounted on a threaded member 118, which is pinned to the shaft. By adjusting the nut 117 along the member 118 and locking it in place by nut 116, the desired frictional pressure between the elements of the accumulator is obtained.

Escapement means, which cooperate with the pins 102 to maintain the numeral wheels normally against rotation with the shaft, may be operated to allow the wheels to make the various numbers of step-by-step movements necessary to enter the desired values into the accumulator.

Plates 125 and 126 (Fig. 9) extend between the accumulator side frames, and to these plates are secured a plurality of yokes 127, one for each denominational order. Each yoke 127 supports an escapement magnet 128, only two of which are shown in Fig. 9. Due to the fact that the escapement magnets 128 are wider than their related numeral wheels, magnets of successive denominations are alternately mounted on the plates 125 and 126.

As shown clearly in Fig. 10, each escapement magnet 128 has a soft iron core 130 and is appropriately wound to attract, when energized, an armature lever 131 pivoted on the yoke 127. One end of the lever 131 is formed with a projection 132 of such a width as to be able to cooperate with the staggered stop pins 102 and serve as an escapement pallet. An adjustable limiting screw 133 (Fig. 10) is mounted on the yoke 127 and provides the pivot point about which the lever 131 pivots. A spring 134, located between the lever 131 and a retaining pin secured to the yoke 127, returns the lever 131 from its operated position when the escapement magnet is de-energized. Plates 135 (Fig. 9), secured to suitable cross bars, are slotted to form guides and supports for the projections 132 on the armature levers 131.

When the driving shaft 103 rotates, all the numeral wheels, due to the action of the driving members 107, tend to rotate in unison therewith but are prevented from rotating by the engagement of the projections 132 and the pins 102. The escapement magnets 128 and armature levers 131, with their projections 132, which form an escapement means, operate in the following manner to permit step-by-step movement of their associated numeral wheels. When an electrical impulse is imparted to an escapement magnet 128, in a manner to be described later, the energization of the winding of the magnet will cause the armature lever 131 to be attracted. Normally each armature lever 131 is arranged so that its projection 132 is in the path of movement of one ring of stop pins 102, and normally, therefore, each wheel will be held against rotation by the projection 132 engaging a pin 102. The attraction of the armature lever 131 to the escapement magnet 128, however, moves the projection 132 laterally from the path of the pin 102 which it is contacting at the time the impulse is received, and will move it into the path of the next one of the staggered pins 102 located in the other ring of pins. This permits the wheel to escape for half a step of movement under the action of driving member 107. When the energization of the winding of the escapement magnet 128 ceases, the spring 134 restores the armature lever 131 and the projection 132 to their original positions, which are determined by the limiting screw 133. The projection 132 now passes back into the path of the next pin 102 in the first ring, and the wheel rotates another half a step, under the influence of driving member 107, to complete one full step of its rotation.

It will be apparent from the foregoing that the numeral wheel receives one complete step of operation at each energization and de-energization of the winding of the escapement magnet 128. By imparting a differential number of impulses to the escapement magnet 128, the wheel will be set differentially a corresponding extent.

The escapement magnets for the various denominations are referred to generally by the designations VE, PE, NE, ME, HE, LE and KDE, Fig. 9 showing the magnets KDE and LE.

The energization and de-energization of the escapement magnets to cause the step-by-step operation of the numeral wheels is effected under control of a result switch.

The result switch (Fig. 1B) is a 9 level rotary line switch of the telephone type, having 25 contacts in each level, and a wiper for each level, the wipers being insulated from one another and mounted on a common shaft.

The result switch drive magnet RM and interrupter RM. INT. are in series with the DW wiper of the switch. The DW level of contacts, except the normal contact, are all connected together and to negative. Obviously, if contacts F1 are momentarily operated, the magnet RM receives a pulse, steps the wipers DW, VW, PW, NW, MW, HW, LW, KDW, and TW one step and puts RM magnet in series with its interrupter RM. INT. and negative over the DW wiper and the contacts which are connected together. The switch rapidly self-interrupts and drives the wipers over all contacts in their respective levels until DW arrives back on the normal position, where the switch rests until F1 is again operated. Connected to the seven wipers VW, PW, NW, MW, HW, LW, KDW are the seven accumulator escapement magnets VE, PE, NE, ME, HE, LE, KDE.

Associated with each of these seven wipers is a chain of contacts which, when closed, connect respectively adjacent pairs of contacts, starting from the second contact of the associated level of contacts. All of the contacts in each chain are closed except that one corresponding to a locked digit relay in the corresponding denomination of the factor register. Thus considering the hundreds of pounds denomination, there is a chain of nine contacts 8P3-0P3 associated with the level of the PW wiper. These contacts are operated by the correspondingly numbered digit relays 8P-0P of the hundreds of pounds denomination of the factor register (see Fig. 2). There is no contact in the chain corresponding to 9, the highest digit, so that when the digit relay 9P is energized all of the nine contacts 8P3-0P3 remain closed. The PW wiper will therefore pick up nine pulses from negative as it traverses the level of contacts, and magnet PE will be energized nine times.

If the digit relay 8P is energized, contact 8P3 will be open, and the wiper PW will receive eight pulses only during its traverse, and the associated accumulator wheel will accordingly move eight steps only. Inspection of the drawing will make clear that whatever digit relay is energized, the wiper PW will receive a number of pulses corresponding to the value of the digit represented by that digit relay. It will be observed that the level of contacts associated with wiper HW (tens of shillings denomination) has one bridging contact only, which is closed when digital relay 1H of this denomination is energized (Fig. 5) and open when digital relay 0H of this denomination is energized. The pence denomination (wiper KDW) has a chain of eleven contacts, all of which are closed when the entered digit is 11.

One complete sweep of the result switch therefore actuates all escapement magnets (with the exception of those connected to denominations registering 0 in the digit relay columns).

Quite clearly, values in all the digit relay groups may be entered simultaneously into the accumulator, as a result of a single momentary operation of F1 contact, which starts the result switch. It is also quite clear that if more than one entry is made into the accumulator, a carry over system from each denomination to the next higher will be necessary, in order to make the accumulator a proper adding machine for the amounts entered into it.

The carry over system is worked in conjunction with relays CP1, CN, CM, CH, CL, CKD, and a carry over switch, which has two wipers CW1, CW2, each of which has associated with it a bank of 25 contacts. As explained earlier herein, each of the numeral wheels P, N, M, L, is fitted with a long pin $p$. These pins act as carry over pins, engaging levers as 136 to close the normally open contacts PN, NN, MN, LN, during the passage of the respective wheel from 9 to 0.

The KD wheel (pence) is fitted with a pin $p$, which operates the contact KDN as the wheel steps from 11 to 0. The number of escapement steps on this wheel is 12.

The shillings wheel H, is a 10 step wheel numbered 0, 1, 0, 1, 0, 1, 0, 1, 0, 1. It has five pins $p$ which operate HN contacts when the wheel steps from 1 to 0, in each case.

Operation of these contacts PN—KDN is strictly confined to the interval between digits 9—0, 11—0, 1—0, and in no case is any of these contacts operated when a digit or 0 appears stationary in the reading window.

Operation, for example, of KDN, energizes CKD relay, which locks over CKD1 contact, thereby temporarily storing the carry over.

The actual entry into the accumulator of the carry over must take place after the result switch has finished a sweep, and this condition is assured when the TW wiper of the result switch reaches the 23rd contact in its level. (The 24th contact is connected to the 23rd so that the TW wiper has two chances of completing the circuit.)

Wiper TW is connected to negative potential, and on arriving at the 23rd contact, a circuit to C0 magnet is completed over the first contact of the carry over switch, CW1 wiper of the carry over switch, CO. INT., C0 magnet and positive. Contacts 2 through 12 and 14 through 25 associated with wiper CW1 are connected together and to negative. C0 magnet takes a step and CW1 picks up negative from the second contact of its associated interconnected group of contacts. C0 magnet now self interrupts and the wipers CW1, CW2, sweep over their respective levels as far as the 13th contact when the circuit will be broken since the 13th contact of CW1 level is not connected to negative in either of the groups of contacts.

The wiper CW2, which is also connected to negative, contacts successively CKD2, CL2, CH2, CM2, CN2, CP12, which are relay contacts operated by the carry over storage relays CKD, CL, CH, CM, CN, CP1 respectively.

If, for example, CKD relay is storing a carry over, then CW2 passes a pulse over operated contact CKD2 to the LE escapement magnet which permits the L numeral wheel to escape one step, thereby entering 1 shilling carried over from the pence column.

The carry over storage relays are cleared by the opening of contacts CP5 at the appropriate line (as will be described later).

It will be noted that wiper CW2 traverses the energized carry over relays in sequence, starting from the lowest denomination. If, therefore, the carry over from one denomination to the next higher denomination places the latter in a condition to necessitate a further carry over, as for instance when a carry over from the pence denomination to the units of shillings occurs with the units of shillings standing at 9, the resulting closure of CL relay will close contacts CL2 before arrival of the wiper CW2 on its fourth contact (connected to CL2), thus permitting the further carry over to the tens of shillings denomination to take place.

The contacts 14 to 25 associated with the wiper CW2 of the carry over switch are connected step for step with the first half, thus contact 14 of CW2 level is connected to contact 2, contact 16 to contact 4 and so on. The carry over switch remains stationary on the 13th contact until wiper TW of the result switch again reaches its 23rd contact during the next entry of a product into the accumulator. The carry over switch then resumes step by step movement over contacts 14—25 and on to the 1st or home contact where it stops. Alternate carry over operations are thus performed by movement of the carry over switch over its first half and over its second half, respectively.

The accumulator may have one or more further numeral wheels for higher denominations which may be required if it is desired to add together in the accumulator a number of consecutively calculated products; in which case a suitable carry over mechanism would be provided from wheel V to the next higher denomination and so on. These higher denomination wheels do not require escapement magnets, as they only serve to take carries over from the wheel V, so that any simple form of mechanical carry over can be provided for these denominations.

ZEROIZING OF ACCUMULATOR

This operation is performed by depressing the CZ key (Fig. 1). Contacts CZ3 operate to switch on the shunt field motor. Contacts CZ4 (Fig. 1) then close to energize relays MR, R and S0 magnet.

Relay contacts MR1 (Fig. 1), operated by relay MR, serve to connect contacts 2—12 of the DIS. 1 level of the distributor switch in a common homing arc, and return the distributor switch to its home position in cases when the CZ key is inadvertently depressed with the distributor switch off its home position.

Magnet S0, when energized, attracts its armature 140 (Fig. 13) and moves the zero bar (Figs. 1B and 13) to the left. The zero bar is a comb-like structure having a series of slots 141 which, in the illustrated unoperated position of the zero bar, register with the long pins $p$ on the numeral wheels of the accumulator. When the zero bar is moved to the left by the magnet S0, the slots 141 are brought out of register with the long pins '$p$', so that when the numeral wheels are turned, as will now be described, each long pin '$p$' is intercepted by the zero bar when its wheel has reached the 0 position to stop the wheel in this position.

R relay connects all seven escapement magnets with the rotary interrupter ROT. INT., by way of operated contact CZ2 and operated contacts R1$x$—R6. The rotary interrupter is driven by a cam CC off the main motor shaft.

All escapement magnets are therefore fed with interrupted DC from ROT. INT. when CZ is operated manually.

The numeral wheels are thus all stepped on to zero by their escapement magnets, and are stopped in the zero position by the zero bar as already described.

When the operator sees that all the wheels have moved to bring their zero position opposite the reading window, he releases the CZ key.

GENERAL SCHEDULE OF OPERATIONS

The complete operation of the machine when calculating, as an example, the product $$36 \times £12.3.8 = £438.12.0$$

will now be described. The status of the several relays, magnets, keys, accumulator, and other elements, at various stages of the operation of the machine in performing this problem, is shown in the sequence chart, to which appropriate reference will be made. The time taken to multiply these factors with the illustrated machine is approximately—

| | Secs. |
|---|---|
| Phase 1, entry of multiplier and halving to obtain in the O. V. register the analysis of 36 | 2½ |
| Phase 2, entry of multiplicand, doubling and accumulation of product in the accumulator | 5 |

Phase 1

1. Throw Main Key (Figs. 1 and 15S) manually (point 1 on Figs. 15A, 15J, and 15S on the chart). Main and secondary bus bars are connected to the supply circuit.

2. Depress Start Key (Figs. 1 and 15S) momentarily (between points 2 and 3 on Figs. 15A, 15J, and 15S on the chart). This completes the following circuits:

(a) Positive, over wiper DIS. 1, contact 1 of its related level of contacts, operated Start key, and S relay, to negative; with contact W6 in its non-operated position the green lamp GL is connected in parallel across the S relay. These circuits cause the S relay to operate and the green lamp GL to glow.

(b) Relay S locks over positive, wiper DIS. 1, operated contact S1, S relay to negative. Lamp GL also continues to glow.

(c) The operation of the Start key also completes the following circuit simultaneously with the completion of the circuit (a) above: positive, operated Start key, e relay to negative. Relay e is operated and remains operated only so long as the Start key is held depressed.

(d) The closure of contacts e1—e6 (Figs. 2–7) energizes zero digit relays OP—OKD (between points 2 and 3 on Figs. 15A, 15J, and 15S of the chart), and a similar circuit, set up by another contact allocated to e relay, energizes zero digit relay 9V of the second overflow denomination (not illustrated).

(e) Zero digit relays 0N (Fig. 3) and 0M (Fig. 4) lock over circuits between the lines A and B, B line being connected to positive in these denominations by operated contact S3. All other zero digit relays release on release of the Start Key and consequent de-energization of e relay, because contact MP1 is not operated and their B lines are not connected to positive at this stage.

(f) Operated contact S2 connects positive to the a line.

The following condition is therefore reached: S relay, 0N relay, 0M relay are operated, GL is glowing and indicating to the operator that the multiplier may be manually entered, and potential is applied to the a line.

3. Enter 36 by depressing key 3 in Fig. 3 and key 6 in Fig. 4. See also between points 4 and 5 on Figs. 15A, 15J, and 15S of the chart. Circuits are then completed, as already described, to release 0N and 0M relays and to energize and lock relays 3N and 6M. S relay remains operated and GL remains glowing, during entry.

4. Depress OP key (Fig. 1B) (see also point 6 on Figs. 15A, 15J, and 15S of the chart). This completes a circuit negative, operated contact S5, DIST. magnet, positive. The DIST. magnet operates, advancing the wipers of the distributor switch one step off normal (point 8 on Figs. 15A, 15K, and 15S of the chart). The circuit from DIS. 1 to S relay and GL is thus broken. S relay is released and GL no longer glows.

Contact S2 in its non-operated position (Fig. 1A) disconnects a line from positive, thus rendering subsequent depression of keys in the factor register ineffective.

Contact S3 in its non-operated position is not effective to remove positive from B lines (Figs. 3 and 4), because these lines are now connected to positive through B relay and x line.

Contact S4 in its non-operated position connects $D^1$ line (Figs. 3 and 4) to positive.

Contact S5 in its non-operated position disconnects OP key from the DIST. magnet.

The distributor switch wipers having moved on their second contacts (point 7 on Figs. 15A, 15J, and 15S on the charts), cyclic halving of the entered multiplier proceeds, under the control of sequence control relays B, G, J, H and K, as already described, and the circuits need not therefore be gone through in detail. Mention should however now be made of the circuit which controls entries into the O. V. register.

It has already been explained that, when the multiplier or any of its quotients has an odd digit in the units denomination, lines $D^1$ and $E^1$ are joined by one of contacts 1M5, 3M5, 5M5, 7M5 or 9M5. Under these conditions DIS. 2 wiper is connected to positive as follows: positive, DIS. 1 wiper, x line, non-operated contact S4 (Fig. 1A), non-operated contact K3, non-operated contact MP3, $D^1$ line (Fig. 4), over contact closed by odd digit relay, $E^1$ line (Fig. 4), non-operated contact W4 (Fig. 1), operated contact B3 and DIS. 2 wiper.

The units denomination of the entered factor is thus tested at an early stage in the halving process, when relay B is operated and contacts B3 closed, and if this digit is odd, DIS. 2 wiper is then connected to positive. A circuit is then completed through that Z relay of the O. V. register opposite which DIS. 2 wiper is standing to negative via the contacts ZR1 or ZR2 of the ZR switch. The Z relay then energizes and locks over the associated Z1 contact. A circuit is also completed through the associated Z3 contact to cause a red lamp RL to glow.

The originally entered multiplier being 36, DIS. 2 wiper does not have positive potential applied thereto during the first halving cycle, while it is on contact 2 of the distributor switch, so that Z1 relay of the O. V. register will not be energized.

On the completion of the first halving cycle 18 will stand in the factor register and, as already explained, contacts K2 (Fig. 1B) will close towards the end of the cycle to energize DIST magnet, and step the distributor switch wipers on to the third contacts of the distributor switch.

A further halving cycle then commences automatically, and the multiplier is thus successively halved and the analysis of it will be entered in the O. V. register as follows:

| Halving Cycle | Factor Register at start of each Halving Cycle | DIS. 2 wiper on contact | Condition of O. V. Register |
|---|---|---|---|
| 1 | 36 | 2 | Z1 non-operated. |
| 2 | 18 | 3 | Z2 non-operated. |
| 3 | 09 | 4 | Z3 operated. |
| 4 | 04 | 5 | Z4 non-operated. |
| 5 | 02 | 6 | Z5 non-operated. |
| 6 | 01 | 7 | Z6 operated. |

The machine will obviously always perform seven halving cycles, because there are seven contacts (2-8) in the connected group traversed by wiper DIS. 1, after it leaves its home position. The halving cycle performed while wiper DIS. 2 is in contact 7 will, in the example given above, reduce the entry in the factor register to 00. Relay Z7 of the O. V. register will therefore not operate. The last halving cycle, performed while the distributor switch wipers are on contact 8, will be idle, 00 remaining in the factor register. After the conclusion of this final halving cycle, the distributor switch wipers step on to contact 9 (point 9 on Figs. 15B, 15K, and 15T of the chart) and leave contact 8 (point 10 on Figs. 15B, 15K, and 15T of the chart). When the wiper leaves contact 8, it removes positive potential on the DIS. 1 wiper, from x line and sequence control relays, and thus de-energizes all the sequence control relays and the zero digit relays 0N and 0M of the factor register. The energized relays of the O. V. register remain energized and red lamp RL remains glowing.

With DIS. 1 wiper on contact 9 a circuit is established from positive, over DIS. 1 wiper, and X relay, to negative, which circuit energizes the X relay. The consequent closure of X1 contacts (Fig. 1B) establishes the following circuit: negative, DIST. INT., operated contact X1, DIST. magnet, positive. The distributor switch self interrupts and DIS. 1 wiper steps in succession to contacts 10, 11, 12 (all connected to contact 9) and thence to its home position (contact 1). When DIS. 1 wiper leaves contact 12, (point 13 on Figs. 15C, 15L, and 15U of the chart), relay X is de-energized. As a result of this:

(a) Contacts X1 (Fig. 1B) first of all break, to de-energize DIST. magnet and leave the distributor switch wipers on their home contacts.

(b) Contacts X2, which are slower to break, complete the following circuit: negative, operated contact X2, DIS. 4 on contact 1 (point 12 on Figs. 15C, 15L, and 15D of the chart), relay W and green lamp GM in parallel, positive. W relay operates (point 14 on Figs. 15C, 15L, and 15U of the chart) and locks over the following circuit, lamp GM remaining glowing: positive, over W relay and lamp GM in parallel operated contact, W2, negative, so that W relay remains energized when contacts X2 break, which takes place immediately, and the motor is started over the following circuit: negative, operated contact W2, motor armature and field in parallel, positive. Operated contact W3, completes a circuit (see Fig. 1A and point 14 on Figs. 15C, 15L, and 15U of the chart) through MP and MQ relays to energize these relays, which relays operate their associated contacts to change the circuit connections between the sequence control relays and the factor register to those appropriate for multiplicand entry and doubling. Operated contact W4 opens the circuit to DIS. 2 wiper. This is necessary, because otherwise contact B3, when operated, would complete an undesired circuit to DIS. 2 wiper later during the cyclic doubling process. Operated contacts W5 complete a circuit to energize S relay (point 14 on Fig. 15U of the chart) but green lamp GL in parallel with it does not glow because contacts W6 are operated. S relay locks over operated contacts S1.

(c) Contacts X3, which are still slower to break than contacts X2, complete a circuit to energize e relay (point 11 on Figs. 15B, 15K, and 15T of the chart), and closure of contacts e2—e6 completes circuits to energize the zero digit relays in all denominations of the factor register, a further contact (not shown) of e relay energizing the zero digit relay of the V denomination. The zero digit relays then lock, each over circuit between lines A and B, the B lines in all denominations being connected to positive by operated contacts S3 and operated contacts MP1. Contacts X3 then break to de-energize e relay.

Automatic operation now ceases, and the following is a summary of the condition of the machine at this stage (point 15 on Figs. 15C, 15L, and 15U of the chart), the end of phase 1:

S relay is operated and is locked over contacts S1.

W relay is operated and is locked over contacts W2.

Relays MQ and MP are operated. Relays W, MQ and MP remain operated throughout the second phase.

The motor is in circuit and driving the accumulator shaft.

Zero digit relays in all denominations of the factor register are locked.

Green lamp GM glows to show that the machine is ready for entry of the multiplicand.

Appropriate O. V. register relays (in this case Z3 and Z6) are locked.

Red lamp RL glows to show that O. V. register contains the analysis of the multiplier.

*Phase 2*

1. The multiplicand £12.3.8. is entered manually (between points 16 and 17 on Figs. 15C, 15L, and 15U of the chart), the zero digit relays in denominations N, M, L and KD being de-energized and the appropriate digit relays representing the multiplicand being energized by the circuits already described. Zero digit relays in denominations H, P and V remain locked.

2. OP key is depressed (point 18 on Figs. 15C, 15L, and 15U of the chart). As in phase 1, DIST. magnet is given one step (contacts S5 being operated) to place the distributor switch wipers on contact 2. This breaks the circuit to S relay, which de-energizes.

A series of doubling cycles now takes place under the control of the sequence control relays as already described, and at the end of each doubling cycle the DIST. magnet is energized, by closure of contacts K2, to advance the distributor switch wiper another step.

To contacts 2–8 of the level associated with wiper DIS. 3 are connected respectively contacts Z1, 2–Z7, 2 of the O. V. register. When wiper DIS. 3 reaches a contact associated with an energized Z relay, a circuit is completed to energize a product entry control relay E. In the example under consideration this will take place for the first time on reaching contact 4 (point 19 on Figs. 15C, 15K, and 15U of the chart), as relays Z1 and Z2 have not been operated. The circuit is as follows: positive, operated contacts Z3, 2, DIS. 3 wiper, E relay, non-operated contacts CP3, operated contacts W2, negative.

Product entry control relay E operates (point 20 on Figs. 15C, 15L, and 15U of the chart) to initiate the entry into the accumulator of the amount now standing in the factor register. This will be the third term of the divergent series, formed by doubling the original multiplicand twice, i. e. £48.14.8. This entry into the accumulator is effected before the third doubling is performed. As a consequence of operation of E relay, operated contacts E1 short circuit B relay, and thus render the sequence control relays ineffective to perform a further doubling cycle, but the B lines to all denominations of the factor register are connected to positive over operated contacts E1 in order to maintain the digital relays representing £48.14.8 locked.

Operated contacts E2 complete a circuit to energize F relay (Fig. 1B) as follows: negative, operated contacts E2, F relay, non-operated contacts Q2, non-operated contacts CP1, positive.

Operation of F relay (point 21 on Figs. 15C, 15L, and 15U of the chart) closes contacts F1 to start the result switch, which takes a first step onto its second contacts and thereafter self-interrupts, as already described, to traverse the rest of its contacts (between points 21 and 25, Figs. 15C and 15D, of the chart).

Operated contacts F2 energize Q relay.

Operated contacts Q2 break the circuit to F relay which, having closed F1, to start the result switch, now is released.

Operated contacts Q1$x$ lock Q relay in circuit, and prevent further energization of F relay until Q relay has again been de-energized.

The following contacts are operative in the various denominations of the result switch:

$$\frac{VW,}{0V3}, \frac{PW,}{0P3}, \frac{NW,}{4N3}, \frac{MW,}{8M3}, \frac{HW,}{-}, \frac{LW,}{4L3}, \frac{KDW}{8KD3}$$

The escapement magnets therefore receive the following number of impulses:

| VE | PE | NE | ME | HE | LE | KDW |
|----|----|----|----|----|----|-----|
| 0  | 0  | 4  | 8  | 1  | 4  | 8   | and the corresponding numeral wheels of the accumulator are allowed to move a corresponding number of steps, thus entering £48.14.8. in the accumulator.

When the wiper assembly reaches contact 23 (point 22 on Figs. 15D, 15M, and 15V of the chart)—by which time the entry in the accumulator will have been completed— the following circuit is established: negative, TW wiper, contact 23 associated with TW wiper, contact 1 associated with CW1 wiper of carry over switch, CW1 wiper, CO. INT., C6 magnet, positive.

The carry over switch then self-interrupts and moves, as already described step by step, until its wipers reach contact 13, when its driving circuit is broken. No carry overs are of course made at this first entry into the accumulator.

Meanwhile wiper TW of the result switch steps on to its contact 25, (point 23 on Figs. 15D, 15M, and 15V of the chart), when a circuit is completed to energize T relay, i. e., negative, TW wiper, contact 25, T relay, positive.

T relay operates and locks over operated contact T3 and non-operated contacts CP4. The result switch meanwhile takes one further step to its home position (contact 1), also point 25 on Figs. 15D, 15M, and 15V of the chart where it stops as the circuit to magnet RM is now broken by contacts F1, which are not operated at this time.

The closure of contacts T2 (point 24 on Figs. 15D, 15M, and 15V of the chart) of T relay prepares the following circuit, which is completed when the CW2 wiper reaches the contact 13 (point 26 on Figs. 15E, 15N, and 15W of the chart): negative, CW2 wiper, contact 13 (wiper is on contact 13 at this time), operated contact T2, CP relay, positive. CP relay operates (point 27 on Figs. 15E, 15N, and 15W of the chart) and locks over circuit: negative, DIST. INT., which is non-operative at this time, operated contacts CP2, CP relay, positive.

Operated contacts CP1 break locking circuit of Q relay and de-energize.

Operated contacts CP4 break locking circuit of T relay and de-energize.

Operated contacts CP3 break circuit of E relay and de-energize it.

Non-operative contacts E1 open the short circuit to B relay, which operates to start the delayed third doubling cycle.

Doubling then proceeds automatically until DIS. 3 wiper steps on to its contact 7 (point 29 on Figs. 15E, 15N, and 15W of the chart), when operated contacts Z6, 2 energize E relay, so that B relay is short circuited by operated contacts E1 operated as before, and the fifth doubling cycle is delayed, while an entry of the amount now standing in the factor register is made in the accumulator (between points 30 and 31 on Figs. 15F, 15P, and 15X of the chart), this amount being £389.17.4 to produce a total in the accumulator of £438.12.0.

Relay CP has meanwhile been de-energized (point 28, Figs. 15E, 15N, and 15W of the chart) because at the conclusion of the first doubling cycle following its energization DIS. magnet has been energized to cause the distributor switch wipers to step on to the next contact, thus breaking at DIST. INT. the locking circuit for relay CP. During the entry into the accumulator of this second amount, carries over will be required from the pence, units of shillings, tens of shillings, units of pounds and tens of pounds denominations, and carry over storage relays CKD, CL, CH, CM and CN will accordingly all be energized; the carries over being made under control of wiper CW2 of the carry over switch, as previously described, as it travels from contact 13 over contacts 14—25 and so to home at contact 1 (between point 32 on Figs. 15F, 15P, and 15X and point 33 on Figs. 15G, 15Q, and 15Y of the chart).

The following is an analysis of what takes place during this second phase of the operation of the machine:

| Doubling Cycle | DIS 3 wiper on contact | Condition of O. V. register | Factor Register at start of each Doubling Cycle £ s. d. | Accumulator at end of Doubling Cycle £ s. d. |
|---|---|---|---|---|
| 1 | 2 | Z1 non-operated | 12 3 8 | |
| 2 | 3 | Z2 non-operated | 24 7 4 | |
| 3 | 4 | Z3 operated | 48 14 8 | 48 14 8 |
| 4 | 5 | Z4 non-operated | 97 9 4 | |
| 5 | 6 | Z5 non-operated | 194 18 8 | |
| 6 | 7 | Z6 operated | 389 17 4 | 438 12 0 |

The accumulator now contains the required product of 36×£12.3.8.

When DIS. 3 wiper reaches contact 8, a further, and in this case idle, doubling cycle takes place—the multiplier having already been reduced to unity at the start of the preceding cycle and O. V. register relay 27 being non-operated. At the conclusion of this cycle the distributor switch wipers step from contacts 8 (point 34, Figs. 15G, 15Q, and 15Y of the chart) on to contacts 9 removing positive potential from the x line at DIS. 1 wiper, and just as at this stage in phase 1, de-energizing the sequence control relays and all the digit relays of the factor register, which is thus cleared.

X relay is again energized at this stage, by the same circuit as before, causing the distributor switch to step on to the home position, where X relay is de-energized, X1 contacts breaking to de-energize DIST magnet. Contacts X2 have no function to fulfil at this stage, as relay W was energized at the close of phase 1 and has remained energized throughout phase 2.

S relay is re-energized, over operated contacts W5, by arrival of DIS. 1 wiper on its home contact (point 36 on Figs. 15H, 15R, and 15Z of the chart) and S relay locks over contact S1.

Contacts X3 operate as before to give a momentary energization of e relay (point 35 on Figs. 15G, 15Q, and 15Y of the chart) and energize and lock the zero digit relays in all denominations of the factor register.

Automatic operation now ceases, phase 2 being completed with the machine left in exactly the same condition as it was after phase 1, except that the product £438.12.0 is now entered on the register.

The operator now has three alternatives:

(1) By entering a fresh multiplicand and depressing OP key, to multiply this second multiplicand by the same multiplier, the analysis whereof is retained in the O. V. register, and add the product to the previous product now standing in the accumulator.

(2) To clear the accumulator only, leaving energized the other parts of the machine, i. e. O. V. register, relays S, W, MP, MQ and zero digit relays in all denominations of the factor register, the motor still running and the green lamp GM glowing. This is done by depressing ZR key prior to depression of the zeroizing key CZ. This will permit of multiplication of the original multiplier by a new multiplicand, and entry of the product into the cleared accumulator without addition to the previous product.

(3) To clear the machine completely, which is done by depressing CZ key, ZR key being undepressed, and thereafter momentarily releasing the main key.

On depression of the zeroizing key CZ (ZR key being undepressed) the accumulator is zeroized as already described. Also, as previously described, the main bus bars are cut out of circuit, so that the O. V. register relays are de-energized. The motor is maintained in circuit to zeroize the accumulator, because relay W, which derives current from the secondary bus bars is still operated. On release of key CZ, relays W, S, MP and MQ, the motor, the zero digit relays in all denominations and the green lamp GM remain in circuit. By momentary release of the main key, however, all these relays and lamp GM are de-energized, and the motor is stopped, due to the cutting out of circuit of the secondary bus bars, and the machine is in the same condition as it was at the start of phase 1, ready for the entry of a new multiplier, which can be effected immediately the start key has again been depressed.

If, however, the ZR key is depressed prior to depression of the CZ key, depression and subsequent release of the CZ key will now merely zeroize the accumulator, and leave the relays of the O. V. register, relays W, S, MP and MQ and the zero digit relays in all denominations operated, the green lamp GM glowing and the motor running, thus conditioning the machine for immediate further phase 2 operation.

The machine is capable of fulfilling the following additional functions:

ADDITION

The relays $Z1$, $Z2$, $Z3$, $Z4$, $Z5$, $Z6$ and $Z7$ of the O. V. register, when energized, serve respectively, as already explained, to enter into the accumulator the products of the multiplicand and the factors $2^0$, $2^1$, $2^2$, $2^3$, $2^4$, $2^5$ and $2^6$. Clearly therefore the machine can be used as an adding machine if provision is made for energizing $Z1$ relay only of the O. V. register and conditioning the machine for phase 2 operation. Successive factors entered on the keyboard would then be entered in the accumulator, and there added together.

To condition the machine for addition, the main key is depressed as before, to connect $Ov$ and $Ov^1$ lines respectively to positive and negative.

If the Add Key (a non-locking key), Fig. 1, is now depressed, a circuit is completed from positive, $Ov$ line, operated Add Key, $Z1$ relay, $Ov^1$ line, negative. $Z1$ relay energizes and locks over contacts $Z1$, $1$. Contacts $AD1$ (Fig. 1) then close momentarily, whereupon the following two circuits are completed:

(a) Positive, motor armature and field in parallel, operated contacts $AD1$, negative, thus starting the motor.

(b) Positive, W relay, operated contacts $AD1$, negative, thus energizing W relay and lamp GM in parallel with it. Consequently: operated contacts W3 energize relays MP, MQ. Operated contacts W5 energize relay S, which locks over $S1$.

On subsequent break of contacts $AD1$, the motor and relay W are maintained in circuit as follows: positive, relay W and motor in parallel, operated contacts W2, negative.

Contacts AD3 operate momentarily, during the down stroke of the Add Key (releasing should the Add Key be held depressed) to complete a circuit to energize momentarily $e$ relay, thus energizing the zero digit relays in all denominations.

The machine is thus conditioned for phase 2 operation. On entry of an amount in the factor register, and depression of OP key, the distributor switch wipers step on to contact 2, and product entry control relay E is energized to enter the amount in the accumulator, whereafter the distributor switch steps on over its remaining contacts, idle doubling cycles being rapidly performed, the amounts so produced not being entered in the accumulator because none of relays $Z2$–$Z7$ of the O. V. register are energized.

On return of the distributor switch to its home position the zero digit relays in the factor register are again energized and locked, as previously described, and the machine is conditioned for entry of a further amount to be added to the total in the accumulator.

The machine can be cleared for phase 1 operation by depression of CZ key, ZR key being undepressed, and subsequent momentary release of the Main Key as already described. Alternatively, the accumulator only can be cleared, leaving the machine in condition for further addition by depression of ZR key followed by depression of CZ key.

DIRECT ENTRY IN O. V. REGISTER

It will be understood that by providing keys similar to the Add Key associated with the other relays in the O. V. register it will be possible to set up directly therein the required analysis of the multiplier, without going through the cyclic halving processes of phase 1.

Keys AA, AB and AC for such direct entry are shown associated with relays $Z3$, $Z4$ and $Z5$ respectively, but similar keys can be provided for the other relays of the O. V. register. These keys AA, AB and AC operate on the $AD1$ and $AD3$ contacts in the same way as the Add Key.

If for instance key AA is depressed, a circuit is completed from positive, operated key AA, $Z5$ relay, $Ov^1$ line, negative, $Z5$ relay energizing and locking over contacts $Z5$, $1$. The motor is started, W, S, MP and MQ relays are energized and $e$ relay momentarily energized to set and lock the zero digit relays in all denominations as before. The machine is thus conditioned for phase 2 operation with an entered multiplier of $2^4$, i. e. 16.

Various multipliers can be set up by depressing suitable combinations of the keys associated with the O. V. register, e. g. 20 by depressing keys AA and AC, 25 by depressing keys AA, AB and the Add Key and so on. If keys similar to AA, AB and AC are associated with the remaining relays of the O. V. register, any multiplier within the capacity of the machine (i. e. up to 99) can evidently be directly entered into the O. V. register by depressing a suitable combination of these keys and of the Add Key, if necessary. The Add Key is obviously only needed for an odd multiplier.

What I claim as my invention and desire to secure by Letters Patent is:

1. A multiplying machine, comprising means effective upon the entry of a multiplier factor therein for forming in succession the terms of a convergent series obtained by dividing the multiplier by successive ascending powers of two and ignoring fractions in the resultant quotients, said dividing operation commencing with the zero power of two and continuing until a quotient of unity is reached; an odd values register for registering the occurrence of each odd valued term in said convergent series; means operable subsequently and effective upon the entry of a multiplicand factor therein to form in succession the terms of the divergent series obtained by multiplying the multiplicand by the same successive ascending powers of two by which the multiplier was divided; an accumulator and means controlled by the odd values register for entering in an accumulator those terms of the divergent series which are related to the same power of two as the odd valued terms of the convergent series.

2. A multiplying machine, comprising a factor register common to the two factors to be multiplied, means effective upon the entry of a multiplier factor therein for forming in succession in the factor register the terms of a convergent series obtained by dividing the multiplier by successive ascending powers of two and ignoring fractions in the resultant quotients, said dividing operation commencing with the zero power of two and continuing until a quotient of unity is reached, means operative thereafter and upon entry of a multiplicand factor in said register to form in succession in the factor register the terms of a divergent series obtained by multiplying the multiplicand by the same successive ascending powers of two by which the multiplier was divided, an accumulator, and an odd values register operable during the formation of the convergent series to set up controls which, during the formation of the divergent series, will be effective to enter into an accumulator those terms of the divergent series which are related to the same power of two as the odd valued terms of the convergent series.

3. A multiplying machine as claimed in claim 2, in which the factor register comprises groups of electrical relays for each denomination of the original factors and also for possible additional denominations of any of the terms of the divergent series, one or more of the denominational groups of relays serving first to form the terms of the convergent series and thereafter, if necessary in conjunction with other denominational groups or relays, to form the terms of the divergent series, digital values in any denomination being represented solely by relays.

4. A multiplying machine as claimed in claim 2, in which the odd values register comprises a series of automatically lockable relays, one allocated to each term of the convergent series.

5. In a multiplying machine, the combination of a factor register consisting of a plurality of denominational groups of digit relays, certain of which groups of relays are operable to receive multiplier factor data and multiplicand factor data in successive phases of operation of the machine and other of which groups of relays are operable to receive multiplicand data in the second phase of operation of the machine; a keyboard for entering factor data in said factor register before each phase of the operation of the machine, each key, when depressed, being effective to energize the corrsponding digit relay in its associated denomination; a group of transfer relays for each denominational group of relays settable under control of the digit relays therein and operable to control the setting of the digit relays; cyclically operable means for enabling the digit relays of said certain groups of relays to set the transfer relays and the transfer relays thereafter to operate the digit relays of said certain groups of relays to set up in said digit relays in succession during the first phase of the operation of the machine the terms of a converging series obtained by dividing the multiplier factor by successive ascending powers of two and ignoring fractions in the resultant quotients, said dividing operation commencing with the zero power of two and continuing until a quotient of unity is obtained to end the first phase of the machine operation; means operated at the end of the first phase of operation for conditioning the machine for the second phase of the operation by preparing the cyclically operable means for operation to enable the digit relays in all the denominational groups to set the transfer relays and the transfer relays to operate the digit relays of all the groups to set up in said digit relays in succession during the second phase of the operation of the machine, the terms of a diverging series obtained by multiplying the multiplicand by the same successive ascending powers of two by which the multiplier was divided.

6. In a multiplying machine, the combination of factor entering means for entering multiplier data; a multi-denominational order factor entry receiving device for receiving multiplier data; halving means settable under control of the entry receiving device and operable to control a further setting of the entry receiving device to represent the whole number part of half the amount previously therein; cyclically operable means for controlling the operation of the halving means to cause the receiving device to be set repeatedly to provide, in each cycle of operation, one of the terms of a converging series formed by the whole number part of amounts obtained by dividing the multiplier by successive ascending powers of two, said dividing operation commencing with the zero power of two and continuing until a quotient of unity is reached; an odd value register having therein a settable element corresponding to each of said powers of two; testing means cooperable with the entry receiving device for testing whether or not the various terms of the converging series are odd or even; and means operated by the cyclically operable control means for successively associating the testing means with the elements of the register in the several cycles of operation so that the element of the register corresponding to a particular power of two can be set by the testing means if the quotient resulting from a division of the multiplier by that power of two is odd.

7. In a multiplying machine, the combination of factor entering means for entering multiplier data; a multi-denominational order factor entry receiving device for receiving multiplier data; halving means settable under control of the entry receiving device and operable to control a further setting of the entry receiving device to represent the whole number part of half the amount previously therein; cyclically operable means for controlling the operation of the halving means to cause the receiving device to be set repeatedly to provide, in each cycle of operation, one of the terms of a converging series formed by the whole number part of amounts obtained by dividing the multiplier by successive ascending powers of two, said dividing operation commencing with the zero power of two and continuing until a quotient of unity is reached; an odd value register having therein a relay corresponding to each of said powers of two; a testing circuit controlled by the entry receiving device for testing whether or not the various terms of the converging series are odd or even; a distributor switch operable to connect the testing circuit to the relays of the odd value register one after another in succession; and means operated by the cyclically operable control means to cause an operation of the distributor switch upon each cycle of operation, to connect the testing circuit to the relay corresponding to the power of two by which the multiplier is being divided, so that the relay related to that power of two can be energized if the quotient resulting from the division is odd.

8. In a multiplying machine, the combination of factor entering means for entering multiplicand data, a multi-demoninational order entry receiving device settable according to multiplicand data; a register upon which the multiplier may be set in binary form; doubling means settable under control of the entry receiving device and operable to cause a further setting of the entry and receiving device to represent twice the amount previously therein, an accumulator; means for entering amounts in said accumulator under control of the entry receiving device; cyclically operable means for controlling the operation of the doubling means to cause the receiving device to be set repeatedly to provide the terms, one for each cycle of operation, of a diverging series obtained by multiplying the multiplicant by successive ascending powers of two beginning with the zero power; means for testing the orders of the register to determine whether an entry has been made therein; means operated by the cyclically operable means for successively associating the testing means with the orders of the register beginning with the order representing the zero power of two so that the testing of the orders of the register will advance as the terms of the series are formed; and means operated by the testing means, when it senses an entry in an order of the register, for causing the amount entering means to operate to enter into the accumulator the term of the series related to the same power of two.

9. In a multiplying machine, the combination of factor entering means for entering multiplicand data, a multi-demoninational order entry receiving device settable according to multiplicand data; a register upon which the multiplier may be set in binary form; doubling means settable under control of the entry receiving device and operable to cause a further setting of the entry receiving device to represent twice the amount previously therein; an accumulator; means for entering amounts in said accumulator under control of the entry receiving device; cyclically operable means for controlling the operation of the doubling means to cause the receiving device to be set repeatedly to provide the terms, one for each cycle of operation, of a diverging series obtained by multiplying the multiplicand by successive ascending powers of two beginning with the zero power; means for testing the orders of the register to determine whether an entry has been made therein; means operated by the cyclically operable means for successively associating the testing means with the orders of the register beginning with the order representing the zero power of two so that the sensing of the orders of the register will advance as the terms of the series are formed; and means operated by the testing means, when it senses an entry in an order of the register, for causing the amount entering means to operate to enter into the accumulator the term of the series related to the same power of two, and for interrupting the cyclic operation of the cyclically operable means to prevent a further doubling operation from being made until the amount entering means has completed its operation.

10. In a multiplying machine the combination of factor entering means for multiplicand data, a multi-denominational entry receiving device settable according to multiplicand data; a register upon which the multiplier may be set in binary form; means operable after the entry of the multiplicand factor in the entry receiving device to form in succession in the entry receiving device the terms of a divergent series obtained by multiplying the multiplicand by successive ascending powers of two beginning with the zero power of two; an accumulator; amount entering means controlled by the entry receiving device and rendered operable under control of the register to enter the amount of a term in the entry receiving device into the accumulator when the term in the entry receiving device is the result of a multiplication by a power of two for which an entry has been made in a corresponding order of the register; means rendered operable during an amount entering operation for interrupting the multiplying operations; and means operated by the amount entering means for causing the multiplying operations to be resumed at the completion of an amount entering operation.

11. In a multiplying machine, the combination of factor entering means for entering multiplicand data, a multi-denominational order entry receiving device settable according to multiplicand data; a register upon which the multiplier may be set in binary form; doubling means settable under control of the entry receiving device and operable to cause a further setting of the entry receiving device to represent twice the amount previously therein; a product accumulator; means for entering amounts in said accumulator under control of the entry receiving device to form a product; cyclically operable means for controlling the operation of the doubling means to enable the receiving device to be set repeatedly to provide the terms, one for each cycle of operation, of a diverging series obtained by multiplying the multiplicand by successive ascending powers of two beginning with the zero power; means for testing the orders of the register to determine whether an entry has been made therein; means operated by the cyclically operable means for successively associating the testing means with the orders representing the zero power of two so that the sensing of the orders of the register will advance as the terms of the series are formed; a product entry relay operated by the testing means, when it finds an entry in an order of the register, for causing the amount entering means to operate to enter into the accumulator the term of the series related to the same power of two, and for interrupting the operation of the cyclically operable means to prevent a further doubling operation from being made; and means operated by the amount entering means at the end of the entering operation to release the product entry relay and allow the cyclically operable means to resume operation to perform a further doubling operation.

12. In a multiplying machine, the combination of factor entering means for entering multiplier data and multiplicand data; a multi-denominational order factor entry receiving device for receiving both factors of a computation one after another in succession: halving means settable under control of the entry receiving device and operable to control a setting of the entry receiving device according to the whole number part of half the amount previously therein; doubling means settable under control of the entry receiving device and operable to control a setting of the entry receiving device according to twice the amount previously therein; cyclically operable means for controlling the operation of the halving means during a first phase of a multiplying operation, when the factor in the entry receiving device is the multiplier, to enable the receiving device to be set repeatedly according to the terms of a converging series of whole number amounts obtained by dividing the multiplier by successive ascending powers of two, said dividing operation commencing with the zero power of two and continuing until a quotient of unity is reached; and means operable at the end of the first phase of the multiplying operation for enabling the cyclically operable means to control the operation of the doubling means during a second phase of the multiplying operation, when the factor in the entry receiving device is the multiplicand, to enable the receiving device to be set repeatedly according to the terms of a diverging series obtained by multiplying the multiplicand by the same successive ascending powers of two by which the multiplier was divided.

13. In a multiplying machine, the combination of factor entering means for entering multiplier data and multiplicand data; a multi-denominational order factor entry receiving device for receiving both factors of a computation one after another in succession; halving means settable under control of the entry receiving device and operable to control a setting of the entry receiving device to represent the whole number part of half the amount previously therein; doubling means settable under control of the entry receiving device and operable to control a setting of the entry receiving device to represent twice the amount previously therein; an accumulator; driving means for the accumulator; cyclically operable means for controlling the operation of the halving means, during a first phase of a multiplying operation when the factor in the entry receiving device is the multiplier, to enable the receiving device to be set repeatedly according to the terms of a converging series of whole number amounts obtained by dividing the multiplier by successive ascending powers of two, said dividing operation commencing with the zero power of two and continuing until a quotient of unity is reached; means operable at the end of the first phase of the multiplying operation for rendering the accumulator drive operable in the second phase of the multiplying operation and for enabling the cyclically operable means to control the operation of the doubling means, during a second phase of the multiplying operation when the factor in the entry receiving device is the multiplicand, to enable the receiving device to be set repeatedly according to the terms of a diverging series obtained by multiplying the multiplicand by the same succesisve ascending powers of two by which the multiplier was divided; and means operable in said second phase to cause the entry in the accumulator of the amount of the terms of the diverging series which correspond to odd value terms of the converging series which was formed during the first phase of the multiplying operation.

14. A multiplying machine, comprising a factor register common to the two factors to be multiplied; means effective upon the entry of a multiplier factor therein for forming in succession in the factor register the terms of a convergent series obtained by dividing the multiplier by successive ascending powers of two and ignoring fractions in the resulting quotients, said dividing operation commencing with the zero power of two and continuing until a quotient of unity is reached; means operative thereafter and upon entry of a multiplicand factor in said register to form in succession in the factor register the terms of a divergent series obtained by multiplying the multiplicand by the same successive ascending powers of two by which the multiplier was divided; an accumulator; an odd value register settable during the formation of the convergent series to indicate which of the terms are odd values; and amount entering means rendered operative under control of the odd value register when any term of the divergent series corresponds to an odd-value term in the convergent series, and controlled by the factor register to enter that term of the divergent series into the accumulator.

15. A multiplying machine, comprising a factor register common to the two factors to be multiplied; means effective upon the entry of a multiplier factor therein for forming in succession in the factor register the terms of a convergent series obtained by dividing the multiplier by successive ascending powers of two and ignoring fractions in the resulting quotients, said dividing operation commencing with the zero power of two and continuing until a quotient of unity is reached; means operative thereafter and upon entry of a multiplicand factor in said register to form in succession in the factor register the terms of a divergent series obtained by multiplying the multiplicand by the same successive ascending powers of two by which the multiplier was divided; an accumulator; an odd values register settable during the formation of the convergent series to indicate which of the terms are odd values; and amount entering means rendered operative under control of the odd value register when any term of the divergent series corresponds to an odd-value term in the convergent series, and controlled by the factor register to enter that term of the divergent series into the accumulator, said amount entering means including a step-by-step operating switch having a wiper for each denomination of the product, a bank of contacts associated with each wiper, driving means for moving the wipers step-by-step from one contact to the next of their associated contact banks, and an escapement magnet for each denomination of the accumulator, each wiper being effective, as it traverses its bank of contacts, to impart to its associated escapement magnet a number of impulses corresponding to the digital value, in its associated denomination, of the amount of the term to be entered into the accumulator, and thereby to cause said escapement magnet to make a corresponding entry in the associated denomination of the accumulator.

16. A multiplying machine, comprising a factor register common to the two factors to be multiplied; means effective upon the entry of a multiplier factor therein for forming in succession in the factor register the terms of a convergent series obtained by dividing the multiplier by successive ascending powers of two and ignoring fractions in the resulting quotients, said dividing operation commencing with the zero power of two and continuing until a quotient of unity is reached; means operative thereafter and upon entry of a multiplicand factor in said register to form in succession in the factor register the terms of a divergent series obtained by multiplying the multiplicand by the same successive ascending powers of two by which the multiplier was divided; an accumulator; an odd values register settable during the formation of the convergent series to indicate which of the terms are odd values; and amount entering means rendered operative under control of the odd value register when any term of the divergent series corresponds to an odd-value term in the convergent series, and controlled by the factor register to enter that term of the divergent series into the accumulator, said amount entering means including a step-by-step operating switch having a wiper for each denomination of the product, a bank of contacts associated with each wiper, driving means for moving the wipers step-by-step from one contact to the next of their associated contact banks, and an escapement magnet for each denomination of the accumulator, each wiper being effective, as it traverses its bank of contacts, to impart to its associated escapement magnet a number of impulses corresponding to the digital value, in its associated denomination, of the amount of the term to be entered into the accumulator, and thereby to cause said escapement magnet to make a corresponding entry in the associated denomination of the accumulator, said switch being given its first step of movement when the odd value register indicates that the term of the divergent series corresponds to an odd value term of the convergent series, and having a further wiper, which in cooperation with contacts, completes a circuit in the second and succeeding steps of movement of the switch to drive the switch step by step over the remaining contacts to its home position.

17. A multiplying machine, comprising a factor register common to the two factors to be multiplied; means effective upon the entry of a multiplier factor therein for forming in succession in the factor register the terms of a convergent series obtained by dividing the multiplier by successive ascending powers of two and ignoring fractions in the resulting quotients, said dividing operation commencing with the zero power of two and continuing until a quotient of unity is reached; means operative thereafter and upon entry of a multiplicand factor in said register to form in succession in the factor register the terms of a divergent series obtained by multiplying the multiplicand by the same successive ascending powers of two by which the multiplier was divided; an accumulator; an odd values register settable during the formation of the convergent series to indicate which of the terms are odd values; amount entering means controlled by the factor register to enter any term of the divergent series into the accumulator, said amount entering means including a step-by-step operating switch having a wiper for each denomination of the product, a bank of contacts associated with each wiper, driving means for moving the wipers step-by-step from one contact to the next of their associated contact banks, and an escapement magnet for each denomination of the accumulator, each wiper being operable, as it traverses its bank of contacts, to impart to its associated escapement magnet a number of impulses corresponding to the digital value, in its associated denomination, of the amount of the term to be entered into the accumulator, and thereby to cause said escapement magnet to make a corresponding entry in the associated denomination of the accumulator; means controlled by the odd value register for giving said switch its first step of movement when the odd value register indicates that the term of the divergent series corresponds to an odd value term of the convergent series thereby to initiate an amount entering operation, said switch having a further wiper which in cooperation with a bank of contacts completes a circuit after the first step and during succeeding steps of movement of the switch to drive the switch step by step over the remaining contacts to its home position.

18. A multiplying machine, comprising a factor register common to the two factors to be multiplied; means effective upon the entry of a multiplier factor therein for forming in succession in the factor register the terms of a convergent series obtained by dividing the multiplier by successive ascending powers of two and ignoring fractions in the resulting quotients, said dividing operation commencing with the zero power of two and continuing until a quotient of unity is reached; means operative thereafter and upon entry of a multiplicand factor in said register to form in succession in the factor register the terms of a divergent series obtained by multiplying the multiplicand by the same successive ascending powers of two by which the multiplier was divided; an accumulator; an odd values register settable during the formation of the convergent series to indicate which of the terms are odd values; and amount entering means rendered operative under control of the odd value register when any term of the divergent series corresponds to an odd-value term in the convergent series, and controlled by the factor register to enter that term of the divergent series into the accumulator, said amount entering means including a step-by-step operating switch having a wiper for each denomination of the product, a bank of contacts associated with each wiper, the contacts of any bank being connected in series by switches controlled by the corresponding order of the entry receiving device, with the switches of the series being normally closed but opened at a point corresponding to the digit in the receiving device so that the number of contacts corresponding to the digit will be connected in series, driving means for moving the wipers step-by-step from one contact to the next of their associated contact banks, and an escapement magnet for each denomination of the accumulator, each wiper being operable, as it traverses its bank of contacts, to import to its associated escapement magnet a number of impulses corresponding to the number of contacts effectively connected in series, in its associated denomination, as determined by the term to be entered into the accumulator, and thereby to cause said escapement magnet to make a corresponding entry in the associated denomination of the accumulator.

19. In a multiplying machine, the combination of factor entering means for multiplicand data; a multi-denominational entry receiving device settable according to multiplicand data; a register upon which the multiplier may be set in binary form; means operable after the entry of the multiplicand factor in the entry receiving device to form in succession in the receiving device, the terms of a divergent series obtained by multiplying the multiplicand by successive ascending powers of two beginning with the zero power of two; a multi-denominational accumulator; an amount entering means controlled by the entry receiving device and rendered operable under control of the register to enter the amount of the term in the entry receiving device into the accumulator when the term in the entry receiving device is the result of a multiplication by a power of two for which an entry has been made in a corresponding order of the register, said amount entering means including a step-by-step operating switch having a wiper for each denomination of the product, a bank of contacts associated with each wiper, driving means for moving the wipers step-by-step from one contact to the next of their associated contact banks, and a magnet for controlling the operation of each denomination of the accumulator, each wiper being effective, as it traverses its bank of contacts, to impart to its associated control magnet a number of impulses corresponding to the digital value, in its associated denomination, of the amount of the term to be entered into the accumulator, and thereby to cause said control magnet to cause a corresponding entry to be made in the associated denomination of the accumulator; a carry over storage relay for each denominational order of the accumulator except the highest order, which carry over relays are energized selectively when a carry over to the next higher denomination is caused by the entry into any particular order, and prepare circuits to the required control magnets for effecting said carry over entries; and a carry over switch set in operation by the step-by-step operating switch near the end of an amount entering operation, for completing the prepared circuits to send an impulse to each of the respective control magnets to cause the carry over entries to be made.

20. A multiplying machine, comprising a factor register common to the two factors to be multiplied; means effective upon the entry of a multiplier factor therein for forming in succession in the factor register the terms of a convergent series obtained by dividing the multiplier by successive ascending powers of two and ignoring fractions in the resulting quotients, said dividing operation commencing with the zero power of two and continuing until a quotient of unity is reached; means operative thereafter and upon entry of a multiplicand factor in said register to form in succession in the factor register the terms of a divergent series obtained by multiplying the multiplicand by the same successive ascending powers of two by which the multiplier was divided; an accumulator; an odd values register settable during the formation of the convergent series to indicate which of the terms are odd values; amount entering means controlled by the factor register to enter any term of the divergent series into the accumulator, said amount entering means including a step-by-step operating switch having a wiper for each denomination of the product, a bank of contacts associated with each wiper, driving means for moving the wipers step-by-step from one contact to the next of their associated contact banks, and an escapement magnet for each denomination of the accumulator, each wiper being operable, as it traverses its bank of contacts, to impart to its associated escapement magnet a number of impulses corresponding to the digital value, in its associated denomination, of the amount of the term to be entered into the accumulator, and thereby to cause said escapement magnet to make a corresponding entry in the associated denomination of the accumulator; means controlled by the odd value register for giving said switch its first step of movement when the odd value register indicates that the term of the divergent series corresponds to an odd value term of the convergent series thereby to initiate an amount entering operation, said switch having a further wiper, which in cooperation with a bank of contacts completes a circuit after the first step and during succeeding steps of movement of the switch to drive the switch step by step over the remaining contacts to its home position; said means controlled by said odd-value register having further means to interrupt the multiplying operations during the operation of the amount entering means; and means operated by the switch in its last step of movement before reaching home position, for causing multiplying operations to be resumed.

21. In a multiplying machine, the combination of factor entering means for entering multiplier data and multiplicand data; a multi-denominational order factor entry receiving device for receiving both factors of a computation one after another in succession; means operable to enter zero in each order of the factor entry receiving device; halving means settable under control of the entry receiving device and operable to control a further setting of the entry receiving device; doubling means settable under control of the entry receiving device and operable to control a further setting of the entry receiving device; means for rendering the zero entering means operable to enter zero in each order of the factor entry receiving device before the entry of the multiplier data into the entry receiving device, which zero setting in any order is removed by the entry of a digit therein by the factor entering means; cyclically operable means for controlling the operation of the halving means, during a first phase of a multiplying operation when the factor in the entry receiving device is the multiplier, to enable the receiving device to be set repeatedly to provide the terms of a converging series obtained by dividing the multiplier by successive ascending powers of two and ignoring fractions in the resulting quotients, said dividing operation commencing with the zero power of two and continuing until a quotient of unity is reached; and means operable at the end of the first phase for automatically operating the zero entering means to cause zero to be entered into the entry receiving device before the multiplicand data is entered therein and for enabling the cyclically operable means to control the operation of the doubling means, during a second phase of the multiplying operation when the factor in the entry receiving device is the multiplicand, to enable the receiving device to be set repeatedly to provide the terms of a diverging series obtained by multiplying the multiplicand by the same successive ascending powers of two by which the multiplier was divided.

22. In a multiplying machine, the combination of factor entering means for entering multiplier data; a multi-denominational order factor entry receiving device for receiving multiplier data; halving means settable under control of the entry receiving device and operable to control a further setting of the entry receiving device to represent the whole number part of half the amount previously therein; cyclically operable means for controlling the operation of the halving means to cause the receiving device to be set repeatedly to provide, in each cycle of operation, one of the terms of a converging series formed by the whole number part of amounts obtained by dividing the multiplier by successive ascending powers of two, said dividing operation commencing with the zero power of two and continuing until a quotient of unity is reached; an odd value register having therein a settable element corresponding to each of said powers of two; testing means cooperable with the entry receiving device for testing whether or not the various terms of the converging series are odd or even; and means operated by the cyclically operable control means for successively associating the testing means with the elements of the register in the several cycles of operation so that the element of the register corresponding to a particular power of two can be set by the testing means if the quotient resulting from a division of the multiplier by that power of two is odd; a clearing key; means operated by the clearing key for normally clearing the entry receiving device, the halving means, the cyclically operable means, and the odd value register of any setting and restoring them to their unoperated condition; and selectively operable means for modifying the operation of the means operated by the clearing key to prevent the clearing of the odd value register when the other parts are cleared, whereby to enable the analysis of the multiplier to be retained for further use.

23. In a multiplying machine, the combination of factor entering means for entering multiplier data and multiplicand data; a multi-denominational order factor entry receiving device for receiving both factors of a computation one after another in succession; halving means settable under control of the entry receiving device and operable to control a setting of the entry receiving device to represent the whole number part of half the amount previously therein; doubling means settable under control of the entry receiving device and operable to control a setting of the entry receiving device to represent twice the amount previously therein; cyclically operable means for controlling the operation of the halving means during a first phase of a multiplying operation, when the factor in the entry receiving device is the multiplier, to enable the receiving device to be set repeatedly to represent the terms of a converging series of whole number amounts obtained by dividing the multiplier by successive ascending powers of two, said dividing operation beginning with the zero power of two and continuing until a quotient of unity is reached; an odd value register settable to indicate which powers of two have produced odd-valued quotients during the first phase of the multiplying operation; an accumulator; amount entry means controlled by the entry receiving device; testing means for sensing the entries in the odd value register; means operable at the end of the first phase of the multiplying operation for conditioning the machine for the second phase of the multiplying operation by enabling the cyclically operable means to control the operation of the doubling means during the second phase of the multiplying operation when the factor in the entry receiving device is the multiplicand, to enable the receiving device to be set repeatedly to represent the terms of a diverging series obtained by multiplying the multiplicand by the same powers of two by which the multiplier was divided, and for rendering the accumulator operable and the testing means operable to render the amount entering means operable to enter into the accumulator, during the second phase of the multiplying operation, those terms of the diverging series which are formed by a multiplication by the same power of two that caused an odd value quotient in the first phase of the multiplying operation; a clearing key; means operated by the clearing key normally to clear the various parts of the machine of any setting and restore them to their unoperated condition; and settable means selectively operable to modify the control by the clearing key to cause the setting of the odd-value register and the means for conditioning the machine for the second phase of operation to be retained so that the multiplier analysis is retained and the machine is retained in condition for the immediate entry of multiplicand data for another multiplication operation involving the same multiplier.

24. In a multiplying machine, the combination of factor entering means for entering multiplier data; a multi-denominational order factor entry receiving device for receiving multiplier data; halving means settable under control of the entry receiving device and operable to control a further setting of the entry receiving device to represent the whole number part of half the amount previously therein; cyclically operable means for controlling the operation of the halving means to cause the receiving device to be set repeatedly to provide, in each cycle of operation, one of the terms of a converging series formed by the whole number part of amounts obtained by dividing the multiplier by successive ascending powers of two, said dividing operation commencing with the zero power of two and continuing until a quotient of unity is reached; an odd value register having therein a settable element corresponding to each of said powers of two; testing means cooperable with the entry receiving device for testing whether or not the various terms of the converging series are odd or even; means operated by the cyclically operable control means for successively associating the testing means with the elements of the register in the several cycles of operation so that the element of the register corresponding to a particular power of two can be set by the testing means if the quotient resulting from a division of the multiplier by that power of two is odd; an addition key; and means operated by the addition key for directly setting the element in the odd-value register which represents the zero power of two.

25. In a multiplying machine, the combination of factor entering means for entering multiplicand data, a multi-denominational order entry receiving device settable according to multiplicand data; a register upon which the multiplier may be set in binary form; doubling means settable under control of the entry receiving device and operable to cause a further setting of the entry receiving device to represent twice the amount previously therein; an accumulator; means for entering amounts in said accumulator under control of the entry receiving device; cyclically operable means for controlling the operation of the doubling means to cause the receiving device to be set repeatedly to provide the terms, one for each cycle of operation, of a diverging series obtained by multiplying the multiplicand by successive ascending powers of two beginning with the zero power; product entry control means for rendering the amount entry means operative when the amount in the receiving device is based on the power of two set in the register; an addition key; and means operated by said key for setting the register to represent the zero power of two and for rendering the product entry control means operable to cause the amount of the multiplicand to be entered into the accumulator.

26. In a multiplying machine, the combination of factor entering means for entering multiplier data and multiplicand data; a multi-denominational order factor entry receiving device for receiving both factors of a computation one after another in succession; halving means settable under control of the entry receiving device and operable to control a setting of the entry receiving device to represent the whole number part of half the amount previously therein; doubling means settable under control of the entry receiving device and operable to control a setting of the entry receiving device to represent twice the amount previously therein; cyclically operable means for controlling the operation of the halving means during a first phase of a multiplying operation, when the factor in the entry receiving device is the multiplier, to enable the receiving device to be set repeatedly to represent the terms of a converging series of whole number amounts obtained by dividing the multiplier by successive ascending powers of two, said dividing operation beginning with the zero power of two and continuing until a quotient of unity is reached; an odd value register settable to indicate which powers of two have produced odd-valued quotients during the first phase of the multiplying operation; an accumulator; amount entry means controlled by the entry receiving device; testing means for sensing the entries in the odd value register; means operable at the end of the first phase of the multiplying operation for enabling the cyclically operable means to control the operation of the doubling means during the second phase of the multiplying operation when the factor in the entry receiving device is the multiplicand, to enable the receiving device to be set repeatedly to represent the terms of a diverging series obtained by multiplying the multiplicand by the same powers of two by which the multiplier was divided, and for rendering the accumulator operable and the testing means operable to render the amount entering means operable to enter into the accumulator, during the second phase of the multiplying operation, those terms of the diverging series which are formed by a multiplication by the same power of two that caused an odd value quotient in the first phase of the multiplying operation; an addition key; and means operated by the addition key to set the odd value register to indicate an odd value for the zero power of two and to operate the means normally operated at the end of the first phase to render the various elements of the machine operable during the second phase of a multiplying operation, whereby, to perform addition, amounts entered as multiplicand factors are entered into the accumulator by the amount entering means under control of the factor entry receiving device.

27. In a multiplying machine, the combination of factor entering means for entering multiplier data and multiplicand data; an electrically operable factor entry receiving device for receiving both factors of a computation one after another in succession; electrically operable halving means settable under control of the entry receiving device and operable to control a setting of the entry receiving device to represent the whole number part of half the amount previously therein; electrically operable doubling means settable under control of the entry receiving device and operable to control a setting of the entry receiving device to represent twice the amount previously therein; an accumulator; driving means for the accumulator; electrically and cyclically operable means for controlling the operation of the halving means, during a first phase of a multiplying operation when the factor in the entry receiving device is the multiplier, to enable the receiving device to be set repeatedly according to the terms of a converging series of whole number amounts obtained by dividing the multiplier by successive ascending powers of two, said dividing operation commencing with the zero power of two and continuing until a quotient of unity is reached; an electrically operable odd value register which is controlled from the entry receiving device during the first phase of the multiplying operation to indicate which powers of two produced odd-value quotients; relay means operable at the end of the first phase of the multiplying operation for conditioning the machine for the second phase of the multiplying operation by rendering the accumulator driving means operable, by enabling the cyclically operable means to control the operation of the doubling means, during the second phase of the multiplying operation when the factor in the entry receiving device is the multiplicand, to enable the receiving device to be set repeatedly according to the terms of a diverging series obtained by multiplying the multiplicand by the same successive ascending powers of two by which the multiplier was divided, and by enabling means to be operable under control of the odd value register in said second phase to cause the entry in the accumulator of the amount of the terms of the diverging series which correspond to odd value terms of the converging series which was formed during the first phase of the multiplying operation; a primary power supply for supplying operating potential to the entry receiving device, the halving means, the doubling means, and the cyclically operable control means; a secondary power supply for supplying operating potential to the relay means and the accumulator driving means; means for selectively connecting the odd value register to either the primary or the secondary power supply; and clearing means for removing potential from the primary power supply to cause the various elements connected thereto to be released and restored to their normal unoperated positions, said odd value register being cleared or not depending upon whether or not it is connected to the primary or the secondary power supply when the clearing means is operated.

28. In a multiplying machine, the combination of factor entering means for entering multiplier data and multiplicand data; a multi-denominational order factor entry receiving device for receiving both factors of a computation one after another in succession; halving and doubling means settable under control of the entry receiving device and operable to control a further setting of the entry receiving device; means for controlling the operation of the halving and doubling means, when the factor in the entry receiving device is the multiplier, to enable the receiving device to be set repeatedly to provide the terms of a converging series obtained by dividing the multiplier by successive ascending powers of two and ignoring fractions in the resulting quotients, said dividing operation commencing with the zero power of two and continuing until a quotient of unity is reached; and means for controlling the operation of the halving and doubling means, when the factor in the entry receiving device is the multiplicand, to enable the receiving device to be set repeatedly to provide the terms of a diverging series obtained by multiplying the multiplicand by the same successive ascending powers of two by which the multiplier was divided.

29. In a multiplying machine, the combination of factor entering means for entering multiplier data and multiplicand data; a multi-denominational order factor entry receiving device for receiving both factors of a computation one after another in succession; halving means settable under control of the entry receiving device and operable to control a further setting of the entry receiving device; doubling means settable under control of the entry receiving device and operable to control a further setting of the entry receiving device; means for controlling the operation of the halving means, when the factor in the entry receiving device is the multiplier, to enable the receiving device to be set repeatedly to provide the terms of a converging series obtained by dividing the multiplier by successive ascending powers of two and ignoring fractions in the resulting quotients, said dividing operation commencing with the zero power of two and continuing until a quotient of unity is reached; and means for controlling the operation of the doubling means, when the factor in the entry receiving device is the multiplicand, to enable the receiving device to be set repeatedly to provide the terms of a diverging series obtained by multiplying the multiplicand by the same successive ascending powers of two by which the multiplier was divided.

30. In a multiplying machine, the combination of factor entering means for entering multiplier data and multiplicand data; a multi-denominational order factor entry receiving device for receiving both factors of a computation one after another in succession; halving and doubling means settable under control of the entry receiving device and operable to control further settings of the entry receiving device; means for controlling the operation of the halving and doubling means, when the factor in the entry receiving device is the multiplier, to enable the receiving device to be set repeatedly to provide the terms of a converging series of the whole number part of amounts obtained by dividing the multiplier by successive ascending powers of two, said dividing operation commencing with the zero power of two and continuing until a quotient of unity is reached; means settable under control of the entry receiving device during the dividing operations to provide an indication of which of the terms of the converging series are odd; means for controlling the operation of the halving and doubling means, when the factor in the entry receiving device is the multiplicand, to enable the receiving device to be set repeatedly to provide the terms of a diverging series obtained by multiplying the multiplicand by the same successive ascending powers of two by which the multiplier was divided; an accumulator; and means controlled by the odd value indicating means for causing an entry to be made in the accumulator under control of the entry receiving device each time the multiplicand is multiplied by a power of two which corresponds to a power of two which caused an odd value quotient to be obtained during the dividing operation.

31. In a multiplying machine, an entry receiving device including a denominational group of digit relays containing a digit relay for each possible digit which might be entered in the denomination; a group of transfer relays associated with the denominational group of digit relays to enable halving and doubling operations to be performed; circuits including contacts closable by the digit relays for energizing transfer relays in halving operations; circuits including other contacts closable by the digit relays for energizing the transfer relays in doubling operations; circuits including contacts controlled by the transfer relays for energizing a digit relay corresponding to the whole number part of half the value of the digit relay which energized the transfer relay; circuits including contacts controlled by the transfer relays for energizing a digit relay corresponding to the units digit of twice the value of the digit relay which energized the transfer relay; and sequence of operation control means for first rendering the halving circuits operable to control the energization of digit relays and transfer relays in series of halving operations to produce a converging series of terms of which the last term has a value of unity and thereafter rendering the doubling circuits operable to control the energization of digit relays and transfer relays in a corresponding series of doubling operations to produce a diverging series of terms.

32. In a multiplying machine the combination of factor entering means for multiplicand data; a multi-denominational entry receiving device settable according to multiplicand data; a register upon which the multiplier may be set in binary form; means operable after the entry of the multiplicand factor in the entry receiving device to form in succession in the receiving device, the terms of a divergent series obtained by multiplying the multiplicand by successive ascending powers of two beginning with the zero power of two; an accumulator; and an amount entering means controlled by the entry receiving device and rendered operable under control of the register to enter the amount of the term in the entry receiving device into the accumulator when the term in the entry receiving device is the result of a multiplication by a power of two for which an entry has been made in a corresponding order of the register, said amount entering means including a step-by-step operating switch having a wiper for each denomination of the product, a bank of contacts associated with each wiper, driving means for moving the wipers step-by-step from one contact to the next of their associated contact banks, and a magnet for controlling the operation of each denomination of the accumulator, each wiper being effective, as it traverses its bank of contacts, to impart to its associated control magnet a number of impulses corresponding to the digital value, in its associated denomination, of the amount of the term to be entered into the accumulator, and thereby to cause said control magnet to cause a corresponding entry to be made in the associated denomination of the accumulator.

33. In a multiplying machine the combination of factor entering means for multiplicand data; a multi-denominational entry receiving device settable according to multiplicand data; a register upon which the multiplier may be set in binary form; means operable after the entry of the multiplicand factor in the entry receiving device to form in succession in the receiving device, the terms of a divergent series obtained by multiplying the multiplicand by successive ascending powers of two beginning with the zero power of two; an accumulator; and an amount entering means controlled by the entry receiving device and rendered operable under control of the register to enter the amount of the term in the entry receiving device into the accumulator when the term in the entry receiving device is the result of a multiplication by a power of two for which an entry has been made in a corresponding order of the register, said amount entering means including a step-by-step operating switch having a wiper for each denomination of the product, a bank of contacts associated with each wiper, driving means for moving the wipers step-by-step from one contact to the next of their associated contact banks, and a magnet for controlling the operation of each denomination of the accumulator, each wiper being effective, as it traverses its bank of contacts, to impart to its associated magnet a number of impulses corresponding to the digital value, in its associated denomination, of the amount of the term to be entered into the accumulator, and thereby to cause said magnet to cause a corresponding entry to be made in the associated denomination of the accumulator, said switch being given its first step of movement when the multiplier register indicates that the power of two by term of the divergent series was obtained corresponds to an order in which an entry has been made in the multiplier register, and said switch having a further wiper, which in cooperation with another bank of contacts, completes a circuit in the second and succeeding steps of movement of the switch to drive the switch step by step over the remaining contacts to its home position.

34. In a multiplying machine the combination of factor entering means for multiplicand data; a multi-denominational entry receiving device settable according to multiplicand data; a register upon which the multiplier may be set in binary form; means operable after the entry of the multiplicand factor in the entry receiving device to form in succession in the receiving device, the terms of a divergent series obtained by multiplying the multiplicand by successive ascending powers of two beginning with the zero power of two; an accumulator; and an amount entering means controlled by the entry receiving device and rendered operable under control of the register to enter the amount of the term in the entry receiving device into the accumulator when the term in the entry receiving device is the result of a multiplication by a power of two for which an entry has been made in a corresponding order of the register, said amount entering means including a step-by-step operating switch having a wiper for each denomination of the product, a bank of contacts associated with each wiper, the contacts of any bank being connected in series by switches controlled by the corresponding order of the entry receiving device with the switches of the series being normally closed but opened at a point corresponding to the digit in the receiving device so that the number of contacts corresponding to the digit will remain connected in series, driving means for moving the wipers step by step from one contact to the next of their associated contact banks, and a magnet for controlling the operation of each denomination of the accumulator, each wiper being operable, as it traverses its bank of contacts, to impart to its associated control magnet a number of impulses corresponding to the number of contacts effectively connected in series, in its associated denomination, as determined by the term to be entered into the accumulator, and thereby to cause said control magnet to cause a corresponding entry to be made in the associated denomination of the accumulator.

FRANK REGINALD SAXBY.

REFERENCES CITED

The following references are of record in the file of this patent:

UNITED STATES PATENTS

| Number | Name | Date |
| --- | --- | --- |
| 2,192,612 | Lang et al. | Mar. 5, 1940 |
| 2,213,565 | Lang et al. | Sept. 3, 1940 |
| 2,318,591 | Couffignal | May 11, 1943 |
| 2,346,616 | Saxby | Apr. 11, 1944 |